United States Patent
Liu et al.

(10) Patent No.: US 12,479,831 B2
(45) Date of Patent: Nov. 25, 2025

(54) SUBSTITUTED N(-METHYL-D3)PYRIDAZINE-3-CARBOXAMIDE OR M-(METHYL-D3)-NICOTINAMIDE COMPOUNDS AS IL-12, IL-23 AND/OR IFNα MODULATORS

(71) Applicant: BRISTOL-MYERS SQUIBB COMPANY, Princeton, NJ (US)

(72) Inventors: Chunjian Liu, Pennington, NJ (US); James Lin, Lawrenceville, NJ (US); David S. Weinstein, San Diego, CA (US)

(73) Assignee: Bristol-Myers Squibb Company, Princeton, NJ (US)

( * ) Notice: Subject to any disclaimer, the term of this patent is extended or adjusted under 35 U.S.C. 154(b) by 544 days.

(21) Appl. No.: 17/997,288

(22) PCT Filed: Apr. 27, 2021

(86) PCT No.: PCT/US2021/029272
§ 371 (c)(1),
(2) Date: Oct. 27, 2022

(87) PCT Pub. No.: WO2021/222153
PCT Pub. Date: Nov. 4, 2021

(65) Prior Publication Data
US 2023/0167092 A1 Jun. 1, 2023

Related U.S. Application Data

(60) Provisional application No. 63/016,539, filed on Apr. 28, 2020.

(51) Int. Cl.
| | | |
|---|---|---|
| C07D 403/12 | (2006.01) | |
| C07D 401/12 | (2006.01) | |
| C07D 401/14 | (2006.01) | |
| C07D 403/14 | (2006.01) | |
| C07D 405/14 | (2006.01) | |
| C07D 413/14 | (2006.01) | |
| C07D 473/00 | (2006.01) | |
| C07D 487/04 | (2006.01) | |

(52) U.S. Cl.
CPC ......... *C07D 403/12* (2013.01); *C07D 401/12* (2013.01); *C07D 401/14* (2013.01); *C07D 403/14* (2013.01); *C07D 405/14* (2013.01); *C07D 413/14* (2013.01); *C07D 473/00* (2013.01); *C07D 487/04* (2013.01); *C07B 2200/05* (2013.01)

(58) Field of Classification Search
None
See application file for complete search history.

(56) References Cited

FOREIGN PATENT DOCUMENTS

| WO | 2014/074660 A1 | 5/2014 | |
| WO | WO-2014074661 A1 * | 5/2014 | ............... A61P 1/00 |
| WO | 2015/069310 A1 | 5/2015 | |
| WO | 2020/092196 A1 | 5/2020 | |

OTHER PUBLICATIONS

Wrobleski, Stephen T., Highly Selective Inhibition of Tyrosine Kinase 2 (TYK2) for the Treatment of Autoimmune Diseases: Discovery of the Allosteric Inhibitor BMS-986165, Journal of Medicinal Chemistry, 2019, pp. 8973-8995, 62(20).

* cited by examiner

Primary Examiner — Jeffrey S Lundgren
Assistant Examiner — Anthony Joseph Seitz
(74) Attorney, Agent, or Firm — Jing. G. Sun

(57) ABSTRACT

There are disclosed compounds of the following formula I or a stereoisomer or pharmaceutically-acceptable salt thereof, wherein all substituents are as defined herein, which are useful in the modulation of IL-12, IL-23 and/or IFN?, by acting on Tyk-2 to cause signal transduction inhibition. The compounds of the invention may be useful for treating inflammatory and autoimmune diseases or disorders.

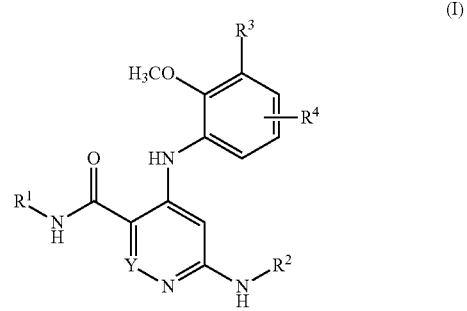

6 Claims, No Drawings

SUBSTITUTED N(-METHYL-D3)PYRIDAZINE-3-CARBOXAMIDE OR M-(METHYL-D3)-NICOTINAMIDE COMPOUNDS AS IL-12, IL-23 AND/OR IFNα MODULATORS

CROSS-REFERENCE TO RELATED APPLICATIONS

This application is a 371 of International Application No. PCT/US2021/029272 filed on Apr. 27, 2021, which claims the priority benefit of U.S. Provisional Application 63/016, 539, filed Apr. 28, 2020; each of which is incorporated herein by reference in its entirety.

FIELD OF THE INVENTION

This invention relates to compounds useful in the modulation of IL-12, IL-23 and/or IFNα by acting on Tyk-2 to cause signal transduction inhibition. Provided herein are -substituted heterocyclic compounds, compositions comprising such compounds, and methods of their use. The invention further pertains to pharmaceutical compositions containing at least one compound according to the invention that are useful for the treatment of conditions related to the modulation of IL-12, IL-23 and/or IFNα in a mammal.

BACKGROUND OF THE INVENTION

The heterodimeric cytokines interleukin (IL)-12 and IL-23, which share a common p40 subunit, are produced by activated antigen-presenting cells and are critical in the differentiation and proliferation of Th1 and Th17 cells, two effector T cell lineages which play key roles in autoimmunity. IL-23 is composed of the p40 subunit along with a unique p19 subunit. IL-23, acting through a heterodimeric receptor composed of IL-23R and IL-12Rβ1, is essential for the survival and expansion of Th17 cells which produce pro-inflammatory cytokines such as IL-17A, IL-17F, IL-6 and TNF-α (McGeachy, M. J. et al., "The link between IL-23 and Th17 cell-mediated immune pathologies", Semin. Immunol., 19:372-376 (2007)). These cytokines are critical in mediating the pathobiology of a number of autoimmune diseases, including rheumatoid arthritis, multiple sclerosis, inflammatory bowel disease, and lupus. IL-12, in addition to the p40 subunit in common with IL-23, contains a p35 subunit and acts through a heterodimeric receptor composed of IL-12Rβ1 and IL-12Rβ2. IL-12 is essential for Th1 cell development and secretion of IFNγ, a cytokine which plays a critical role in immunity by stimulating MHC expression, class switching of B cells to IgG subclasses, and the activation of macrophages (Gracie, J. A. et al., "Interleukin-12 induces interferon-gamma-dependent switching of IgG alloantibody subclass", Eur. J Immunol., 26:1217-1221 (1996); Schroder, K. et al., "Interferon-gamma: an overview of signals, mechanisms and functions", J. Leukoc. Biol., 75(2):163-189 (2004)).

The importance of the p40-containing cytokines in autoimmunity is demonstrated by the discovery that mice deficient in either p40, p19, or IL-23R are protected from disease in models of multiple sclerosis, rheumatoid arthritis, inflammatory bowel disease, lupus and psoriasis, among others (Kyttaris, V. C. et al., "Cutting edge: IL-23 receptor deficiency prevents the development of lupus nephritis in C57BL/6-lpr/lpr mice", J. Immunol., 184:4605-4609 (2010); Hong, K. et al., "IL-12, independently of IFN-gamma, plays a crucial role in the pathogenesis of a murine psoriasis like skin disorder", J. Immunol., 162:7480-7491 (1999); Hue, S. et al., "Interleukin-23 drives innate and T cell-mediated intestinal inflammation", J. Exp. Med, 203:2473-2483 (2006); Cua, D. J. et al., "Interleukin-23 rather than interleukin-12 is the critical cytokine for autoimmune inflammation of the brain", Nature, 421:744-748 (2003); Murphy, C. A. et al., "Divergent pro- and anti-inflammatory roles for IL-23 and IL-12 in joint autoimmune inflammation", J. Exp. Med, 198:1951-1957 (2003)).

In human disease, high expression of p40 and p19 has been measured in psoriatic lesions, and Th17 cells have been identified in active lesions in the brain from MS patients and in the gut mucosa of patients with active Crohn's disease (Lee, E. et al., "Increased expression of interleukin 23 p19 and p40 in lesional skin of patients with psoriasis vulgaris", J. Exp. Med, 199:125-130 (2004); Tzartos, J. S. et al., "Interleukin-17 production in central nervous system infiltrating T cells and glial cells is associated with active disease in multiple sclerosis", Am. J. Pathol., 172:146-155 (2008)). The mRNA levels of p19, p40, and p35 in active SLE patients were also shown to be significantly higher compared with those in inactive SLE patients (Huang, X. et al., "Dysregulated expression of interleukin-23 and interleukin-12 subunits in systemic lupus erythematosus patients", Mod Rheumatol., 17:220-223 (2007)), and T cells from lupus patients have a predominant Th1 phenotype (Tucci, M. et al., "Overexpression of interleukin-12 and T helper 1 predominance in lupus nephritis", Clin. Exp. Immunol., 154:247-254 (2008)).

Moreover, genome-wide association studies have identified a number of loci associated with chronic inflammatory and autoimmune diseases that encode factors that function in the IL-23 and IL-12 pathways. These genes include IL23A, IL12A, IL12B, IL12RB1, IL12RB2, IL23R, JAK2, TYK2, STAT3, and STAT4 (Lees, C. W. et al., "New IBD genetics: common pathways with other diseases", Gut, 60:1739-1753 (2011); Tao, J. H. et al., "Meta-analysis of TYK2 gene polymorphisms association with susceptibility to autoimmune and inflammatory diseases", Mol. Biol. Rep., 38:4663-4672 (2011); Cho, J. H. et al., "Recent insights into the genetics of inflammatory bowel disease", Gastroenterology, 140:1704-1712 (2011)).

Indeed, anti-p40 treatment, which inhibits both IL-12 and IL-23, as well as IL-23-specific anti-p19 therapies have been shown to be efficacious in the treatment of autoimmunity in diseases including psoriasis, Crohn's Disease and psoriatic arthritis (Leonardi, C. L. et al., "PHOENIX 1 study investigators. Efficacy and safety of ustekinumab, a human interleukin-12/23 monoclonal antibody, in patients with psoriasis: 76-week results from a randomized, double-blind, placebo-controlled trial (PHOENIX 1)", Lancet, 371:1665-1674 (2008); Sandborn, W. J. et al., "Ustekinumab Crohn's Disease Study Group. A randomized trial of Ustekinumab, a human interleukin-12/23 monoclonal antibody, in patients with moderate-to-severe Crohn's disease", Gastroenterology, 135:1130-1141 (2008); Gottlieb, A. et al., "Ustekinumab, a human interleukin 12/23 monoclonal antibody, for psoriatic arthritis: randomized, double-blind, placebo-controlled, crossover trial", Lancet, 373:633-640 (2009)). Therefore, agents which inhibit the action of IL-12 and IL-23 may be expected to have therapeutic benefit in human autoimmune disorders.

The Type I group of interferons (IFNs), which include the IFNα members as well as IFNβ, IFNε, IFNκ and IFNω, act through a heterodimer IFNα/β receptor (IFNAR). Type I IFNs have multiple effects in both the innate and adaptive immune systems including activation of both the cellular and humoral immune responses as well as enhancing the expression and release of autoantigens (Hall, J. C. et al., "Type I interferons: crucial participants in disease amplification in autoimmunity", *Nat. Rev. Rheumatol.*, 6:40-49 (2010)).

In patients with systemic lupus erythematosus (SLE), a potentially fatal autoimmune disease, increased serum levels of interferon (IFN)α (a type I interferon) or increased expression of type I IFN-regulated genes (a so-called IFNα signature) in peripheral blood mononuclear cells and in affected organs has been demonstrated in a majority of patients (Bennett, L. et al., "Interferon and granulopoiesis signatures in systemic lupus erythematosus blood", *J. Exp. Med.*, 197:711-723 (2003); Peterson, K. S. et al., "Characterization of heterogeneity in the molecular pathogenesis of lupus nephritis from transcriptional profiles of laser-captured glomeruli", *J. Clin. Invest.*, 113:1722-1733 (2004)), and several studies have shown that serum IFNα levels correlate with both disease activity and severity (Bengtsson, A. A. et al., "Activation of type I interferon system in systemic lupus erythematosus correlates with disease activity but not with antiretroviral antibodies", *Lupus*, 9:664-671 (2000)). A direct role for IFNα in the pathobiology of lupus is evidenced by the observation that the administration of IFNα to patients with malignant or viral diseases can induce a lupus-like syndrome. Moreover, the deletion of the IFNAR in lupus-prone mice provides high protection from autoimmunity, disease severity and mortality (Santiago-Raber, M. L. et al., "Type-I interferon receptor deficiency reduces lupus-like disease in NZB mice", *J. Exp. Med.*, 197:777-788 (2003)), and genome-wide association studies have identified loci associated with lupus that encode factors that function in the type I interferon pathway, including IRF5, IKBKE, TYK2, and STAT4 (Deng, Y. et al., "Genetic susceptibility to systemic lupus erythematosus in the genomic era", *Nat. Rev. Rheumatol.*, 6:683-692 (2010); Sandling, J. K. et al., "A candidate gene study of the type I interferon pathway implicates IKBKE and IL8 as risk loci for SLE", *Eur. J. Hum. Genet.*, 19:479-484 (2011)). In addition to lupus, there is evidence that aberrant activation of type I interferon-mediated pathways are important in the pathobiology of other autoimmune diseases such as Sjögren's syndrome and scleroderma (Båve, U. et al., "Activation of the type I interferon system in primary Sjögren's syndrome: a possible etiopathogenic mechanism", *Arthritis Rheum.*, 52:1185-1195 (2005); Kim, D. et al., "Induction of interferon-alpha by scleroderma sera containing autoantibodies to topoisomerase I: association of higher interferon-alpha activity with lung fibrosis", *Arthritis Rheum.*, 58:2163-2173 (2008)). Therefore, agents which inhibit the action of type I interferon responses may be expected to have therapeutic benefit in human autoimmune disorders.

Tyrosine kinase 2 (Tyk2) is a member of the Janus kinase (JAK) family of nonreceptor tyrosine kinases and has been shown to be critical in regulating the signal transduction cascade downstream of receptors for IL-12, IL-23 and type I interferons in both mice (Ishizaki, M. et al., "Involvement of Tyrosine Kinase-2 in Both the IL-12/Th1 and IL-23/Th17 Axes In vivo", *J. Immunol.*, 187:181-189 (2011); Prchal-Murphy, M. et al., "TYK2 kinase activity is required for functional type I interferon responses in vivo", *PLoS One*, 7:e39141 (2012)) and humans (Minegishi, Y. et al., "Human tyrosine kinase 2 deficiency reveals its requisite roles in multiple cytokine signals involved in innate and acquired immunity", *Immunity*, 25:745-755 (2006)). Tyk2 mediates the receptor-induced phosphorylation of members of the STAT family of transcription factors, an essential signal that leads to the dimerization of STAT proteins and the transcription of STAT-dependent pro-inflammatory genes. Tyk2-deficient mice are resistant to experimental models of colitis, psoriasis and multiple sclerosis, demonstrating the importance of Tyk2-mediated signaling in autoimmunity and related disorders (Ishizaki, M. et al., "Involvement of Tyrosine Kinase-2 in Both the IL-12/Th1 and IL-23/Th17 Axes In vivo", *J. Immunol.*, 187:181-189 (2011); Oyamada, A. et al., "Tyrosine kinase 2 plays critical roles in the pathogenic CD4 T cell responses for the development of experimental autoimmune encephalomyelitis", *J. Immunol.*, 183:7539-7546 (2009)).

In humans, individuals expressing an inactive variant of Tyk2 are protected from multiple sclerosis and possibly other autoimmune disorders (Couturier, N. et al., "Tyrosine kinase 2 variant influences T lymphocyte polarization and multiple sclerosis susceptibility", *Brain*, 134:693-703 (2011)). Genome-wide association studies have shown other variants of Tyk2 to be associated with autoimmune disorders such as Crohn's Disease, psoriasis, systemic lupus erythematosus, and rheumatoid arthritis, further demonstrating the importance of Tyk2 in autoimmunity (Ellinghaus, D. et al., "Combined Analysis of Genome-wide Association Studies for Crohn Disease and Psoriasis Identifies Seven Shared Susceptibility Loci", *Am. J. Hum. Genet.*, 90:636-647 (2012); Graham, D. et al., "Association of polymorphisms across the tyrosine kinase gene, TYK2 in UK SLE families", *Rheumatology* (Oxford), 46:927-930 (2007); Eyre, S. et al., "High-density genetic mapping identifies new susceptibility loci for rheumatoid arthritis", *Nat. Genet.*, 44:1336-1340 (2012)).

In view of the conditions that may benefit by treatment involving the modulation of cytokines and/or interferons, new compounds capable of modulating cytokines and/or interferons, such as IL-12, IL-23 and/or IFNα, and methods of using these compounds may provide substantial therapeutic benefits to a wide variety of patients in need thereof.

SUMMARY OF THE INVENTION

The invention is directed to compounds of Formula I, infra, that which are useful as modulators of IL-12, IL-23 and/or IFNα by inhibiting Tyk2-mediated signal transduction.

The present invention also provides processes and intermediates for making the compounds of the present invention.

The present invention also provides pharmaceutical compositions comprising a pharmaceutically acceptable carrier and at least one of the compounds of the present invention.

The present invention also provides a method for the modulation of IL-12, IL-23 and/or IFNα by inhibiting Tyk-2-mediated signal transduction comprising administering to a host in need of such treatment a therapeutically effective amount of at least one of the compounds of the present invention.

The present invention also provides a method for treating proliferative, metabolic, allergic, autoimmune and inflammatory diseases, comprising administering to a host in need of such treatment a therapeutically effective amount of at least one of the compounds of the present invention.

A preferred embodiment is a method for treating inflammatory and autoimmune diseases or diseases. For the purposes of this invention, an inflammatory and autoimmune disease or disorder includes any disease having an inflammatory or autoimmune component.

An alternate preferred embodiment is a method for treating metabolic diseases, including type 2 diabetes and atherosclerosis.

The present invention also provides the use of the compounds of the present invention for the manufacture of a medicament for the treatment of cancers.

The present invention also provides the compounds of the present invention for use in therapy.

These and other features of the invention will be set forth in the expanded form as the disclosure continues.

DETAILED DESCRIPTION OF THE EMBODIMENTS OF THE INVENTION

In a first aspect of the present invention, there is provided a compound of formula I

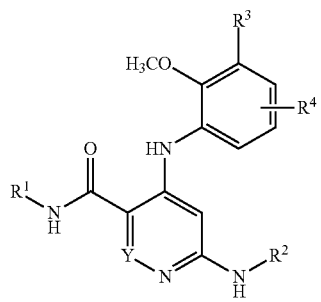

(I)

wherein

Y is N or CH;

$R^1$ is H, $CD_3$ or $C_{1-3}$ alkyl;

$R^2$ is —C(O)$R^{2a}$; $C_{1-6}$alkyl, —(CH$_2$)$_r$-3-14 membered carbocycle substituted with 0-1 $R^{2a}$ or a 5-14 membered mono or bicyclic heterocycle containing 1-4 heteroatoms selected from N, O, and S, each group substituted with 0-4 $R^{2a}$;

$R^{2a}$ is independently at each occurrence, hydrogen, OH, halo, oxo (=O), $CF_3$, CN, $NO_2$, $C_{1-6}$ alkyl, $C_{1-6}$ alkoxy, $C_{1-6}$ haloalkyl, $C_{1-6}$ hydroxyalkyl or $C_{3-6}$ cycloalkyl;

$R^3$ is a 5-14 membered mono or bicyclic heterocycle containing 1-4 heteroatoms selected from N, O, and S, each group substituted with 0-4 $R^{3a}$;

$R^{3a}$ is independently at each occurrence, hydrogen, OH, halo, oxo (=O), $CF_3$, CN, $C_{1-6}$ alkyl, $C_{1-6}$ alkoxy, $C_{1-6}$ haloalkyl, $C_{1-6}$ hydroxyalkyl, $C_{3-6}$ cycloalkyl each group substituted with 0-2 $R^{3b}$, CO—N($R^5R^6$), CO-heterocycle containing 1-4 heteroatoms selected from N, O, and S, each group substituted with 0-2 $R^{3b}$ or a 5-14 membered mono or bicyclic heterocycle containing 1-4 heteroatoms selected from N, O, and S, each group substituted with 0-2 $R^{3b}$;

$R^{3b}$ is independently at each occurrence, F, OH or $C_{1-3}$ alkyl;

$R^4$ is hydrogen, halo or $C_{1-4}$ alkyl;

$R^5$ and $R^6$ are independently at each occurrence, hydrogen or $C_{1-4}$ alkyl, or a stereoisomer or pharmaceutically acceptable salt thereof.

In a second aspect of the invention, there is provided a compound of formula II

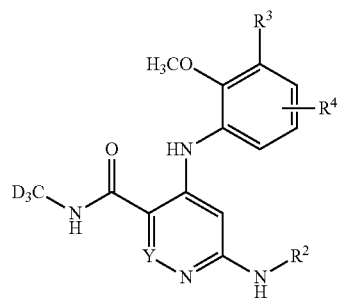

(II)

wherein

Y is N or CH;

$R^2$ is —C(O)$R^{2a}$; $C_{1-6}$alkyl, —(CH$_2$)$_r$-3-14 membered carbocycle substituted with 0-1 $R^{2a}$ or a 5-14 membered mono or bicyclic heterocycle containing 1-4 heteroatoms selected from N, O, and S, each group substituted with 0-4 $R^{2a}$;

$R^{2a}$ is independently at each occurrence, hydrogen, OH, halo, oxo (=O), $CF_3$, CN, $NO_2$, $C_{1-6}$ alkyl, $C_{1-6}$ alkoxy, $C_{1-6}$ haloalkyl, $C_{1-6}$ hydroxyalkyl or $C_{3-6}$ cycloalkyl;

$R^3$ is a 5-14 membered mono or bicyclic heterocycle containing 1-4 heteroatoms selected from N, O, and S, each group substituted with 0-4 $R^{3a}$;

$R^{3a}$ is independently at each occurrence, hydrogen, OH, halo, oxo (=O), $CF_3$, CN, $C_{1-6}$ alkyl, $C_{1-6}$ alkoxy, $C_{1-6}$ haloalkyl, $C_{1-6}$ hydroxyalkyl, $C_{3-6}$ cycloalkyl each group substituted with 0-2 $R^{3b}$, CO—N($R^5R^6$), CO-heterocycle containing 1-4 heteroatoms selected from N, O, and S, each group substituted with 0-2 $R^{3b}$ or a 5-14 membered mono or bicyclic heterocycle containing 1-4 heteroatoms selected from N, O, and S, each group substituted with 0-2 $R^{3b}$;

$R^{3b}$ is independently at each occurrence, F, OH or $C_{1-3}$ alkyl;

$R^4$ is hydrogen, halo or $C_{1-4}$ alkyl;

$R^5$ and $R^6$ are independently at each occurrence, hydrogen or $C_{1-4}$ alkyl, or a stereoisomer or pharmaceutically acceptable salt thereof.

In a third aspect of the invention, there is provided a compound of formula II

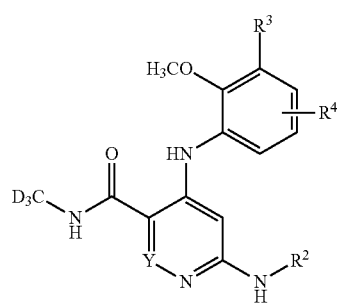

(II)

wherein
Y is N or CH;
R² is —C(O)R²ᵃ, —(CH₂)ᵣ-3-14 membered carbocycle substituted with 0-1 R²ᵃ or a 5-14 membered mono or bicyclic heterocycle containing 1-4 heteroatoms selected from N, O, and S, each group substituted with 0-4 R²ᵃ;
R²ᵃ is independently at each occurrence, hydrogen, OH, halo, oxo (═O), CF₃, CN, NO₂, C₁₋₆ alkyl, C₁₋₆ alkoxy, C₁₋₆ haloalkyl, C₁₋₆ hydroxyalkyl or C₃₋₆ cycloalkyl;
R³ is a 5-14 membered mono or bicyclic heterocycle containing 1-4 heteroatoms selected from N, O, and S, each group substituted with 0-4 R³ᵃ;
R³ᵃ is independently at each occurrence, hydrogen, OH, halo, oxo (═O), CF₃, CN, C₁₋₆ alkyl, C₁₋₆ alkoxy, C₁₋₆ haloalkyl, C₁₋₆ hydroxyalkyl, C₃₋₆ cycloalkyl each group substituted with 0-2 R³ᵇ, CO—N(R⁵R⁶), CO-heterocycle containing 1-4 heteroatoms selected from N, O, and S, each group substituted with 0-2 R³ᵇ or a 5-14 membered mono or bicyclic heterocycle containing 1-4 heteroatoms selected from N, O, and S, each group substituted with 0-2 R³ᵇ;
R³ᵇ is independently at each occurrence, F, OH or C₁₋₃ alkyl;
R⁴ is hydrogen, halo or C₁₋₄ alkyl;
R⁵ and R⁶ are independently at each occurrence, hydrogen or C₁₋₄ alkyl,
or a stereoisomer or pharmaceutically acceptable salt thereof.

In a 4th aspect of the invention, there is provided a compound of formula II

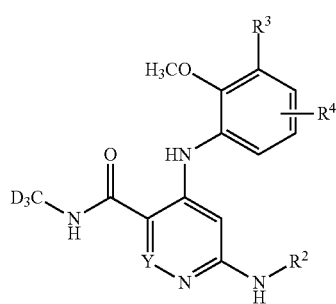

(II)

wherein
Y is N or CH;
R² is —C(O)R²ᵃ, —(CH₂)ᵣ-3-14 membered carbocycle substituted with 0-1 R²ᵃ or a 5-14 membered mono or bicyclic heterocycle containing 1-4 heteroatoms selected from N, O, and S, each group substituted with 0-4 R²ᵃ;
R²ᵃ is independently at each occurrence, hydrogen, OH, halo, oxo (═O), CF₃, CN, C₁₋₃ alkyl, OCH₃, C₁₋₆ haloalkyl, C₁₋₆ hydroxyalkyl or C₃₋₆ cycloalkyl;
R³ is a 5-14 membered mono or bicyclic heterocycle containing 1-4 heteroatoms selected from N, O, and S, each group substituted with 0-4 R³ᵃ;
R³ᵃ is independently at each occurrence, hydrogen, OH, halo, oxo (═O), CF₃, CN, C₁₋₆ alkyl, C₁₋₆ alkoxy, C₁₋₆ haloalkyl, C₁₋₆ hydroxyalkyl, C₃₋₆ cycloalkyl each group substituted with 0-2 R³ᵇ, CO—N(R⁵R⁶), CO-heterocycle containing 1-4 heteroatoms selected from N, O, and S, each group substituted with 0-2 R³ᵇ or a 5-14 membered mono or bicyclic heterocycle containing 1-4 heteroatoms selected from N, O, and S, each group substituted with 0-2 R³ᵇ;
R³ᵇ is independently at each occurrence, F, OH or C₁₋₃ alkyl;
R⁴ is halo;
R⁵ and R⁶ are independently at each occurrence, hydrogen or C₁₋₄ alkyl,
or a stereoisomer or pharmaceutically acceptable salt thereof.

In a 5th aspect of the invention, there is provided a compound of formula II

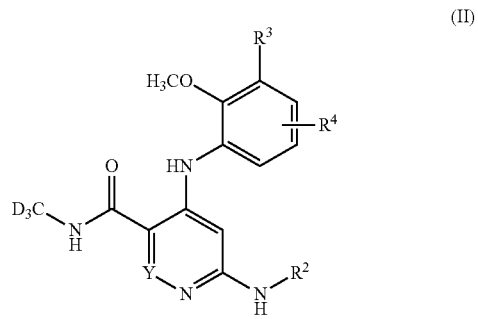

(II)

wherein
Y is N or CH;
R² is —C(O)R²ᵃ, —(CH₂)ᵣ-3-14 membered carbocycle substituted with 0-1 R²ᵃ or a 5-14 membered mono or bicyclic heterocycle containing 1-4 heteroatoms selected from N, O, and S, each group substituted with 0-4 R²ᵃ;
R²ᵃ is independently at each occurrence, hydrogen, OH, halo, oxo (═O), CF₃, CN, C₁₋₃ alkyl, OCH₃, C₁₋₆ haloalkyl, C₁₋₆ hydroxyalkyl or C₃₋₆ cycloalkyl;
R³ is a 5-14 membered mono or bicyclic heterocycle containing 1-4 heteroatoms selected from N, O, and S, each group substituted with 0-4 R³ᵃ;
R³ᵃ is independently at each occurrence, hydrogen, OH, halo, oxo (═O), CF₃, CN, C₁₋₆ alkyl, C₁₋₆ alkoxy, C₁₋₆ haloalkyl, C₁₋₆ hydroxyalkyl, C₃₋₆ cycloalkyl each group substituted with 0-2 R³ᵇ, CO—N(R⁵R⁶), CO-heterocycle containing 1-4 heteroatoms selected from N, O, and S, each group substituted with 0-2 R³ᵇ or a 5-14 membered mono or bicyclic heterocycle containing 1-4 heteroatoms selected from N, O, and S, each group substituted with 0-2 R³ᵇ;
R³ᵇ is independently at each occurrence, F, OH or C₁₋₃ alkyl;
R⁴ is F;
R⁵ and R⁶ are independently at each occurrence, hydrogen or C₁₋₄ alkyl,
or a stereoisomer or pharmaceutically acceptable salt thereof.

In a sixth aspect of the invention, there is provided compound II wherein
R³ is a 6 membered heterocycle containing 1-4 heteroatoms selected from N, O, and S, each group substituted with 0-4 R³ᵃ.

In another aspect, there is provided a compound selected from the exemplified examples within the scope of the first aspect, or a pharmaceutically acceptable salt thereof.

In another aspect, there is provided a compound selected from any subset list of compounds within the scope of any of the above aspects.

In another aspect, there is provided a compound (IUPAC naming convention) or a pharmaceutically acceptable salt thereof.

selected from
4-((3-(5-cyanopyrimidin-2-yl)-2-methoxyphenyl)amino)-6-(cyclopropanecarboxamido)-N-(methyl-d3)pyridazine-3-carboxamide,
4-((3-(4-cyanopyrimidin-2-yl)-2-methoxyphenyl)amino)-6-(cyclopropanecarboxamido)-N-(methyl-d3)pyridazine-3-carboxamide,
6-(cyclobutanecarboxamido)-4-((2-methoxy-3-(pyrimidin-2-yl)phenyl)amino)-N-(methyl-d3)pyridazine-3-carboxamide,
6-(cyclopropanecarboxamido)-4-((2-methoxy-3-(4-methoxypyrimidin-2-yl)phenyl)amino)-N-(methyl-d3)pyridazine-3-carboxamide,
6-(cyclopropanecarboxamido)-4-((2-methoxy-3-(5-methoxypyrimidin-2-yl)phenyl)amino)-N-(methyl-d3)pyridazine-3-carboxamide,
6-(cyclopropanecarboxamido)-4-((5-fluoro-2-methoxy-3-(pyrimidin-2-yl)phenyl)amino)-N-(methyl-d3)pyridazine-3-carboxamide,
6-(cyclopropanecarboxamido)-4-((2-methoxy-3-(5-methylpyrimidin-2-yl)phenyl)amino)-N-(methyl-d3)pyridazine-3-carboxamide,
6-(cyclopropanecarboxamido)-4-((2-methoxy-3-(1-methyl-6-oxo-1,6-dihydropyridazin-3-yl)phenyl)amino)-N-(methyl-d3)pyridazine-3-carboxamide,
6-(cyclopropanecarboxamido)-4-((2-methoxy-3-(4-methyl-5-oxo-4,5-dihydropyrazin-2-yl)phenyl)amino)-N-(methyl-d3)pyridazine-3-carboxamide,
6-(cyclopropanecarboxamido)-4-((3-(5-(2-hydroxypropan-2-yl)pyridin-2-yl)-2-methoxyphenyl)amino)-N-(methyl-d3)pyridazine-3-carboxamide,
6-(cyclopropanecarboxamido)-4-((2-methoxy-3-(1-methyl-6-oxo-1,6-dihydropyrimidin-4-yl)phenyl)amino)-N-(methyl-d3)pyridazine-3-carboxamide,
6-(cyclopropanecarboxamido)-4-((2-methoxy-3-(5-morpholinopyrimidin-2-yl)phenyl)amino)-N-(methyl-d3)pyridazine-3-carboxamide,
6-(Cyclopropanecarboxamido)-4-((5-fluoro-2-methoxy-3-(pyrimidin-2-yl)phenyl)amino)-N-(methyl-d3)nicotinamide,
6-(cyclopropanecarboxamido)-4-((2-methoxy-3-(pyrimidin-2-yl)phenyl)amino)-N-(methyl-d3)nicotinamide,
6-(cyclopropanecarboxamido)-4-((2-methoxy-3-(5-morpholinopyrimidin-2-yl)phenyl)amino)-N-(methyl-d3)nicotinamide,
6-(cyclopropanecarboxamido)-4-((2-methoxy-3-(5-methoxypyrazin-2-yl)phenyl)amino)-N-(methyl-d3)nicotinamide,
6-(cyclopropanecarboxamido)-4-((2-methoxy-3-(5-methylpyrazin-2-yl)phenyl)amino)-N-(methyl-d3)nicotinamide,
6-(Cyclopropanecarboxamido)-4-((3-(6-(2-hydroxypropan-2-yl)pyridazin-3-yl)-2-methoxyphenyl)amino)-N-(methyl-d3)pyridazine-3-carboxamide,
6-(cyclopropanecarboxamido)-4-((3-(5-(2-hydroxypropan-2-yl)pyrimidin-2-yl)-2-methoxyphenyl)amino)-N-(methyl-d3)pyridazine-3-carboxamide,
6-(cyclopropanecarboxamido)-4-((5-fluoro-3-(5-(2-hydroxypropan-2-yl)pyrimidin-2-yl)-2-methoxyphenyl)amino)-N-(methyl-d3)pyridazine-3-carboxamide,
6-(cyclopropanecarboxamido)-4-((5-fluoro-3-(6-(2-hydroxypropan-2-yl)pyridazin-3-yl)-2-methoxyphenyl)amino)-N-(methyl-d3)pyridazine-3-carboxamide,
6-(cyclopropanecarboxamido)-4-((3-(6-(2-hydroxybutan-2-yl)pyridazin-3-yl)-2-methoxyphenyl)amino)-N-(methyl-d3)pyridazine-3-carboxamide,
6-(cyclopropanecarboxamido)-4-((5-fluoro-3-(5-(1-hydroxyethyl)pyrazin-2-yl)-2-methoxyphenyl)amino)-N-(methyl-d3)pyridazine-3-carboxamide,
6-(Cyclopropanecarboxamido)-4-((3-(5-(2-hydroxypropan-2-yl)pyrazin-2-yl)-2-methoxyphenyl)amino)-N-(methyl-d3)pyridazine-3-carboxamide,
6-(cyclopropanecarboxamido)-4-((3-(5-(1-fluoro-2-hydroxypropan-2-yl)pyrimidin-2-yl)-2-methoxyphenyl)amino)-N-(methyl-d3)pyridazine-3-carboxamide,
6-(cyclopropanecarboxamido)-4-((3-(5-(1-hydroxycyclobutyl)pyrimidin-2-yl)-2-methoxyphenyl)amino)-N-(methyl-d3)pyridazine-3-carboxamide,
6-(cyclopropanecarboxamido)-4-((5-fluoro-3-(5-(1-hydroxycyclobutyl)pyrimidin-2-yl)-2-methoxyphenyl)amino)-N-(methyl-d3)pyridazine-3-carboxamide,
6-(cyclopropanecarboxamido)-4-((3-(5-(1,3-difluoro-2-hydroxypropan-2-yl)pyrimidin-2-yl)-2-methoxyphenyl)amino)-N-(methyl-d3)pyridazine-3-carboxamide,
6-(cyclopropanecarboxamido)-4-((2-methoxy-3-(5-(1,1,1-trifluoro-2-hydroxypropan-2-yl)pyrimidin-2-yl)phenyl)amino)-N-(methyl-d3)pyridazine-3-carboxamide,
6-(cyclopropanecarboxamido)-4-((3-(5-(3-hydroxytetrahydrofuran-3-yl)pyrimidin-2-yl)-2-methoxyphenyl)amino)-N-(methyl-d3)pyridazine-3-carboxamide,
6-(cyclopropanecarboxamido)-4-((5-fluoro-3-(5-(1-fluoro-2-hydroxypropan-2-yl)pyrimidin-2-yl)-2-methoxyphenyl)amino)-N-(methyl-d3)pyridazine-3-carboxamide,
6-(cyclopropanecarboxamido)-4-((3-(5-(3-hydroxyoxetan-3-yl)pyrazin-2-yl)-2-methoxyphenyl)amino)-N-(methyl-d3)pyridazine-3-carboxamide,
6-(cyclopropanecarboxamido)-4-((3-(5-(3-hydroxytetrahydrofuran-3-yl)pyrazin-2-yl)-2-methoxyphenyl)amino)-N-(methyl-d3)pyridazine-3-carboxamide,
6-(cyclopropanecarboxamido)-4-((3-(5-(1-fluoro-2-hydroxypropan-2-yl)pyrazin-2-yl)-2-methoxyphenyl)amino)-N-(methyl-d3)pyridazine-3-carboxamide,
6-(Cyclopropanecarboxamido)-4-((3-(5-(dimethylcarbamoyl)pyrazin-2-yl)-2-methoxyphenyl)amino)-N-(methyl-d3)pyridazine-3-carboxamide,
(R)-6-(cyclopropanecarboxamido)-4-((3-(5-(3-fluoropyrrolidine-1-carbonyl)pyrazin-2-yl)-2-methoxyphenyl)amino)-N-(methyl-d3)pyridazine-3-carboxamide,
6-(cyclopropanecarboxamido)-4-((2-methoxy-3-(5-(morpholine-4-carbonyl)pyrazin-2-yl)phenyl)amino)-N-(methyl-d3)pyridazine-3-carboxamide,
6-(cyclopropanecarboxamido)-4-((2-methoxy-3-(5-(methylcarbamoyl)pyrazin-2-yl)phenyl)amino)-N-(methyl-d3)pyridazine-3-carboxamide,
4-((3-(5-(azetidine-1-carbonyl)pyrazin-2-yl)-2-methoxyphenyl)amino)-6-(cyclopropanecarboxamido)-N-(methyl-d3)pyridazine-3-carboxamide,
6-(cyclopropanecarboxamido)-4-((3-(6-(dimethylcarbamoyl)pyridazin-3-yl)-2-methoxyphenyl)amino)-N-(methyl-d3)pyridazine-3-carboxamide,
6-(cyclopropanecarboxamido)-4-((3-(6-(dimethylcarbamoyl)pyridazin-3-yl)-5-fluoro-2-methoxyphenyl)amino)-N-(methyl-d3)pyridazine-3-carboxamide,
6-(cyclopropanecarboxamido)-4-((3-(5-(dimethylcarbamoyl)pyridin-2-yl)-2-methoxyphenyl)amino)-N-(methyl-d3)pyridazine-3-carboxamide,
6-(cyclopropanecarboxamido)-4-((3-(5-(dimethylcarbamoyl)pyridin-2-yl)-5-fluoro-2-methoxyphenyl)amino)-N-(methyl-d3)pyridazine-3-carboxamide, 6-(cyclopropanecarboxamido)-4-((3-(5-(dimethylcarbamoyl)pyrimidin-2-yl)-2-methoxyphenyl)amino)-N-(methyl-d3)pyridazine-3-carboxamide, 6-(cyclopropanecarboxamido)-4-((2-methoxy-3-(5-(pyrrolidine-1-carbonyl)pyrimidin-2-yl)phenyl)amino)-N-(methyl-d3)pyridazine-3-carboxamide, 4-(3-(5-(azetidine-1-carbonyl)pyrimidin-2-yl)-2-methoxyphenyl)amino)-6-(cyclopropanecarboxamido)-N-(methyl-d3)pyridazine-3-carboxamide, 6-(cyclopropanecarboxamido)-4-((3-(4-(dimethylcarbamoyl)pyrimidin-2-yl)-2-methoxyphenyl)amino)-N-(methyl-d3)pyridazine-3-carboxamide, 6-(Cyclopropanecarboxamido)-4-((3-(5-(ethyl(methyl)carbamoyl)pyrimidin-2-yl)-2-methoxyphenyl)amino)-N-(methyl-d3)pyridazine-3-carboxamide, 6-(cyclopropanecarboxamido)-4-((3-(5-(diethylcarbamoyl)pyrimidin-2-yl)-2-methoxyphenyl)amino)-N-(methyl-d3)pyridazine-3-carboxamide, 6-(cyclopropanecarboxamido)-4-((3-(5-(cyclopropyl(methyl)carbamoyl) pyrimidin-2-yl)-2-methoxyphenyl)amino)-N-(methyl-d3)pyridazine-3-carboxamide, 6-(cyclopropanecarboxamido)-4-((3-(5-(dimethylcarbamoyl)pyrimidin-2-yl)-5-fluoro-2-methoxyphenyl)amino)-N-(methyl-d3)pyridazine-3-carboxamide, 6-(cyclopropanecarboxamido)-4-((3-(5-(ethyl(methyl)carbamoyl)pyrimidin-2-yl)-5-fluoro-2-methoxyphenyl)amino)-N-(methyl-d3)pyridazine-3-carboxamide, 6-(Cyclopropanecarboxamido)-4-((2-methoxy-3-(5-(tetrahydrofuran-3-yl)pyrimidin-2-yl)phenyl)amino)-N-(methyl-d3)pyridazine-3-carboxamide, 6-(Cyclopropanecarboxamido)-4-((2-methoxy-3-(5-(N-methylacetamido)pyrazin-2-yl)phenyl)amino)-N-(methyl-d3)pyridazine-3-carboxamide, 6-(Cyclopropanecarboxamido)-4-((2-methoxy-3-(5-morpholinopyrazin-2-yl)phenyl)amino)-N-(methyl-d3)pyridazine-3-carboxamide, 6-(cyclopropanecarboxamido)-4-((2-methoxy-3-(5-(4-methylpiperazin-1-yl)pyrazin-2-yl)phenyl)amino)-N-(methyl-d3)pyridazine-3-carboxamide, 4-(3-(5-(4-acetylpiperazin-1-yl)pyrazin-2-yl)-2-methoxyphenyl)amino)-6-(cyclopropanecarboxamido)-N-(methyl-d3)pyridazine-3-carboxamide, 4-(3-(5-(1H-1,2,4-triazol-1-yl)pyrazin-2-yl)-2-methoxyphenyl)amino)-6-(cyclopropanecarboxamido)-N-(methyl-d3)nicotinamide, 6-((5-Cyano-1-methyl-1H-pyrazol-3-yl)amino)-4-((2-methoxy-3-(pyrimidin-2-yl)phenyl)amino)-N-(methyl-d3)nicotinamide, 6-((5-cyano-1-methyl-1H-pyrazol-3-yl)amino)-4-((3-(5-fluoropyrimidin-2-yl)-2-methoxyphenyl)amino)-N-(methyl-d3)nicotinamide, 6-((1,5-dimethyl-1H-pyrazol-3-yl)amino)-4-((3-(5-fluoropyrimidin-2-yl)-2-methoxyphenyl)amino)-N-(methyl-d3)nicotinamide, 4-((3-(5-fluoropyrimidin-2-yl)-2-methoxyphenyl)amino)-N-(methyl-d3)-6-((1-methyl-5-(trifluoromethyl)-1H-pyrazol-3-yl)amino)nicotinamide, 4-((3-(5-fluoropyrimidin-2-yl)-2-methoxyphenyl)amino)-N-(methyl-d3)-6-((1-methyl-1H-pyrazol-3-yl)amino)nicotinamide, 6-((5-chloro-1-methyl-1H-pyrazol-3-yl)amino)-4-((3-(5-fluoropyrimidin-2-yl)-2-methoxyphenyl)amino)-N-(methyl-d3)nicotinamide, 6-((1-ethyl-1H-pyrazol-3-yl)amino)-4-((3-(5-fluoropyrimidin-2-yl)-2-methoxyphenyl)amino)-N-(methyl-d3)nicotinamide, 6-((1-cyclopropyl-1H-pyrazol-3-yl)amino)-4-((3-(5-fluoropyrimidin-2-yl)-2-methoxyphenyl)amino)-N-(methyl-d3)nicotinamide, 6-((1-cyclopropyl-1H-pyrazol-3-yl)amino)-4-((2-methoxy-3-(pyrimidin-2-yl)phenyl)amino)-N-(methyl-d3)nicotinamide, 4-((3-(5-fluoropyrimidin-2-yl)-2-methoxyphenyl)amino)-N-(methyl-d3)-6-(pyridin-2-ylamino)nicotinamide, 6-((5-cyanopyrazin-2-yl)amino)-4-((3-(5-fluoropyrimidin-2-yl)-2-methoxyphenyl)amino)-N-(methyl-d3)nicotinamide, 6-((5-cyanopyrazin-2-yl)amino)-4-((2-methoxy-3-(pyrimidin-2-yl)phenyl)amino)-N-(methyl-d3)nicotinamide, 6-((5-cyanopyrazin-2-yl)amino)-4-((3-(5-fluoropyrimidin-2-yl)-2-methoxyphenyl)amino)-N-(methyl-d3)nicotinamide, 4-((3-(5-fluoropyrimidin-2-yl)-2-methoxyphenyl)amino)-6-((6-methoxypyridazin-3-yl)amino)-N-(methyl-d3)nicotinamide, 4-((3-(5-fluoropyrimidin-2-yl)-2-methoxyphenyl)amino)-N-(methyl-d3)-6-((6-(trifluoromethyl)pyridazin-3-yl)amino)nicotinamide, 4-((2-methoxy-3-(pyrimidin-2-yl)phenyl)amino)-N-(methyl-d3)-6-((6-(trifluoromethyl)pyridazin-3-yl)amino)nicotinamide, 4-((3-(5-fluoropyrimidin-2-yl)-2-methoxyphenyl)amino)-N-(methyl-d3)-6-((1-methyl-6-oxo-1,6-dihydropyrimidin-4-yl)amino)nicotinamide, 6-((1-cyclopropyl-1H-pyrazol-3-yl)amino)-4-((3-(5-fluoropyrimidin-2-yl)-2-methoxyphenyl)amino)-N-(methyl-d3)pyridazine-3-carboxamide, 6-((5-cyano-1-methyl-1H-pyrazol-3-yl)amino)-4-((3-(5-fluoropyrimidin-2-yl)-2-methoxyphenyl)amino)-N-(methyl-d3)nicotinamide, 6-((5-cyano-1-methyl-1H-pyrazol-3-yl)amino)-4-((2-methoxy-3-(pyrimidin-2-yl)phenyl)amino)-N-(methyl-d3)pyridazine-3-carboxamide, 6-((5-(2-hydroxypropan-2-yl)-1-methyl-1H-pyrazol-3-yl)amino)-4-((2-methoxy-3-(pyrimidin-2-yl)phenyl)amino)-N-(methyl-d3)pyridazine-3-carboxamide, 4-((3-(5-fluoropyrimidin-2-yl)-2-methoxyphenyl)amino)-6-((5-(2-hydroxypropan-2-yl)-1-methyl-1H-pyrazol-3-yl)amino)-N-(methyl-d3)pyridazine-3-carboxamide, 4-((5-fluoro-3-(5-fluoropyrimidin-2-yl)-2-methoxyphenyl)amino)-6-((5-(2-hydroxypropan-2-yl)-1-methyl-1H-pyrazol-3-yl)amino)-N-(methyl-d3)pyridazine-3-carboxamide, 4-((5-fluoro-2-methoxy-3-(pyrimidin-2-yl)phenyl)amino)-6-((5-(2-hydroxypropan-2-yl)-1-methyl-1H-pyrazol-3-yl)amino)-N-(methyl-d3)pyridazine-3-carboxamide, 6-((5-(dimethylcarbamoyl)-1-methyl-1H-pyrazol-3-yl)amino)-4-((3-(5-fluoropyrimidin-2-yl)-2-methoxyphenyl)amino)-N-(methyl-d3)pyridazine-3-carboxamide, 6-((2-ethyl-2H-1,2,3-triazol-4-yl)amino)-4-((2-methoxy-3-(pyrimidin-2-yl)phenyl)amino)-N-(methyl-d3)pyridazine-3-carboxamide, 6-((2-ethyl-2H-1,2,3-triazol-4-yl)amino)-4-((3-(5-fluoropyrimidin-2-yl)-2-methoxyphenyl)amino)-N-(methyl-d3)pyridazine-3-carboxamide, 6-((1-ethyl-1H-1,2,3-triazol-4-yl)amino)-4-((2-methoxy-3-(pyrimidin-2-yl)phenyl)amino)-N-(methyl-d3)pyridazine-3-carboxamide, 6-((1-ethyl-1H-1,2,3-triazol-4-yl)amino)-4-((3-(5-fluoropyrimidin-2-yl)-2-methoxyphenyl)amino)-N-(methyl-d3)pyridazine-3-carboxamide, 4-((3-(5-fluoropyrimidin-2-yl)-2-methoxyphenyl)amino)-N-(methyl-d3)-6-((2-methyl-2H-1,2,3-triazol-4-yl) amino)pyridazine-3-carboxamide, 4-((3-(5-fluoropyrimidin-2-yl)-2-methoxyphenyl)amino)-N-(methyl-d3)-6-((1-methyl-1H-1,2,3-triazol-4-yl) amino)pyridazine-3-carboxamide 6-((1-ethyl-1H-1,2,3-triazol-4-yl)amino)-4-((5-fluoro-2-methoxy-3-(pyrimidin-2-yl)phenyl)amino)-N-(methyl-d3)pyridazine-3-carboxamide, 4-((5-fluoro-2-methoxy-3-(pyrimidin-2-yl)phenyl)amino)-N-(methyl-d3)-6-((1-methyl-1H-1,2,3-triazol-4-yl) amino)pyridazine-3-carboxamide, 4-((3-(5-fluoropyrimidin-2-yl)-2-methoxyphenyl)amino)-N-(methyl-d3)-6-((6-methylpyridazin-3-yl)amino) pyridazine-3-carboxamide, 6-((6-cyanopyridazin-3-yl)amino)-4-((3-(5-fluoropyrimidin-2-yl)-2-methoxyphenyl)amino)-N-(methyl-d3) pyridazine-3-carboxamide, 4-((2-methoxy-3-(pyrimidin-2-yl)phenyl)amino)-6-((6-methoxypyridazin-3-yl)amino)-N-(methyl-d3) pyridazine-3-carboxamide, 4-((3-(5-fluoropyrimidin-2-yl)-2-methoxyphenyl)amino)-6-((6-methoxypyridazin-3-yl)amino)-N-(methyl-d3) pyridazine-3-carboxamide, 4-((3-(5-fluoropyrimidin-2-yl)-2-methoxyphenyl)amino)-N-(methyl-d3)-6-((6-(trifluoromethyl)pyridazin-3-yl) amino)pyridazine-3-carboxamide, 4-((2-methoxy-3-(pyrimidin-2-yl)phenyl)amino)-N-(methyl-d3)-6-((6-(trifluoromethyl)pyridazin-3-yl) amino)pyridazine-3-carboxamide, 6-((6-cyclopropylpyridazin-3-yl)amino)-4-((3-(5-fluoropyrimidin-2-yl)-2-methoxyphenyl)amino)-N-(methyl-d3) pyridazine-3-carboxamide, 6-(cinnolin-3-ylamino)-4-((3-(5-fluoropyrimidin-2-yl)-2-methoxyphenyl)amino)-N-(methyl-d3)pyridazine-3-carboxamide, 4-((3-(5-fluoropyrimidin-2-yl)-2-methoxyphenyl)amino)-6-((5-(2-hydroxypropan-2-yl)pyrazin-2-yl)amino)-N-(methyl-d3)pyridazine-3-carboxamide, 4-((3-(5-fluoropyrimidin-2-yl)-2-methoxyphenyl)amino)-6-((4-(2-hydroxypropan-2-yl)pyridin-2-yl)amino)-N-(methyl-d3)pyridazine-3-carboxamide, 4-((3-(5-fluoropyrimidin-2-yl)-2-methoxyphenyl)amino)-6-((5-(2-hydroxypropan-2-yl)pyridin-2-yl)amino)-N-(methyl-d3)pyridazine-3-carboxamide, 4-((5-fluoro-2-methoxy-3-(pyrimidin-2-yl)phenyl)amino)-6-((5-(2-hydroxypropan-2-yl)pyridin-2-yl)amino)-N-(methyl-d3)pyridazine-3-carboxamide, 4-((5-fluoro-2-methoxy-3-(pyrimidin-2-yl)phenyl)amino)-6-((4-(2-hydroxypropan-2-yl)pyridin-2-yl)amino)-N-(methyl-d3)pyridazine-3-carboxamide, 4-((3-(5-fluoropyrimidin-2-yl)-2-methoxyphenyl)amino)-N-(methyl-d3)-6-((1-methyl-6-oxo-1,6-dihydropyrimidin-4-yl)amino)pyridazine-3-carboxamide, 4-((3-(5-Fluoropyrimidin-2-yl)-2-methoxyphenyl)amino)-N-(methyl-d3)-6-((5-methyl-4-oxo-4,5,6,7-tetrahydropyrazolo[1,5-a]pyrazin-2-yl)amino)pyridazine-3-carboxamide, 4-((2-Methoxy-3-(pyrimidin-2-yl)phenyl)amino)-N-(methyl-d3)-6-((5-methyl-4-oxo-4,5,6,7-tetrahydropyrazolo[1,5-a]pyrazin-2-yl)amino)pyridazine-3-carboxamide, or 6-((5-cyclopropyl-4-oxo-4,5,6,7-tetrahydropyrazolo[1,5-a]pyrazin-2-yl)amino)-4-((3-(5-fluoropyrimidin-2-yl)-2-methoxyphenyl)amino)-N-(methyl-d3)pyridazine-3-carboxamide.

In another embodiment, there is provided a pharmaceutical composition comprising one or more compounds of formula I and a pharmaceutically acceptable carrier or diluent.

The present invention is also directed to pharmaceutical compositions useful in treating diseases associated with the modulation of IL-12, IL-23 and/or IFNα by acting on Tyk-2 to cause signal transduction inhibition, comprising compounds of formula I, or pharmaceutically-acceptable salts thereof, and pharmaceutically-acceptable carriers or diluents.

The invention further relates to methods of treating diseases associated with the modulation of IL-12, IL-23, and/or IFNα, comprising administering to a patient in need of such treatment a therapeutically-effective amount of a compound according to formula I.

The present invention also provides processes and intermediates for making the compounds of the present invention.

The present invention also provides a method for treating proliferative, metabolic, allergic, autoimmune and inflammatory diseases (or use of the compounds of the present invention for the manufacture of a medicament for the treatment of these diseases), comprising administering to a host in need of such treatment a therapeutically effective amount of at least one of the compounds of the present invention.

The present invention also provides a method of treating an inflammatory or autoimmune disease (or use of the compounds of the present invention for the manufacture of a medicament for the treatment of these diseases) comprising administering to a patient in need of such treatment a therapeutically-effective amount of a compound of Formula I.

The present invention also provides a method for treating a disease (or use of the compounds of the present invention for the manufacture of a medicament for the treatment of these diseases), comprising administering to a patient in need of such treatment a therapeutically-effective amount of a compound of Formula I, wherein the disease is rheumatoid arthritis, multiple sclerosis, systemic lupus erythematosus (SLE), lupus nephritis, cutaneous lupus, inflammatory bowel disease, psoriasis, Crohn's Disease, psoriatic arthritis, Sjögren's syndrome, systemic scleroderma, ulcerative colitis, Graves' disease, discoid lupus erythematosus, adult onset Stills, systemic onset juvenile idiopathic arthritis, gout, gouty arthritis, type 1 diabetes, insulin dependent diabetes mellitus, sepsis, septic shock, Shigellosis, pancreatitis (acute or chronic), glomerulonephritis, autoimmune gastritis, diabetes, autoimmune hemolytic anemia, autoimmune neutropenia, thrombocytopenia, atopic dermatitis, myasthenia gravis, pancreatitis (acute or chronic), ankylosing spondylitis, pemphigus vulgaris, Goodpasture's disease, antiphospholipid syndrome, idiopathic thrombocytopenia, ANCA-associated vasculitis, pemphigus, Kawasaki disease, Chronic Inflammatory Demyelinating Polyneuropathy (CIDP), dermatomyositis, polymyositis, uveitis, Guillain-Barre syndrome, autoimmune pulmonary inflammation, autoimmune thyroiditis, autoimmune inflammatory eye disease, and chronic demyelinating polyneuropathy.

The present invention also provides a method of treating an inflammatory or autoimmune disease (or use of the compounds of the present invention for the manufacture of a medicament for the treatment of said diseases), comprising administering to a patient in need of such treatment a therapeutically-effective amount of a compound of Formula I, wherein the disease is selected from systemic lupus erythematosus (SLE), lupus nephritis, cutaneous lupus, Crohn's Disease, ulcerative colitis, type 1 diabetes, psoriasis, rheumatoid arthritis, systemic onset juvenile idiopathic arthritis, ankylosing spondylitis, and multiple sclerosis.

The present invention also provides a method for treating a rheumatoid arthritis (or use of the compounds of the present invention for the manufacture of a medicament for the treatment of rheumatoid arthritis, comprising administering to a patient in need of such treatment a therapeutically-effective amount of a compound of Formula I.

In addition, the present invention also provides a method of treating a condition (or use of the compounds of the present invention for the manufacture of a medicament for the treatment of these conditions) comprising administering to a patient in need of such treatment a therapeutically-effective amount of a compound of Formula I, wherein the condition is selected from acute myelogenous leukemia, chronic myelogenous leukemia, metastatic melanoma, Kaposi's sarcoma, multiple myeloma, solid tumors, ocular neovasculization, and infantile haemangiomas, B cell lymphoma, systemic lupus erythematosus (SLE), rheumatoid arthritis, psoriatic arthritis, multiple vasculitides, idiopathic thrombocytopenic purpura (ITP), myasthenia gravis, allergic rhinitis, multiple sclerosis (MS), transplant rejection, Type I diabetes, membranous nephritis, inflammatory bowel disease, autoimmune hemolytic anemia, autoimmune thyroiditis, cold and warm agglutinin diseases, Evans syndrome, hemolytic uremic syndrome/thrombotic thrombocytopenic purpura (HUS/TTP), sarcoidosis, Sjögren's syndrome, peripheral neuropathies, pemphigus vulgaris and asthma.

The present invention also provides a method of treating an IL-12, IL-23, and/or IFNα mediated disease (or use of the compounds of the present invention for the manufacture of a medicament for the treatment of these diseases), comprising administering to a patient in need of such treatment a therapeutically-effective amount of a compound of formula I.

The present invention also provides a method of treating an IL-12, IL-23 and/or IFNα mediated disease (or use of the compounds of the present invention for the manufacture of a medicament for the treatment of these diseases), comprising administering to a patient in need of such treatment a therapeutically-effective amount of a compound of formula I, wherein the IL-12, IL-23 and/or IFNα mediated disease is a disease modulated by IL-12, IL-23 and/or IFNα.

The present invention also provides a method of treating diseases, comprising administering to a patient in need of such treatment a therapeutically-effective amount of a compound of formula I in combination with other therapeutic agents.

The present invention also provides the compounds of the present invention for use in therapy.

In another embodiment, compounds of formula I are selected from exemplified compounds or combinations of exemplified compounds or other embodiments herein.

In another embodiment are compounds having an $IC_{50}<1000$ nM in at least one of the assays described below.

The present invention may be embodied in other specific forms without departing from the spirit or essential attributes thereof. This invention encompasses all combinations of preferred aspects and/or embodiments of the invention noted herein. It is understood that any and all embodiments of the present invention may be taken in conjunction with any other embodiment or embodiments to describe additional more preferred embodiments. It is also to be understood that each individual element of the preferred embodiments is its own independent preferred embodiment. Furthermore, any element of an embodiment is meant to be combined with any and all other elements from any embodiment to describe an additional embodiment.

DETAILED DESCRIPTION OF THE INVENTION

The following are definitions of terms used in this specification and appended claims. The initial definition provided for a group or term herein applies to that group or term throughout the specification and claims, individually or as part of another group, unless otherwise indicated.

Compounds of this invention may have one or more asymmetric centers. Unless otherwise indicated, all chiral (enantiomeric and diastereomeric) and racemic forms of compounds of the present invention are included in the present invention. Many geometric isomers of olefins, C=N double bonds, and the like can also be present in the compounds, and all such stable isomers are contemplated in the present invention. Cis- and trans-geometric isomers of the compounds of the present invention are described and may be isolated as a mixture of isomers or as separated isomeric forms. The present compounds can be isolated in optically active or racemic forms. It is well known in the art how to prepare optically active forms, such as by resolution of racemic forms or by synthesis from optically active starting materials. All chiral, (enantiomeric and diastereomeric) and racemic forms and all geometric isomeric forms of a structure are intended, unless the specific stereochemistry or isomer form is specifically indicated.

When any variable (e.g., $R^3$) occurs more than one time in any constituent or formula for a compound, its definition at each occurrence is independent of its definition at every other occurrence. Thus, for example, if a group is shown to be substituted with 0-2 $R^3$, then said group may optionally be substituted with up to two $R^3$ groups and $R^3$ at each occurrence is selected independently from the definition of $R^3$. Also, combinations of substituents and/or variables are permissible only if such combinations result in stable compounds.

When a bond to a substituent is shown to cross a bond connecting two atoms in a ring, then such substituent may be bonded to any atom on the ring. When a substituent is listed without indicating the atom via which such substituent is bonded to the rest of the compound of a given formula, then such substituent may be bonded via any atom in such substituent. Combinations of substituents and/or variables are permissible only if such combinations result in stable compounds.

In cases wherein there are nitrogen atoms (e.g., amines) on compounds of the present invention, these can be converted to N-oxides by treatment with an oxidizing agent (e.g., MCPBA and/or hydrogen peroxides) to afford other compounds of this invention. Thus, all shown and claimed nitrogen atoms are considered to cover both the shown nitrogen and its N-oxide (N→O) derivative.

In accordance with a convention used in the art,

is used in structural formulas herein to depict the bond that is the point of attachment of the moiety or substituent to the core or backbone structure.

A dash "-" that is not between two letters or symbols is used to indicate a point of attachment for a substituent. For example, —CONH$_2$ is attached through the carbon atom.

The term "optionally substituted" in reference to a particular moiety of the compound of Formula I (e.g., an optionally substituted heteroaryl group) refers to a moiety having 0, 1, 2, or more substituents. For example, "optionally substituted alkyl" encompasses both "alkyl" and "substituted alkyl" as defined below. It will be understood by those skilled in the art, with respect to any group containing one or more substituents, that such groups are not intended to introduce any substitution or substitution patterns that are sterically impractical, synthetically non-feasible and/or inherently unstable.

As used herein, the term "at least one chemical entity" is interchangeable with the term "a compound".

As used herein, the term "alkyl" or "alkylene" is intended to include both branched and straight-chain saturated aliphatic hydrocarbon groups having the specified number of carbon atoms. For example, "$C_{1-10}$ alkyl" (or alkylene), is intended to include $C_1$, $C_2$, $C_3$, $C_4$, $C_5$, $C_6$, $C_7$, $C_8$, $C_9$, and $C_{10}$ alkyl groups. Additionally, for example, "$C_1$-$C_6$ alkyl" denotes alkyl having 1 to 6 carbon atoms. Alkyl groups can be unsubstituted or substituted so that one or more of its hydrogens are replaced by another chemical group. Example alkyl groups include, but are not limited to, methyl (Me), ethyl (Et), propyl (e.g., n-propyl and isopropyl), butyl (e.g., n-butyl, isobutyl, t-butyl), pentyl (e.g., n-pentyl, isopentyl, neopentyl), and the like.

"Alkenyl" or "alkenylene" is intended to include hydrocarbon chains of either straight or branched configuration and having one or more double carbon-carbon bonds that may occur in any stable point along the chain. For example, "$C_{2-6}$ alkenyl" (or alkenylene), is intended to include $C_2$, $C_3$, $C_4$, $C_5$, and $C_6$ alkenyl groups. Examples of alkenyl include, but are not limited to, ethenyl, 1-propenyl, 2-propenyl, 2-butenyl, 3-butenyl, 2-pentenyl, 3-pentenyl, 4-pentenyl, 2-hexenyl, 3-hexenyl, 4-hexenyl, 5-hexenyl, 2-methyl-2-propenyl, 4-methyl-3-pentenyl, and the like.

"Alkynyl" or "alkynylene" is intended to include hydrocarbon chains of either straight or branched configuration and having one or more triple carbon-carbon bonds that may occur in any stable point along the chain. For example, "$C_{2-6}$ alkynyl" (or alkynylene), is intended to include $C_2$, $C_3$, $C_4$, $C_5$, and $C_6$ alkynyl groups; such as ethynyl, propynyl, butynyl, pentynyl, hexynyl and the like.

One skilled in the field will understand that, when the designation "CO$_2$" is used herein, this is intended to refer to the group

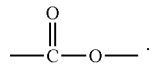

When the term "alkyl" is used together with another group, such as in "arylalkyl", this conjunction defines with more specificity at least one of the substituents that the substituted alkyl will contain. For example, "arylalkyl" refers to a substituted alkyl group as defined above where at least one of the substituents is an aryl, such as benzyl. Thus, the term aryl(C$_{0-4}$)alkyl includes a substituted lower alkyl having at least one aryl substituent and also includes an aryl directly bonded to another group, i.e., aryl(C$_0$)alkyl. The term "heteroarylalkyl" refers to a substituted alkyl group as defined above where at least one of the substituents is a heteroaryl.

When reference is made to a substituted alkenyl, alkynyl, alkylene, alkenylene, or alkynylene group, these groups are substituted with one to three substituents as defined above for substituted alkyl groups.

The term "alkoxy" refers to an oxygen atom substituted by alkyl or substituted alkyl, as defined herein. For example, the term "alkoxy" includes the group —O—C$_{1-6}$alkyl such as methoxy, ethoxy, propoxy, isopropoxy, n-butoxy, sec-butoxy, tert-butoxy, pentoxy, 2-pentyloxy, isopentoxy, neopentoxy, hexoxy, 2-hexoxy, 3-hexoxy, 3-methylpentoxy, and the like. "Lower alkoxy" refers to alkoxy groups having one to four carbons.

It should be understood that the selections for all groups, including for example, alkoxy, thioalkyl, and aminoalkyl, will be made by one skilled in the field to provide stable compounds.

The term "substituted", as used herein, means that any one or more hydrogens on the designated atom or group is replaced with a selection from the indicated group, provided that the designated atom's normal valence is not exceeded. When a substituent is oxo, or keto, (i.e., =O) then 2 hydrogens on the atom are replaced. Keto substituents are not present on aromatic moieties. Unless otherwise specified, substituents are named into the core structure. For example, it is to be understood that when (cycloalkyl)alkyl is listed as a possible substituent, the point of attachment of this substituent to the core structure is in the alkyl portion. Ring double bonds, as used herein, are double bonds that are formed between two adjacent ring atoms (e.g., C=C, C=N, or N=N).

Combinations of substituents and/or variables are permissible only if such combinations result in stable compounds or useful synthetic intermediates. A stable compound or stable structure is meant to imply a compound that is sufficiently robust to survive isolation from a reaction mixture to a useful degree of purity, and subsequent formulation into an efficacious therapeutic agent. It is preferred that the presently recited compounds do not contain a N-halo, S(O)$_2$H, or S(O)H group.

The term "cycloalkyl" refers to cyclized alkyl groups, including mono-, bi- or poly-cyclic ring systems. $C_{3-7}$ cycloalkyl is intended to include $C_3$, $C_4$, $C_5$, $C_6$, and $C_7$ cycloalkyl groups. Example cycloalkyl groups include, but are not limited to, cyclopropyl, cyclobutyl, cyclopentyl, cyclohexyl, norbornyl, and the like. As used herein, "carbocycle" or "carbocyclic residue" is intended to mean any stable 3-, 4-, 5-, 6-, or 7-membered monocyclic or bicyclic or 7-, 8-, 9-, 10-, 11-, 12-, or 13-membered bicyclic or tricyclic ring, any of which may be saturated, partially unsaturated, unsaturated or aromatic. Examples of such carbocycles include, but are not limited to, cyclopropyl, cyclobutyl, cyclobutenyl, cyclopentyl, cyclopentenyl, cyclohexyl, cycloheptenyl, cycloheptyl, cycloheptenyl, adamantyl, cyclooctyl, cyclooctenyl, cyclooctadienyl, [3.3.0]bicyclooctane, [4.3.0]bicyclononane, [4.4.0]bicyclodecane, [2.2.2]bicyclooctane, fluorenyl, phenyl, naphthyl, indanyl, adamantyl, anthracenyl, and tetrahydronaphthyl (tetralin). As shown above, bridged rings are also included in the definition of carbocycle (e.g., [2.2.2]bicyclooctane). Preferred carbocycles, unless otherwise specified, are cyclopropyl, cyclobutyl, cyclopentyl, cyclohexyl, and phenyl. When the term "carbocycle" is used, it is intended to include "aryl". A bridged ring occurs when one or more carbon atoms link two non-adjacent carbon atoms. Preferred bridges are one or two carbon atoms. It is noted that a bridge always converts a monocyclic ring into a bicyclic ring. When a ring is bridged, the substituents recited for the ring may also be present on the bridge.

The term "aryl" refers to monocyclic or bicyclic aromatic hydrocarbon groups having 6 to 12 carbon atoms in the ring portion, such as phenyl, and naphthyl groups, each of which may be substituted.

Accordingly, in compounds of formula I, the term "cycloalkyl" includes cyclopropyl, cyclobutyl, cyclopentyl, cyclohexyl, cycloheptyl, bicyclooctyl, etc., as well as the following ring systems:

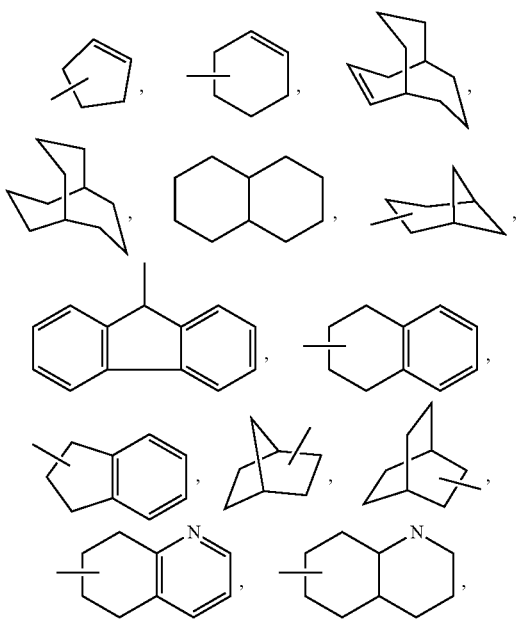

and the like, which optionally may be substituted at any available atoms of the ring(s).

Preferred cycloalkyl groups include cyclopropyl, cyclobutyl, cyclopentyl, and cyclohexyl.

The term "halo" or "halogen" refers to chloro, bromo, fluoro and iodo.

The term "haloalkyl" means a substituted alkyl having one or more halo substituents. For example, "haloalkyl" includes mono, bi, and trifluoromethyl.

The term "haloalkoxy" means an alkoxy group having one or more halo substituents. For example, "haloalkoxy" includes $OCF_3$.

The terms "heterocycle", "heterocycloalkyl", "heterocyclo", "heterocyclic", or "heterocyclyl" may be used interchangeably and refer to substituted and unsubstituted 3- to 7-membered monocyclic groups, 7- to 11-membered bicyclic groups, and 10- to 15-membered tricyclic groups, in which at least one of the rings has at least one heteroatom (O, S or N), said heteroatom containing ring preferably having 1, 2, or 3 heteroatoms selected from O, S, and N. Each ring of such a group containing a heteroatom can contain one or two oxygen or sulfur atoms and/or from one to four nitrogen atoms provided that the total number of heteroatoms in each ring is four or less, and further provided that the ring contains at least one carbon atom. The nitrogen and sulfur atoms may optionally be oxidized and the nitrogen atoms may optionally be quaternized. The fused rings completing the bicyclic and tricyclic groups may contain only carbon atoms and may be saturated, partially saturated, or fully unsaturated. The heterocyclo group may be attached at any available nitrogen or carbon atom. As used herein the terms "heterocycle", "heterocycloalkyl", "heterocyclo", "heterocyclic", and "heterocyclyl" include "heteroaryl" groups, as defined below.

In addition to the heteroaryl groups described below, exemplary monocyclic heterocyclyl groups include azetidinyl, pyrrolidinyl, oxetanyl, imidazolinyl, oxazolidinyl, isoxazolinyl, thiazolidinyl, isothiazolidinyl, tetrahydrofuranyl, piperidyl, piperazinyl, 2-oxopiperazinyl, 2-oxopiperidyl, 2-oxopyrrolodinyl, 2-oxoazepinyl, azepinyl, 1-pyridonyl, 4-piperidonyl, tetrahydropyranyl, morpholinyl, thiamorpholinyl, thiamorpholinyl sulfoxide, thiamorpholinyl sulfone, 1,3-dioxolane and tetrahydro-1,1-dioxothienyl and the like. Exemplary bicyclic heterocyclo groups include quinuclidinyl. Additional monocyclic heterocyclyl groups include

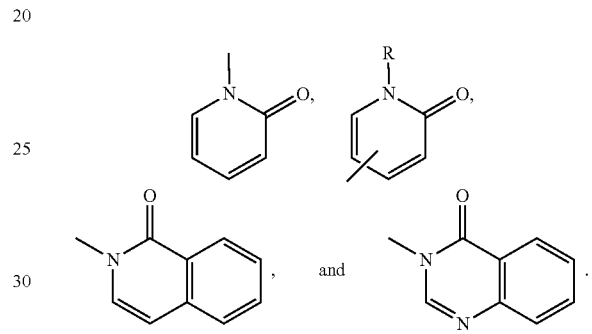

The term "heteroaryl" refers to substituted and unsubstituted aromatic 5- or 6-membered monocyclic groups, 9- or 10-membered bicyclic groups, and 11- to 14-membered tricyclic groups which have at least one heteroatom (O, S or N) in at least one of the rings, said heteroatom-containing ring preferably having 1, 2, or 3 heteroatoms selected from O, S, and N. Each ring of the heteroaryl group containing a heteroatom can contain one or two oxygen or sulfur atoms and/or from one to four nitrogen atoms provided that the total number of heteroatoms in each ring is four or less and each ring has at least one carbon atom. The fused rings completing the bicyclic and tricyclic groups may contain only carbon atoms and may be saturated, partially saturated, or unsaturated. The nitrogen and sulfur atoms may optionally be oxidized and the nitrogen atoms may optionally be quaternized. Heteroaryl groups which are bicyclic or tricyclic must include at least one fully aromatic ring but the other fused ring or rings may be aromatic or non-aromatic. The heteroaryl group may be attached at any available nitrogen or carbon atom of any ring. As valence allows, if said further ring is cycloalkyl or heterocyclo it is additionally optionally substituted with =O (oxo).

Exemplary monocyclic heteroaryl groups include pyrrolyl, pyrazolyl, pyrazolinyl, imidazolyl, oxazolyl, isoxazolyl, thiazolyl, thiadiazolyl, isothiazolyl, furanyl, thienyl, oxadiazolyl, pyridyl, pyrazinyl, pyrimidinyl, pyridazinyl, triazinyl and the like.

Exemplary bicyclic heteroaryl groups include indolyl, benzothiazolyl, benzodioxolyl, benzoxazolyl, benzothienyl, quinolinyl, tetrahydroisoquinolinyl, isoquinolinyl, benzimidazolyl, benzopyranyl, indolizinyl, benzofuranyl, chromonyl, coumarinyl, benzopyranyl, cinnolinyl, quinoxalinyl, indazolyl, pyrrolopyridyl, furopyridyl, dihydroisoindolyl, tetrahydroquinolinyl and the like.

Exemplary tricyclic heteroaryl groups include carbazolyl, benzindolyl, phenanthrolinyl, acridinyl, phenanthridinyl, xanthenyl and the like.

In compounds of formula I, preferred heteroaryl groups include:

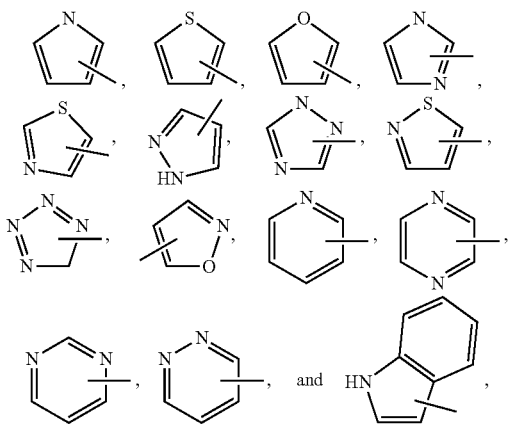

and the like, which optionally may be substituted at any available carbon or nitrogen atom.

Unless otherwise indicated, when reference is made to a specifically-named aryl (e.g., phenyl), cycloalkyl (e.g., cyclohexyl), heterocyclo (e.g., pyrrolidinyl, piperidinyl, and morpholinyl) or heteroaryl (e.g., tetrazolyl, imidazolyl, pyrazolyl, triazolyl, thiazolyl, and furyl) the reference is intended to include rings having 0 to 3, preferably 0 to 2, substituents selected from those recited above for the aryl, cycloalkyl, heterocyclo and/or heteroaryl groups, as appropriate.

The term "carbocyclyl" or "carbocyclic" refers to a saturated or unsaturated monocyclic or bicyclic ring in which all atoms of all rings are carbon. Thus, the term includes cycloalkyl and aryl rings. Monocyclic carbocycles have 3 to 6 ring atoms, still more typically 5 or 6 ring atoms. Bicyclic carbocycles have 7 to 12 ring atoms, e.g., arranged as a bicyclo [4,5], [5,5], [5,6] or [6,6] system, or 9 or 10 ring atoms arranged as a bicyclo [5,6] or [6,6] system. Examples of mono- and bicyclic carbocycles include cyclopropyl, cyclobutyl, cyclopentyl, 1-cyclopent-1-enyl, 1-cyclopent-2-enyl, 1-cyclopent-3-enyl, cyclohexyl, 1-cyclohex-1-enyl, 1-cyclohex-2-enyl, 1-cyclohex-3-enyl, phenyl and naphthyl. The carbocyclic ring may be substituted in which case the substituents are selected from those recited above for cycloalkyl and aryl groups.

The term "heteroatoms" shall include oxygen, sulfur and nitrogen.

When the term "unsaturated" is used herein to refer to a ring or group, the ring or group may be fully unsaturated or partially unsaturated.

Throughout the specification, groups and substituents thereof may be chosen by one skilled in the field to provide stable moieties and compounds and compounds useful as pharmaceutically-acceptable compounds and/or intermediate compounds useful in making pharmaceutically-acceptable compounds.

The compounds of formula I may exist in a free form (with no ionization) or can form salts which are also within the scope of this invention. Unless otherwise indicated, reference to an inventive compound is understood to include reference to the free form and to salts thereof. The term "salt(s)" denotes acidic and/or basic salts formed with inorganic and/or organic acids and bases. In addition, the term "salt(s)" may include zwitterions (inner salts), e.g., when a compound of formula I, contains both a basic moiety, such as an amine or a pyridine or imidazole ring, and an acidic moiety, such as a carboxylic acid. Pharmaceutically acceptable (i.e., non-toxic, physiologically acceptable) salts are preferred, such as, for example, acceptable metal and amine salts in which the cation does not contribute significantly to the toxicity or biological activity of the salt. However, other salts may be useful, e.g., in isolation or purification steps which may be employed during preparation, and thus, are contemplated within the scope of the invention. Salts of the compounds of the formula I may be formed, for example, by reacting a compound of the formula I with an amount of acid or base, such as an equivalent amount, in a medium such as one in which the salt precipitates or in an aqueous medium followed by lyophilization.

Exemplary acid addition salts include acetates (such as those formed with acetic acid or trihaloacetic acid, for example, trifluoroacetic acid), adipates, alginates, ascorbates, aspartates, benzoates, benzenesulfonates, bisulfates, borates, butyrates, citrates, camphorates, camphorsulfonates, cyclopentanepropionates, digluconates, dodecylsulfates, ethanesulfonates, fumarates, glucoheptanoates, glycerophosphates, hemisulfates, heptanoates, hexanoates, hydrochlorides (formed with hydrochloric acid), hydrobromides (formed with hydrogen bromide), hydroiodides, 2-hydroxyethanesulfonates, lactates, maleates (formed with maleic acid), methanesulfonates (formed with methanesulfonic acid), 2-naphthalenesulfonates, nicotinates, nitrates, oxalates, pectinates, persulfates, 3-phenylpropionates, phosphates, picrates, pivalates, propionates, salicylates, succinates, sulfates (such as those formed with sulfuric acid), sulfonates (such as those mentioned herein), tartrates, thiocyanates, toluenesulfonates such as tosylates, undecanoates, and the like.

Exemplary basic salts include ammonium salts, alkali metal salts such as sodium, lithium, and potassium salts; alkaline earth metal salts such as calcium and magnesium salts; barium, zinc, and aluminum salts; salts with organic bases (for example, organic amines) such as trialkylamines such as triethylamine, procaine, dibenzylamine, N-benzyl-β-phenethylamine, 1-ephenamine, N,N'-dibenzylethylenediamine, dehydroabietylamine, N-ethylpiperidine, benzylamine, dicyclohexylamine or similar pharmaceutically acceptable amines and salts with amino acids such as arginine, lysine and the like. Basic nitrogen-containing groups may be quaternized with agents such as lower alkyl halides (e.g., methyl, ethyl, propyl, and butyl chlorides, bromides and iodides), dialkyl sulfates (e.g., dimethyl, diethyl, dibutyl, and diamyl sulfates), long chain halides (e.g., decyl, lauryl, myristyl and stearyl chlorides, bromides and iodides), aralkyl halides (e.g., benzyl and phenethyl bromides), and others. Preferred salts include monohydrochloride, hydrogensulfate, methanesulfonate, phosphate or nitrate salts.

The phrase "pharmaceutically acceptable" is employed herein to refer to those compounds, materials, compositions, and/or dosage forms which are, within the scope of sound medical judgment, suitable for use in contact with the tissues of human beings and animals without excessive toxicity, irritation, allergic response, or other problem or complication, commensurate with a reasonable benefit/risk ratio.

As used herein, "pharmaceutically-acceptable salts" refer to derivatives of the disclosed compounds wherein the parent compound is modified by making acid or base salts thereof. Examples of pharmaceutically-acceptable salts include, but are not limited to, mineral or organic acid salts of basic groups such as amines; and alkali or organic salts of acidic groups such as carboxylic acids. The pharmaceutically-acceptable salts include the conventional non-toxic salts or the quaternary ammonium salts of the parent compound formed, for example, from non-toxic inorganic or organic acids. For example, such conventional non-toxic salts include those derived from inorganic acids such as hydrochloric, hydrobromic, sulfuric, sulfamic, phosphoric, and nitric; and the salts prepared from organic acids such as acetic, propionic, succinic, glycolic, stearic, lactic, malic, tartaric, citric, ascorbic, pamoic, maleic, hydroxymaleic, phenylacetic, glutamic, benzoic, salicylic, sulfanilic, 2-acetoxybenzoic, fumaric, toluenesulfonic, methanesulfonic, ethane disulfonic, oxalic, and isethionic, and the like.

The pharmaceutically-acceptable salts of the present invention can be synthesized from the parent compound which contains a basic or acidic moiety by conventional chemical methods. Generally, such salts can be prepared by reacting the free acid or base forms of these compounds with a stoichiometric amount of the appropriate base or acid in water or in an organic solvent, or in a mixture of the two; generally, nonaqueous media like ether, ethyl acetate, ethanol, isopropanol, or acetonitrile are preferred. Lists of suitable salts are found in *Remington's Pharmaceutical Sciences,* 18th Edition, Mack Publishing Company, Easton, PA (1990), the disclosure of which is hereby incorporated by reference.

All stereoisomers of the compounds of the instant invention are contemplated, either in admixture or in pure or substantially pure form. Stereoisomers may include compounds which are optical isomers through possession of one or more chiral atoms, as well as compounds which are optical isomers by virtue of limited rotation about one or more bonds (atropisomers). The definition of compounds according to the invention embraces all the possible stereoisomers and their mixtures. It very particularly embraces the racemic forms and the isolated optical isomers having the specified activity. The racemic forms can be resolved by physical methods, such as, for example, fractional crystallization, separation or crystallization of diastereomeric derivatives or separation by chiral column chromatography. The individual optical isomers can be obtained from the racemates from the conventional methods, such as, for example, salt formation with an optically active acid followed by crystallization.

The present invention is intended to include all isotopes of atoms occurring in the present compounds. Isotopes include those atoms having the same atomic number but different mass numbers. By way of general example and without limitation, isotopes of hydrogen include deuterium and tritium. Isotopes of carbon include $^{13}C$ and $^{14}C$. Isotopically-labeled compounds of the invention can generally be prepared by conventional techniques known to those skilled in the art or by processes analogous to those described herein, using an appropriate isotopically-labeled reagent in place of the non-labeled reagent otherwise employed.

Prodrugs and solvates of the inventive compounds are also contemplated. The term "prodrug" denotes a compound which, upon administration to a subject, undergoes chemical conversion by metabolic or chemical processes to yield a compound of the formula I, and/or a salt and/or solvate thereof. Any compound that will be converted in vivo to provide the bioactive agent (i.e., the compound for formula I) is a prodrug within the scope and spirit of the invention. For example, compounds containing a carboxy group can form physiologically hydrolyzable esters which serve as prodrugs by being hydrolyzed in the body to yield formula I compounds per se. Such prodrugs are preferably administered orally since hydrolysis in many instances occurs principally under the influence of the digestive enzymes. Parenteral administration may be used where the ester per se is active, or in those instances where hydrolysis occurs in the blood. Examples of physiologically hydrolyzable esters of compounds of formula I include $C_{1-6}$alkylbenzyl, 4-methoxybenzyl, indanyl, phthalyl, methoxymethyl, $C_{1-6}$alkanoyloxy-$C_{1-6}$alkyl, e.g., acetoxymethyl, pivaloyloxymethyl or propionyloxymethyl, $C_{1-6}$alkoxycarbonyloxy-$C_{1-6}$alkyl, e.g., methoxycarbonyl-oxymethyl or ethoxycarbonyloxymethyl, glycyloxymethyl, phenylglycyloxymethyl, (5-methyl-2-oxo-1,3-dioxolen-4-yl)-methyl and other well known physiologically hydrolyzable esters used, for example, in the penicillin and cephalosporin arts. Such esters may be prepared by conventional techniques known in the art.

Various forms of prodrugs are well known in the art. For examples of such prodrug derivatives, see:
a) Bundgaard, H., ed., *Design of Prodrugs*, Elsevier (1985), and Widder, K. et al., eds., *Methods in Enzymology,* 112:309-396, Academic Press (1985);
b) Bundgaard, H., Chapter 5, "Design and Application of Prodrugs", Krosgaard-Larsen, P. et al., eds., *A Textbook of Drug Design and Development*, pp. 113-191, Harwood Academic Publishers (1991); and
c) Bundgaard, H., *Adv. Drug Deliv. Rev.,* 8:1-38 (1992), each of which is incorporated herein by reference.

Compounds of the formula I and salts thereof may exist in their tautomeric form, in which hydrogen atoms are transposed to other parts of the molecules and the chemical bonds between the atoms of the molecules are consequently rearranged. It should be understood that the all tautomeric forms, insofar as they may exist, are included within the invention. Additionally, inventive compounds may have trans- and cis-isomers.

It should further be understood that solvates (e.g., hydrates) of the compounds of Formula I are also with the scope of the present invention. Methods of solvation are generally known in the art.

Utility

The compounds of the invention modulate IL-23-stimulated and IFNα-stimulated cellular functions, including gene transcription. Other types of cellular functions that may be modulated by the compounds of the instant invention include, but are not limited to, IL-12-stimulated responses.

Accordingly, compounds of formula I have utility in treating conditions associated with the modulation of the function of IL-23 or IFNα, and particularly the selective inhibition of function of IL-23, IL-12 and/or IFNα, by acting on Tyk2 to mediate signal transduction. Such conditions include IL-23-, IL-12-, or IFNα-associated diseases in which pathogenic mechanisms are mediated by these cytokines.

As used herein, the terms "treating" or "treatment" encompass the treatment of a disease state in a mammal, particularly in a human, and include: (a) preventing or delaying the occurrence of the disease state in a mammal, in particular, when such mammal is predisposed to the disease state but has not yet been diagnosed as having it; (b) inhibiting the disease state, i.e., arresting its development; and/or (c) achieving a full or partial reduction of the symptoms or disease state, and/or alleviating, ameliorating, lessening, or curing the disease or disorder and/or its symptoms.

In view of their activity as modulators of IL-23-, IL-12 and IFNα-stimulated cellular responses, compounds of Formula I are useful in treating IL-23-, IL-12- or IFNα-associated diseases including, but not limited to, inflammatory diseases such as Crohn's disease, ulcerative colitis, asthma, graft versus host disease, allograft rejection, chronic obstructive pulmonary disease; autoimmune diseases such as Graves' disease, rheumatoid arthritis, systemic lupus erythematosis, cutaneous lupus, lupus nephritis, discoid lupus erythematosus, psoriasis; auto-inflammatory diseases including CAPS, TRAPS, FMF, adult onset stills, systemic onset juvenile idiopathic arthritis, gout, gouty arthritis; metabolic diseases including type 2 diabetes, atherosclerosis, myocardial infarction; destructive bone disorders such as bone resorption disease, osteoarthritis, osteoporosis, multiple myeloma-related bone disorder; proliferative disorders such as acute myelogenous leukemia, chronic myelogenous leukemia; angiogenic disorders such as angiogenic disorders including solid tumors, ocular neovasculization, and infantile haemangiomas; infectious diseases such as sepsis, septic shock, and Shigellosis; neurodegenerative diseases such as Alzheimer's disease, Parkinson's disease, cerebral ischemias or neurodegenerative disease caused by traumatic injury, oncologic and viral diseases such as metastatic melanoma, Kaposi's sarcoma, multiple myeloma, and HIV infection and CMV retinitis, AIDS, respectively.

More particularly, the specific conditions or diseases that may be treated with the inventive compounds include, without limitation, pancreatitis (acute or chronic), asthma, allergies, adult respiratory distress syndrome, chronic obstructive pulmonary disease, glomerulonephritis, rheumatoid arthritis, systemic lupus erythematosis, cutaneous lupus, lupus nephritis, discoid lupus erythematosus, scleroderma, chronic thyroiditis, Graves' disease, autoimmune gastritis, diabetes, autoimmune hemolytic anemia, autoimmune neutropenia, thrombocytopenia, atopic dermatitis, chronic active hepatitis, myasthenia gravis, multiple sclerosis, inflammatory bowel disease, ulcerative colitis, Crohn's disease, psoriasis, graft vs. host disease, inflammatory reaction induced by endotoxin, tuberculosis, atherosclerosis, muscle degeneration, cachexia, psoriatic arthritis, Reiter's syndrome, gout, traumatic arthritis, rubella arthritis, acute synovitis, pancreatic 3-cell disease; diseases characterized by massive neutrophil infiltration; rheumatoid spondylitis, gouty arthritis and other arthritic conditions, cerebral malaria, chronic pulmonary inflammatory disease, silicosis, pulmonary sarcoidosis, bone resorption disease, allograft rejections, fever and myalgias due to infection, cachexia secondary to infection, keloid formation, scar tissue formation, ulcerative colitis, pyresis, influenza, osteoporosis, osteoarthritis, acute myelogenous leukemia, chronic myelogenous leukemia, metastatic melanoma, Kaposi's sarcoma, multiple myeloma, sepsis, septic shock, and Shigellosis; Alzheimer's disease, Parkinson's disease, cerebral ischemias or neurodegenerative disease caused by traumatic injury; angiogenic disorders including solid tumors, ocular neovasculization, and infantile haemangiomas; viral diseases including acute hepatitis infection (including hepatitis A, hepatitis B and hepatitis C), HIV infection and CMV retinitis, AIDS, ARC or malignancy, and herpes; stroke, myocardial ischemia, ischemia in stroke heart attacks, organ hyposia [should this be hypoxia], vascular hyperplasia, cardiac and renal reperfusion injury, thrombosis, cardiac hypertrophy, thrombin-induced platelet aggregation, endotoxemia and/or toxic shock syndrome, conditions associated with prostaglandin endoperoxidase syndase-2, and pemphigus vulgaris. Preferred methods of treatment are those wherein the condition is selected from Crohn's disease, ulcerative colitis, allograft rejection, rheumatoid arthritis, psoriasis, ankylosing spondylitis, psoriatic arthritis, and pemphigus vulgaris. Alternatively preferred methods of treatment are those wherein the condition is selected from ischemia reperfusion injury, including cerebral ischemia reperfusions injury arising from stroke and cardiac ischemia reperfusion injury arising from myocardial infarction. Another preferred method of treatment is one in which the condition is multiple myeloma.

When the terms "IL-23-, IL-12- and/or IFNα-associated condition" or "IL-23-, IL-12- and/or IFNα-associated disease or disorder" are used herein, each is intended to encompass all of the conditions identified above as if repeated at length, as well as any other condition that is affected by IL-23, IL-12 and/or IFNα.

The present invention thus provides methods for treating such conditions, comprising administering to a subject in need thereof a therapeutically-effective amount of at least one compound of Formula I or a salt thereof. "Therapeutically effective amount" is intended to include an amount of a compound of the present invention that is effective when administered alone or in combination to inhibit IL-23, IL-12 and/or IFNα function and/or treat diseases.

The methods of treating IL-23-, IL-12 and/or IFNα-associated conditions may comprise administering compounds of Formula I alone or in combination with each other and/or other suitable therapeutic agents useful in treating such conditions. Accordingly, "therapeutically effective amount" is also intended to include an amount of the combination of compounds claimed that is effective to inhibit IL-23, IL-12 and/or IFNα function and/or treat diseases associated with IL-23, IL-12 and/or IFNα.

Exemplary of such other therapeutic agents include corticosteroids, rolipram, calphostin, cytokine-suppressive anti-inflammatory drugs (CSAIDs), Interleukin-10, glucocorticoids, salicylates, nitric oxide, and other immunosuppressants; nuclear translocation inhibitors, such as deoxyspergualin (DSG); non-steroidal anti-inflammatory drugs (NSAIDs) such as ibuprofen, celecoxib and rofecoxib; steroids such as prednisone or dexamethasone; antiviral agents such as abacavir; antiproliferative agents such as methotrexate, leflunomide, FK506 (tacrolimus, PROGRAF®); anti-malarials such as hydroxychloroquine; cytotoxic drugs such as azathiprine and cyclophosphamide; TNF-α inhibitors such as tenidap, anti-TNF antibodies or soluble TNF receptor, and rapamycin (sirolimus or RAPAMUNE®) or derivatives thereof.

The above other therapeutic agents, when employed in combination with the compounds of the present invention, may be used, for example, in those amounts indicated in the *Physicians' Desk Reference* (PDR) or as otherwise determined by one of ordinary skill in the art. In the methods of the present invention, such other therapeutic agent(s) may be administered prior to, simultaneously with, or following the administration of the inventive compounds. The present invention also provides pharmaceutical compositions capable of treating IL-23-, IL-12- or IFNα-associated conditions by inhibiting Tyk2-mediated signal transduction, including IL-23-, IL-12- and/or IFNα-mediated diseases, as described above.

The inventive compositions may contain other therapeutic agents as described above and may be formulated, for example, by employing conventional solid or liquid vehicles or diluents, as well as pharmaceutical additives of a type appropriate to the mode of desired administration (e.g., excipients, binders, preservatives, stabilizers, flavors, etc.)

according to techniques such as those well known in the art of pharmaceutical formulation.

Accordingly, the present invention further includes compositions comprising one or more compounds of Formula I and a pharmaceutically acceptable carrier.

A "pharmaceutically acceptable carrier" refers to media generally accepted in the art for the delivery of biologically active agents to animals, in particular, mammals. Pharmaceutically acceptable carriers are formulated according to a number of factors well within the purview of those of ordinary skill in the art. These include without limitation the type and nature of the active agent being formulated; the subject to which the agent-containing composition is to be administered; the intended route of administration of the composition; and, the therapeutic indication being targeted. Pharmaceutically acceptable carriers include both aqueous and non-aqueous liquid media, as well as a variety of solid and semi-solid dosage forms. Such carriers can include a number of different ingredients and additives in addition to the active agent, such additional ingredients being included in the formulation for a variety of reasons, e.g., stabilization of the active agent, binders, etc., well known to those of ordinary skill in the art. Descriptions of suitable pharmaceutically acceptable carriers, and factors involved in their selection, are found in a variety of readily available sources such as, for example, *Remington's Pharmaceutical Sciences,* 17th Edition (1985), which is incorporated herein by reference in its entirety.

The compounds of Formula I may be administered by any means suitable for the condition to be treated, which may depend on the need for site-specific treatment or quantity of drug to be delivered. Topical administration is generally preferred for skin-related diseases, and systematic treatment preferred for cancerous or pre-cancerous conditions, although other modes of delivery are contemplated. For example, the compounds may be delivered orally, such as in the form of tablets, capsules, granules, powders, or liquid formulations including syrups; topically, such as in the form of solutions, suspensions, gels or ointments; sublingually; bucally; parenterally, such as by subcutaneous, intravenous, intramuscular or intrasternal injection or infusion techniques (e.g., as sterile injectable aq. or non-aq. solutions or suspensions); nasally such as by inhalation spray; topically, such as in the form of a cream or ointment; rectally such as in the form of suppositories; or liposomally. Dosage unit formulations containing non-toxic, pharmaceutically acceptable vehicles or diluents may be administered. The compounds may be administered in a form suitable for immediate release or extended release. Immediate release or extended release may be achieved with suitable pharmaceutical compositions or, particularly in the case of extended release, with devices such as subcutaneous implants or osmotic pumps.

Exemplary compositions for topical administration include a topical carrier such as PLASTIBASE® (mineral oil gelled with polyethylene).

Exemplary compositions for oral administration include suspensions which may contain, for example, microcrystalline cellulose for imparting bulk, alginic acid or sodium alginate as a suspending agent, methylcellulose as a viscosity enhancer, and sweeteners or flavoring agents such as those known in the art; and immediate release tablets which may contain, for example, microcrystalline cellulose, dicalcium phosphate, starch, magnesium stearate and/or lactose and/or other excipients, binders, extenders, disintegrants, diluents and lubricants such as those known in the art. The inventive compounds may also be orally delivered by sublingual and/or buccal administration, e.g., with molded, compressed, or freeze-dried tablets. Exemplary compositions may include fast-dissolving diluents such as mannitol, lactose, sucrose, and/or cyclodextrins. Also included in such formulations may be high molecular weight excipients such as celluloses (AVICEL®) or polyethylene glycols (PEG); an excipient to aid mucosal adhesion such as hydroxypropyl cellulose (HPC), hydroxypropyl methyl cellulose (HPMC), sodium carboxymethyl cellulose (SCMC), and/or maleic anhydride copolymer (e.g., GANTREZ®); and agents to control release such as polyacrylic copolymer (e.g., CARBOPOL 934@). Lubricants, glidants, flavors, coloring agents and stabilizers may also be added for ease of fabrication and use.

Exemplary compositions for nasal aerosol or inhalation administration include solutions which may contain, for example, benzyl alcohol or other suitable preservatives, absorption promoters to enhance absorption and/or bioavailability, and/or other solubilizing or dispersing agents such as those known in the art.

Exemplary compositions for parenteral administration include injectable solutions or suspensions which may contain, for example, suitable non-toxic, parenterally acceptable diluents or solvents, such as mannitol, 1,3-butanediol, water, Ringer's solution, an isotonic sodium chloride solution, or other suitable dispersing or wetting and suspending agents, including synthetic mono- or diglycerides, and fatty acids, including oleic acid.

Exemplary compositions for rectal administration include suppositories which may contain, for example, suitable non-irritating excipients, such as cocoa butter, synthetic glyceride esters or polyethylene glycols, which are solid at ordinary temperatures but liquefy and/or dissolve in the rectal cavity to release the drug.

The therapeutically-effective amount of a compound of the present invention may be determined by one of ordinary skill in the art, and includes exemplary dosage amounts for a mammal of from about 0.05 to 1000 mg/kg; 1-1000 mg/kg; 1-50 mg/kg; 5-250 mg/kg; 250-1000 mg/kg of body weight of active compound per day, which may be administered in a single dose or in the form of individual divided doses, such as from 1 to 4 times per day. It will be understood that the specific dose level and frequency of dosage for any particular subject may be varied and will depend upon a variety of factors, including the activity of the specific compound employed, the metabolic stability and length of action of that compound, the species, age, body weight, general health, sex and diet of the subject, the mode and time of administration, rate of excretion, drug combination, and severity of the particular condition. Preferred subjects for treatment include animals, most preferably mammalian species such as humans, and domestic animals such as dogs, cats, horses, and the like. Thus, when the term "patient" is used herein, this term is intended to include all subjects, most preferably mammalian species that are affected by modulation of IL-23, IL-12 and/or IFNα-mediated functions.

Preparation

All reagents purchased from commercial sources were used without further purification unless otherwise noted. All reactions involving air or moisture sensitive reagents were performed under an inert atmosphere. Proton and carbon magnetic resonance (H and $^{13}$C NMR) spectra were recorded either on a Bruker Avance 400 or a JEOL Eclipse 500 spectrometer and are reported in ppm relative to the reference solvent of the sample in which they were run. HPLC and LCMS analyses were conducted using a Shimadzu LC-10AS liquid chromatograph and a SPDUV-vis detector at 220 or 254 nm with the MS detection performed with a Micromass Platform LC spectrometer.

HPLC method A: Ballistic YMC S5 ODS 4.6 mm×50 mm column with a binary solvent system where solvent A=10% methanol and 90% water with 0.2% phosphoric acid, solvent B=90% methanol and 10% water with 0.2% phosphoric acid, flow rate=4 mL/min, linear gradient time=4 min.

HPLC method B: PHENOMENEX Luna $C_{18}$ (2), 4.6×50 mm column with a binary solvent system where solvent A=10% methanol and 90% water with 0.1% trifluoroacetic acid, and solvent B=90% methanol and 10% water with 0.1% trifluoroacetic acid, flow rate=4 mL/min, linear gradient time=4 min.

HPLC method C: Waters SunFire C18, 4.6×50 mm column with a binary solvent system where solvent A=10% methanol and 90% water with 0.1% trifluoroacetic acid, solvent B=90% methanol and 10% water with 0.1% trifluoroacetic acid, flow rate=4 mL/min, linear gradient time=4 min.

LCMS method A: Phenomenex 5 m C18, 4.6 mm×50 mm column with a binary solvent system where solvent A=10% methanol and 90% water with 0.1% trifluoroacetic acid, solvent B=90% methanol and 10% water with 0.1% trifluoroacetic acid, flow rate=4 mL/min, linear gradient time=4 min.

LCMS method B: Ascentis Express C18, 4.6×50 mm column with a binary solvent system where solvent A=5% acetonitrile and 95% water with 10 mM ammonium acetate, solvent B=95% acetonitrile and 5% water with 10 mM ammonium acetate, flow rate=4 mL/min, linear gradient time=4 min.

LCMS method C: Waters Acquity UPLC BEH C18, 2.1×50 mm column with a binary solvent system where solvent A=5% acetonitrile and 95% water with 10 mM ammonium acetate, solvent B=95% acetonitrile and 5% water with 10 mM ammonium acetate, flow rate=1 mL/min, linear gradient time=3 min.

LCMS method D: Waters Acquity UPLC BEH C18, 2.1×50 mm column with a binary solvent system where solvent A=5% acetonitrile and 95% water with 0.1% trifluoroacetic acid, and solvent B=95% acetonitrile and 5% water with 0.1% trifluoroacetic acid, flow rate=1 mL/min, linear gradient time=3 min.

Preparative HPLC method A: Ballistic YMC S5 ODS 20 mm×100 mm column with a binary solvent system where solvent A=10% methanol and 90% water with 0.1% trifluoroacetic acid, solvent B=90% methanol and 10% water with 0.1% trifluoroacetic acid; flow rate=20 mL/min, linear gradient time=10 min.

Preparative HPLC method B: Waters XBridge C18, 19×200 mm column with a binary solvent system where solvent A=5% acetonitrile and %95 water with 0.1% trifluoroacetic acid, solvent B=95% acetonitrile and 5% water with 0.1% trifluoroacetic acid; flow rate=20 mL/min, linear gradient time=20 min.

Preparative HPLC method C: Waters XBridge C18, 19×200 mm column with a binary solvent system where solvent A=5% acetonitrile and %95 water with 10-mM ammonium acetate, solvent B=95% acetonitrile and 5% water with 10-mM ammonium acetate; flow rate=20 mL/min, linear gradient time=20 min.

Example 1

6-(Cyclopropanecarboxamido)-4-((2-methoxy-3-(9-methyl-9H-purin-2-yl)phenyl)amino)-N-(methyl-d3)pyridazine-3-carboxamide

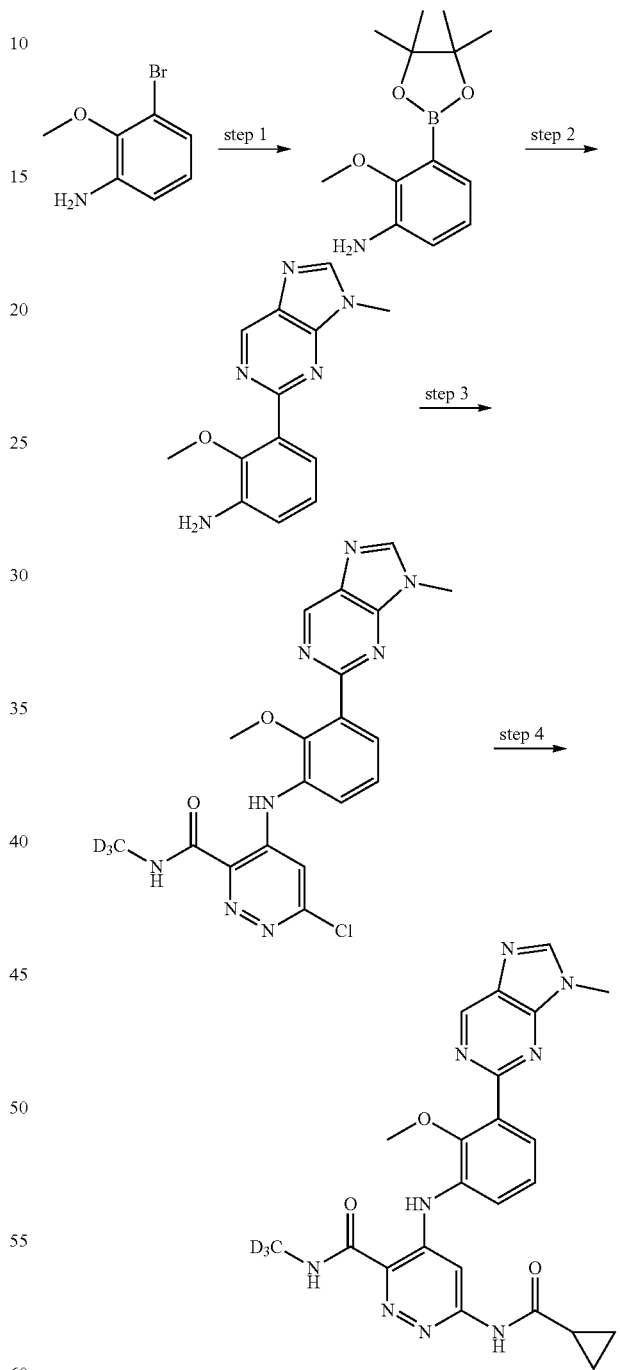

Step 1. 2-Methoxy-3-(4,4,5,5-tetramethyl-1,3,2-dioxaborolan-2-yl)aniline

A mixture of 3-bromo-2-methoxyaniline (3.00 g, 14.85 mmol), 4,4,4',4',5,5,5',5'-octamethyl-2,2'-bi(1,3,2-dioxaborolane) (5.66 g, 22.27 mmol), PdCl$_2$(dppf)-CH$_2$Cl$_2$ adduct (0.728 g, 0.891 mmol), and potassium acetate (4.37 g, 44.5 mmol) in 1,4-dioxane (60 ml) was heated in a pressure bottle at 110° C. for 20 h. Upon cooling to rt, the mixture was diluted with ethyl acetate (60 mL) and filtered through Celite. The filtrate was concentrated under vacuum, and the residue was subjected to ISCO chromatography (330 g silica gel, 0-40% ethyl acetate/hexane) to provide 2-methoxy-3-(4,4,5,5-tetramethyl-1,3,2-dioxaborolan-2-yl)aniline (2.31 g, 9.27 mmol, 62.5% yield) as a white solid. LCMS m/z=250.3 (M+H)$^+$. $^1$H NMR (400 MHz, DMSO-d$_6$) δ 6.79-6.77 (m, 2H), 6.76-6.72 (m, 1H), 4.77 (s, 2H), 3.63 (s, 3H), 1.27 (s, 12H)

Step 2.
2-Methoxy-3-(9-methyl-9H-purin-2-yl)aniline

A mixture of 2-methoxy-3-(4,4,5,5-tetramethyl-1,3,2-dioxaborolan-2-yl)aniline (250 mg, 1.004 mmol), 2-chloro-9-methyl-9H-purine (178 mg, 1.054 mmol), PdCl$_2$(dppf)-CH$_2$Cl$_2$ adduct (49.2 mg, 0.060 mmol), and 2 M aqueous potassium triphosphate (1.505 mL, 3.01 mmol) in 1,4-dioxane (8 mL) was heated at 100° C. for 16 h. Upon cooling to rt, the mixture was diluted with ethyl acetate (8 mL) and filtered through Celite. The filtrate was concentrated under vacuum to near dryness. To the residue was added water (10 mL), and the resulting mixture was extracted with dichloromethane (3×30 mL). The combined extract was dried over anhydrous Na$_2$SO$_4$. The desired product, 2-methoxy-3-(9-methyl-9H-purin-2-yl)aniline (208 mg, 0.815 mmol, 81% yield), was isolated as a white solid by ISCO chromatography (40 g silica gel, solid loading, 0-5% MeOH/dichloromethane). LCMS m/z=256.3 (M+H)$^+$.

Step 3. 6-Chloro-4-((2-methoxy-3-(9-methyl-9H-purin-2-yl)phenyl)amino)-N-(methyl-d3)pyridazine-3-carboxamide To a solution of 4,6-dichloro-N-trideuteromethylpyridazine-3-carboxamide and 2-methoxy-3-(9-methyl-9H-purin-2-yl)aniline (Moslin, R. et al. *J. Med. Chem.* 2019, 62, 8953-8972) (208 mg, 0.816 mmol) in THF (6 mL) at rt was added lithium bis(trimethylsilyl)amide in THF (1.854 mL, 1.854 mmol) over 1 min. The mixture was stirred at rt for 40 min before it was quenched with water (1 mL). The resulting mixture was adjusted with 1 N HCl solution to pH 9-10, diluted with ethyl acetate (70 mL), washed with water (20 mL) and brine (20 mL), and dried over anhydrous MgSO$_4$. The desired product, 6-chloro-4-((2-methoxy-3-(9-methyl-9H-purin-2-yl)phenyl)amino)-N-trodeuteromethylpyridazine-3-carboxamide (118 mg, 0.276 mmol, 37.2% yield), was isolated as a white solid by ISCO chromatography (40 g silica gel, solid loading, 0-5% MeOH/dichloromethane). LCMS m/z=428.2 (M+H)$^+$.

Step 4. 6-(Cyclopropanecarboxamido)-4-((2-methoxy-3-(9-methyl-9H-purin-2-yl)phenyl)amino)-N-(methyl-d3)pyridazine-3-carboxamide A mixture of 6-chloro-4-((2-methoxy-3-(9-methyl-9H-purin-2-yl)phenyl)amino)-N-trideuteromethylpyridazine-3-carboxamide (50 mg, 0.117 mmol), cyclopropanecarboxamide (19.89 mg, 0.234 mmol), tris(dibenzylideneacetone)dipalladium(0) (12.84 mg, 0.014 mmol), XantPhos (8.11 mg, 0.014 mmol), and cesium carbonate (84 mg, 0.257 mmol) in 1,4-dioxane (2.5 mL) was heated under microwave at 135° C. for 1 h. The mixture was diluted with ethyl acetate (8 mL) and filtered through Celite. The filtrate was concentrated under vacuum. The residue subjected to preparative HPLC. The correct fractions were combined, concentrated under vacuum, basified with saturated NaHCO$_3$ solution to pH 9-10, and extracted with dichloromethane (3×30 mL). The combined extract was dried over anhydrous Na$_2$SO$_4$ and concentrated to dryness under vacuum to provide 6-(cyclopropanecarboxamido)-4-((2-methoxy-3-(9-methyl-9H-purin-2-yl)phenyl)amino)-N-trideuteromethylpyridazine-3-carboxamide (22.9 mg, 0.047 mmol, 40.3% yield) as a pale solid. LCMS m/z=477.4 (M+H)$^+$. $^1$H NMR (400 MHz, DMSO-d$_6$) δ 11.32 (s, 1H), 10.97 (s, 1H), 9.26 (s, 1H), 9.14 (s, 1H), 8.61 (s, 1H), 8.18 (s, 1H), 7.60 (ddd, J=17.0, 7.9, 1.5 Hz, 2H), 7.32 (t, J=7.8 Hz, 1H), 3.89 (s, 3H), 3.75 (s, 3H), 2.15-2.03 (m, 1H), 0.83 (d, J=6.0 Hz, 4H).

Example 2-13 in Table 1 were prepared in the same manner as example 1.

TABLE 1

| Ex # | Structure | Analytical data |
|---|---|---|
| 2 | | LCMS m/z = 448.4 (M + H)$^+$. $^1$H NMR (400 MHz, DMSO-d$_6$) δ 11.32 (s, 1H), 10.96 (s, 1H), 9.43 (s, 2H), 9.13 (s, 1H), 8.13 (s, 1H), 7.71 – 7.57 (m, 2H), 7.35 (t, J = 7.9 Hz, 1H), 3.70 (s, 3H), 2.14 – 2.00 (m, 1H), 0.86 – 0.76 (m, 4H) |
| 3 | | LCMS m/z = 448.4 (M + H)$^+$. $^1$H NMR (400 MHz, DMSO-d$_6$) δ 11.31 (s, 1H), 10.95 (s, 1H), 9.28 (d, J = 4.8 Hz, 1H), 9.13 (s, 1H), 8.16 – 8.10 (m, 2H), 7.62 (ddd, J = 16.9, 7.9, 1.5 Hz, 2H), 7.35 (t, J = 7.9 Hz, 1H), 3.70 (s, 3H), 2.12 – 2.03 (m, 1H), 0.87 – 0.78 (m, 4H) |
| 4 | | LCMS m/z = 437.3 (M + H)$^+$. $^1$H NMR (400 MHz, DMSO-d$_6$) δ 10.94 (s, 1H), 10.83 (s, 1H), 9.11 (s, 1H), 8.95 (d, J = 4.8 Hz, 2H), 8.20 (s, 1H), 7.61 (dd, J = 8.0, 1.2 Hz, 1H), 7.57 – 7.47 (m, 2H), 7.40 – 7.29 (m, 1H), 3.68 (s, 3H), 3.47 – 3.35 (m, 1H), 2.25 – 2.03 (m, 4H), 2.00 – 1.85 (m, 1H), 1.84 – 1.70 (m, 1H) |

TABLE 1-continued

| Ex # | Structure | Analytical data |
|---|---|---|
| 5 | | LCMS m/z = 453.3 (M + H)+. 1H NMR (500 MHz, DMSO-d6) δ 11.34 (s, 1H), 10.95 (s, 1H), 9.15 (s, 1H), 8.65 (d, J = 5.7 Hz, 1H), 8.15 (s, 1H), 7.58 (d, J = 7.7 Hz, 2H), 7.31 (t, J = 1.9 Hz, 1H), 6.94 (d, J = 5.7 Hz, 1H), 3.99 (s, 3H), 3.72 (s, 3H), 2.16 – 2.02 (m, 1H), 0.89 – 0.77 (m, 4H) |
| 6 | | LCMS m/z = 453.4 (M + H)+. 1H NMR (500 MHz, DMSO-d6) δ 11.31 (s, 1H), 10.90 (s, 1H), 9.11 (s, 1H), 8.67 (s, 2H), 8.13 (s, 1H), 7.59 – 7.44 (m, 2H), 7.28 (t, J = 7.7 Hz, 1H), 3.97 (s, 3H), 3.64 (s, 3H), 2.12 – 1.98 (m, 1H), 0.89 – 0.76 (m, 4H). |
| 7 | | LCMS m/z = 441.3 (M + H)+. 1H NMR (400 MHz, DMSO-d6) δ 11.40 (s, 1H), 11.14 (s, 1H), 9.18 (s, 1H), 8.98 (d, J = 4.9 Hz, 2H), 8.26 (s, 1H), 7.56 (t, J = 5.0 Hz, 1H), 7.51 (dd, J = 9.7, 3.1 Hz, 1H), 7.32 (dd, J = 9.1, 3.1 Hz, 1H), 3.69 (s, 3H), 2.15 – 2.07 (m, 1H), 0.89 – 0.82 (m, 4H) |
| 8 | | LCMS m/z = 437.2 (M + H)+. 1H NMR (500 MHz, DMSO-d6) δ 11.33 (s, 1H), 10.94 (s, 1H), 9.14 (s, 1H), 8.79 (s, 2H), 8.16 (s, 1H), 7.56 (d, J = 8.1 Hz, 1H), 7.50 (d, J = 7.1 Hz, 1H), 7.30 (t, J = 7.9 Hz, 1H), 3.66 (s, 3H), 2.35 (s, 3H), 2.12 – 2.05 (m, 1H), 0.86 – 0.80 (m, 4H). |
| 9 | | LCMS m/z = 453.4 (M + H) 1H NMR (400 MHz, DMSO-d6) δ 11.32 (s, 1H), 10.94 (s, 1H), 9.13 (s, 1H), 8.11 (s, 1H), 7.77 (d, J = 9.7 Hz, 1H), 7.53 (dd, J = 7.9, 1.8 Hz, 1H), 7.40 – 7.35 (m, 1H), 7.33 – 7.26 (m, 1H), 7.01 (d, J = 9.7 Hz, 1H), 3.73 (s, 3H), 3.54 (s, 3H), 2.08 (quin, J = 6.1 Hz, 1H), 0.86 – 0.78 (m, 4H) |
| 10 | | LCMS m/z = 453.4 (M + H)+. 1H NMR (400 MHz, DMSO-d) δ 11.31 (s, 1H), 10.99 (s, 1H), 9.13 (s, 1H), 8.23 (d, J = 1.1 Hz, 1H), 8.17 – 8.10 (m, 2H), 7.55 (dd, J = 7.9, 1.5 Hz, 1H), 7.42 (dd, J = 7.9, 1.3 Hz, 1H), 7.32 – 7.22 (m, 1H), 3.58 (s, 3H), 3.53 (s, 3H), 2.14 – 2.02 (m, 1H), 0.85 – 0.78 (m, 4H) |
| 11 | | LCMS m/z = 480.2 (M + H)+. 1H NMR (400 MHz, DMSO-d6) δ 11.32 (s, 1H), 10.98 (s, 1H), 9.14 (s, 1H), 8.81 (dd, J = 2.3, 0.6 Hz, 1H), 8.18 (s, 1H), 7.94 (dd, J = 8.2, 2.3 Hz, 1H), 7.81 (d, J = 8.3 Hz, 1H), 7.55 (dd, J = 7.8, 1.6 Hz, 1H), 7.50 (dd, J = 7.9, 1.5 Hz, 1H), 7.33 – 7.27 (m, 1H), 5.26 (br s, 1H), 3.49 (s, 3H), 2.13 – 2.06 (m, 1H), 1.51 (s, 6H), 0.83 (d, J = 5.9 Hz, 4H) |
| 12 | | LCMS m/z = 453.4 (M + H)+. 1H NMR (400 MHz, DMSO-d6) δ 11.33 (s, 1H), 10.95 (s, 1H), 9.14 (s, 1H), 8.58 (s, 1H), 8.13 (s, 1H), 7.61 (dd, J = 7.8, 1.6 Hz, 1H), 7.55 (dd, J = 8.0, 1.5 Hz, 1H), 7.31 (t, J = 7.9 Hz, 1H), 6.88 (d, J = 0.7 Hz, 1H), 3.60 (s, 3H), 3.46 (s, 3H), 2.09 (quin, J = 6.2 Hz, 1H), 0.87 – 0.79 (m, 4H) |

TABLE 1-continued

| Ex # | Structure | Analytical data |
|---|---|---|
| 13 | (structure shown) | LCMS m/z = 508.6 (M + H)⁺. ¹H NMR (400 MHz, DMSO-d₆) δ 11.30 (s, 1H), 10.92 (s, 1H), 9.12 (s, 1H), 8.63 (s, 2H), 8.15 (s, 1H), 7.50 (d, J = 8.1 Hz, 2H), 7.33 – 7.20 (m, 1H), 3.83 – 3.74 (m, 4H), 3.66 (s, 3H), 3.36 – 3.27 (m, 4H), 2.13 – 2.03 (m, 1H), 0.82 (br d, J = 5.7 Hz, 4H) |

Example 14

6-(Cyclopropanecarboxamido)-4-((5-fluoro-2-methoxy-3-(pyrimidin-2-yl)phenyl)amino)-N-(methyl-d3)nicotinamide

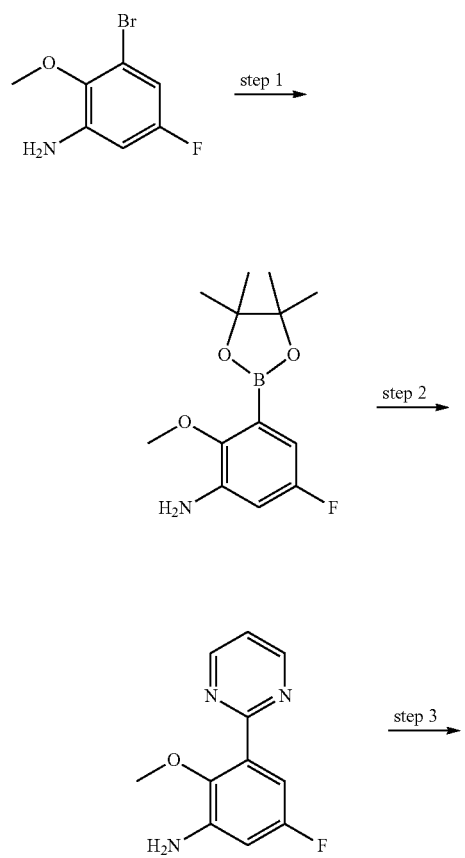

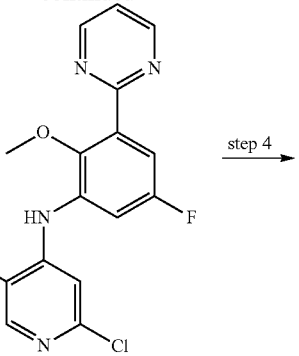

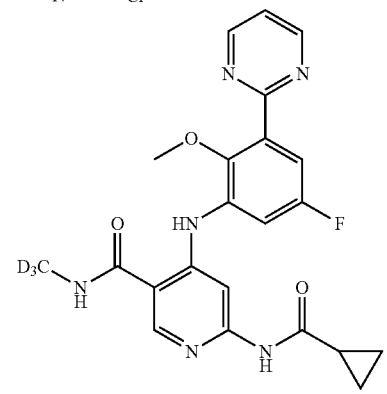

Step 1. 5-Fluoro-2-methoxy-3-(4,4,5,5-tetramethyl-1,3,2-dioxaborolan-2-yl)aniline A mixture of 3-bromo-5-fluoro-2-methoxyaniline (0.304 g, 1.382 mmol), 4,4,4',4',5,5,5',5'-octamethyl-2,2'-bi(1,3,2-dioxaborolane) (0.526 g, 2.072 mmol), PdCl₂(dppf)-CH₂Cl₂ adduct (0.068 g, 0.083 mmol), and potassium acetate (0.407 g, 4.14 mmol) in 1,4-dioxane (7 ml) was heated in a pressure bottle at 105° C. for 18 h. The mixture was diluted with ethyl acetate (10 mL) and filtered through Celite. The filtrate was concentrated under vacuum, and the residue was submitted to ISCO chromatography (40 g silica gel, solid loading, 0-60% diethyl ether/hexane) to afford 5-fluoro-2-methoxy-3-(4,4,5,5-tetramethyl-1,3,2-dioxaborolan-2-yl)aniline (0.225 g, 0.842 mmol, 61.0% yield) as a white solid. LCMS m/z=268.2 (M+H)⁺.

Step 2. 5-Fluoro-2-methoxy-3-(pyrimidin-2-yl)aniline

A mixture of 5-fluoro-2-methoxy-3-(4,4,5,5-tetramethyl-1,3,2-dioxaborolan-2-yl)aniline (225 mg, 0.842 mmol), 2-chloropyrimidine (104 mg, 0.910 mmol), PdCl₂(dppf)-CH₂Cl₂ adduct (41.3 mg, 0.051 mmol), and 2 M aqueous potassium triphosphate (1.264 mL, 2.53 mmol) in 1,4-dioxane (6 mL) was heated at 105° C. for 16 h. The mixture was diluted with ethyl acetate (6 mL) and filtered through Celite. The filtrate was concentrated under vacuum to dryness. The residue was diluted with water (10 mL) and extracted with dichloromethane (3×30 mL). The combined extract was dried over anhydrous MgSO₄ and concentrated under vacuum. The residue was subjected to ISCO chromatography (24 g silica gel, 40-85% ethyl acetate/hexane) to provide 5-fluoro-2-methoxy-3-(pyrimidin-2-yl)aniline (126 mg, 0.575 mmol, 68.2% yield) as a pale yellow oil. LCMS m/z=220.1 (M+H)⁺.

Step 3. 6-Chloro-4-((5-fluoro-2-methoxy-3-(pyrimidin-2-yl)phenyl)amino)-N-(methyl-d3)nicotinamide To a solution of 4,6-dichloro-N-trideuteromethylpyridazine-3-carboxamide and 5-fluoro-2-methoxy-3-(pyrimidin-2-yl)aniline (Moslin, R. et al. *J. Med. Chem.* 2019, 62, 8953-8972) (84 mg, 0.384 mmol) in THF (4 mL) at rt was added lithium bis(trimethylsilyl)amide in THF (0.913 mL, 0.913 mmol) over 1 min. The resulting mixture was stirred at rt for 1 h before it was quenched with water (1 mL). The mixture was adjusted with 1 N HCl solution to pH 9-10, diluted with ethyl acetate (60 mL), washed with water (20 mL) and brine (20 mL) successively, and dried over anhydrous MgSO₄. The desired product, 6-chloro-4-((5-fluoro-2-methoxy-3-(pyrimidin-2-yl)phenyl)amino)-N-trideuteromethylnicotinamide (73 mg, 0.187 mmol, 51.1% yield), was isolated as a white solid by ISCO chromatography (40 g silica gel, solid loading, 70-100% ethyl acetate/dichloromethane). LCMS m/z=391.1 (M+H)$^+$.

Step 4. 6-(Cyclopropanecarboxamido)-4-((5-fluoro-2-methoxy-3-(pyrimidin-2-yl)phenyl)amino)-N-(methyl-d3)nicotinamide A mixture of 6-chloro-4-((5-fluoro-2-methoxy-3-(pyrimidin-2-yl)phenyl)amino)-N-trideuteromethylnicotinamide (73 mg, 0.187 mmol), cyclopropanecarboxamide (31.8 mg, 0.374 mmol), tris(dibenzylideneacetone)dipalladium(0) (25.7 mg, 0.028 mmol), XantPhos (16.21 mg, 0.028 mmol), and cesium carbonate (134 mg, 0.411 mmol) in 1,4-dioxane (2.2 mL) and 1-methylpyrrolidin-2-one (NMP) (0.3 mL) was heated under microwave at 140° C. for 1 h. The mixture was diluted with ethyl acetate (8 mL) and filtered through Celite. The filtrate was concentrated under vacuum. The residue was diluted with MeOH and injected to preparative HPLC. The correct fractions were combined, concentrated under vacuum, and basified with saturated NaHCO₃ solution to pH 9-10. The precipitating product, 6-(cyclopropanecarboxamido)-4-((5-fluoro-2-methoxy-3-(pyrimidin-2-yl)phenyl)amino)-N-trideuteromethylnicotinamide (43 mg, 0.097 mmol, 51.9% yield), was collected as a white solid and dried at 50° C. under vacuum. LCMS m/z=440.3 (M+H)$^+$. $^1$H NMR (400 MHz, DMSO-d₆) δ 10.86 (d, J=6.0 Hz, 2H), 8.97 (d, J=4.9 Hz, 2H), 8.63 (s, 1H), 8.56 (s, 1H), 8.17 (s, 1H), 7.55 (t, J=4.9 Hz, 1H), 7.43 (dd, J=10.0, 3.1 Hz, 1H), 7.22 (dd, J=9.1, 3.1 Hz, 1H), 3.69 (s, 3H), 2.07-1.97 (m, 1H), 0.87-0.77 (m, 4H).

Examples 15-18 in Table 2 were prepared in the same manner as example 14.

TABLE 2

| Ex # | Structure | Analytical data |
|---|---|---|
| 15 | | LCMS m/z = 422.3 (M + H)$^+$. $^1$H NMR (400 MHz, DMSO-d₆) δ 10.78 (br s, 1H), 10.66 (s, 1H), 8.95 (d, J = 4.9 Hz, 2H), 8.59 (s, 1H), 8.52 (s, 1H), 8.04 (br s, 1H), 7.56 (dd, J = 8.0, 1.5 Hz, 1H), 7.51 (t, J = 4.9 Hz, 1H), 7.44 (dd, J = 7.8, 1.5 Hz, 1H), 7.31 – 7.23 (m, 1H), 3.68 (s, 3H), 2.03 – 1.94 (m, 1H), 0.83 – 0.75 (m, 4H). |
| 16 | | LCMS m/z = 507.6 (M + H)$^+$. $^1$H NMR (400 MHz, DMSO-d₆) δ 10.74 (s, 1H), 10.62 (s, 1H), 8.62 (s, 2H), 8.57 (s, 1H), 8.51 (s, 1H), 8.06 (s, 1H), 7.48 (dd, J = 7.9, 1.5 Hz, 1H), 7.41 (dd, J = 7.8, 1.6 Hz, 1H), 7.25 – 7.18 (m, 1H), 3.81 – 3.75 (m, 4H), 3.66 (s, 3H), 3.40 – 3.26 (m, 4H), 2.04 – 1.94 (m, 1H), 0.82 – 0.74 (m, 4H) |
| 17 | | LCMS m/z = 452.4 (M + H)$^+$. $^1$H NMR (500 MHz, DMSO-d₆) δ 10.74 (s, 1H), 10.63 (s, 1H), 8.65 (s, 1H), 8.61 (s, 1H), 8.50 (s, 1H), 8.44 (s, 1H), 8.05 (s, 1H), 7.47 (br dd, J = 12.3, 7.9 Hz, 2H), 7.33 – 7.25 (m, 1H), 3.98 (s, 3H), 3.61 (s, 3H), 2.01 – 1.93 (m, 1H), 0.78 (brd, J = 5.7 Hz, 4H) |
| 18 | | LCMS m/z = 436.0 (M + H)$^+$. $^1$H NMR (400 MHz, DMSO-d₆) δ 10.78 (s, 1H), 10.72 (s, 1H), 8.95 (d, J = 1.5 Hz, 1H), 8.70 – 8.65 (m, 1H), 8.61 (s, 1H), 8.54 (s, 1H), 8.07 (s, 1H), 7.53 (dd, J = 7.9, 1.5 Hz, 1H), 7.47 (dd, J = 7.8, 1.6 Hz, 1H), 7.34 – 7.28 (m, 1H), 3.52 (s, 3H), 2.57 (s, 3H), 2.05 – 1.95 (m, 1H), 0.84 – 0.75 (m, 4H) |

Example 19

6-(Cyclopropanecarboxamido)-4-((3-(6-(2-hydroxypropan-2-yl)pyridazin-3-yl)-2-methoxyphenyl)amino)-N-(methyl-d3)pyridazine-3-carboxamide

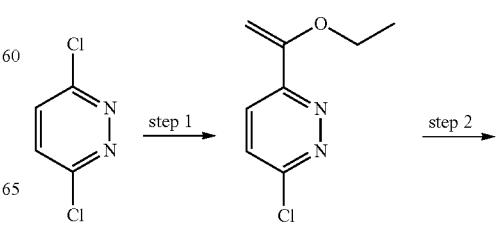

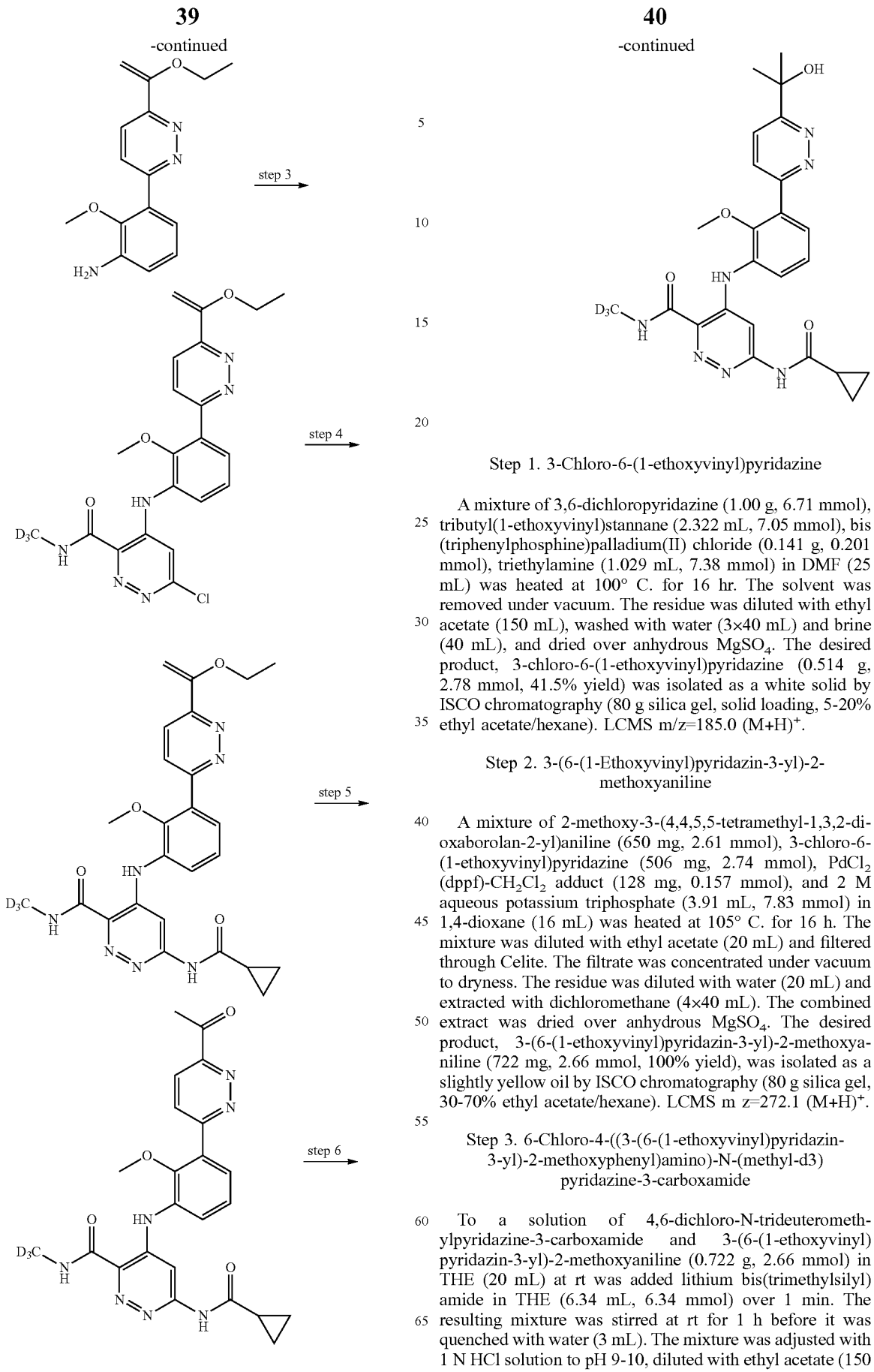

Step 1. 3-Chloro-6-(1-ethoxyvinyl)pyridazine

A mixture of 3,6-dichloropyridazine (1.00 g, 6.71 mmol), tributyl(1-ethoxyvinyl)stannane (2.322 mL, 7.05 mmol), bis(triphenylphosphine)palladium(II) chloride (0.141 g, 0.201 mmol), triethylamine (1.029 mL, 7.38 mmol) in DMF (25 mL) was heated at 100° C. for 16 hr. The solvent was removed under vacuum. The residue was diluted with ethyl acetate (150 mL), washed with water (3×40 mL) and brine (40 mL), and dried over anhydrous $MgSO_4$. The desired product, 3-chloro-6-(1-ethoxyvinyl)pyridazine (0.514 g, 2.78 mmol, 41.5% yield) was isolated as a white solid by ISCO chromatography (80 g silica gel, solid loading, 5-20% ethyl acetate/hexane). LCMS m/z=185.0 $(M+H)^+$.

Step 2. 3-(6-(1-Ethoxyvinyl)pyridazin-3-yl)-2-methoxyaniline

A mixture of 2-methoxy-3-(4,4,5,5-tetramethyl-1,3,2-dioxaborolan-2-yl)aniline (650 mg, 2.61 mmol), 3-chloro-6-(1-ethoxyvinyl)pyridazine (506 mg, 2.74 mmol), $PdCl_2$(dppf)-$CH_2Cl_2$ adduct (128 mg, 0.157 mmol), and 2 M aqueous potassium triphosphate (3.91 mL, 7.83 mmol) in 1,4-dioxane (16 mL) was heated at 105° C. for 16 h. The mixture was diluted with ethyl acetate (20 mL) and filtered through Celite. The filtrate was concentrated under vacuum to dryness. The residue was diluted with water (20 mL) and extracted with dichloromethane (4×40 mL). The combined extract was dried over anhydrous $MgSO_4$. The desired product, 3-(6-(1-ethoxyvinyl)pyridazin-3-yl)-2-methoxyaniline (722 mg, 2.66 mmol, 100% yield), was isolated as a slightly yellow oil by ISCO chromatography (80 g silica gel, 30-70% ethyl acetate/hexane). LCMS m z=272.1 $(M+H)^+$.

Step 3. 6-Chloro-4-((3-(6-(1-ethoxyvinyl)pyridazin-3-yl)-2-methoxyphenyl)amino)-N-(methyl-d3)pyridazine-3-carboxamide To a solution of 4,6-dichloro-N-trideuteromethylpyridazine-3-carboxamide and 3-(6-(1-ethoxyvinyl)pyridazin-3-yl)-2-methoxyaniline (0.722 g, 2.66 mmol) in THF (20 mL) at rt was added lithium bis(trimethylsilyl)amide in THF (6.34 mL, 6.34 mmol) over 1 min. THE resulting mixture was stirred at rt for 1 h before it was quenched with water (3 mL). The mixture was adjusted with 1 N HCl solution to pH 9-10, diluted with ethyl acetate (150 mL), and washed with water (2×30 mL) and brine (30 mL). The organic layer was dried over anhydrous MgSO$_4$. The desired product, 6-chloro-4-((3-(6-(1-ethoxyvinyl)pyridazin-3-yl)-2-methoxyphenyl)amino)-N-(methyl-d3)pyridazine-3-carboxamide (0.580 g, 1.307 mmol, 51.5% yield), was isolated as a white solid by ISCO chromatography (40 g silica gel, solid loading, 25-50% ethyl acetate/dichloromethane). LCMS m/z=444.2 (M+H)$^+$.

Step 4. 6-(Cyclopropanecarboxamido)-4-((3-(6-(1-ethoxyvinyl)pyridazin-3-yl)-2-methoxyphenyl)amino)-N-(methyl-d3)pyridazine-3-carboxamide A mixture of 6-chloro-4-((3-(6-(1-ethoxyvinyl)pyridazin-3-yl)-2-methoxyphenyl)amino)-N-trideuteromethylpyridazine-3-carboxamide (0.300 g, 0.676 mmol), cyclopropanecarboxamide (0.115 g, 1.352 mmol), tris(dibenzylideneacetone)dipalladium(0) (0.093 g, 0.101 mmol), XantPhos (0.059 g, 0.101 mmol), and cesium carbonate (0.484 g, 1.487 mmol) in 1,4-dioxane (6 mL) and NMP (0.8 mL) was heated at 150° C. under microwave conditions for 1 h. The mixture was diluted with ethyl acetate (10 mL) and filtered through Celite. The filtrate was concentrated under vacuum. The residue was subjected to ISCO chromatography (40 g silica gel, solid loading, 40-80% ethyl acetate/dichloromethane) to afford 6-(cyclopropanecarboxamido)-4-((3-(6-(1-ethoxyvinyl)pyridazin-3-yl)-2-methoxyphenyl)amino)-N-trideuteromethylpyridazine-3-carboxamide (0.540 g, contaminated with NMP), as a white solid. LCMS m/z=493.2 (M+H)$^+$.

Step 5. 4-((3-(6-Acetylpyridazin-3-yl)-2-methoxyphenyl)amino)-6-(cyclopropanecarboxamido)-N-(methyl-d3)pyridazine-3-carboxamide To a solution of 6-(cyclopropanecarboxamido)-4-((3-(6-(1-ethoxyvinyl)pyridazin-3-yl)-2-methoxyphenyl)amino)-N-trideuteromethylpyridazine-3-carboxamide (0.540 g, <0.676 mmol, from the previous step) in THF (20 mL) at rt was added 1 N hydrochloric acid (10 mL, 10.00 mmol). The resulting solution was stirred at rt for 4 h and then concentrated under vacuum to a volume of approximately 10 mL. The residue was basified with 1 N NaOH solution to pH 10. The resulting suspension was allowed to stand at 0° C. for 0.5 h. The desired product, 4-((3-(6-acetylpyridazin-3-yl)-2-methoxyphenyl)amino)-6-(cyclopropanecarboxamido)-N-trideuteromethylpyridazine-3-carboxamide (0.165 g, 0.337 mmol) (52% yield over two steps), was collected as a pale yellow solid by suction filtration and dried at 60° C. under vacuum. LCMS m/z=465.3 (M+H)$^+$. $^1$H NMR (400 MHz, DMSO-d$_6$) δ 11.35 (s, 1H), 11.01 (s, 1H), 9.16 (s, 1H), 8.32-8.25 (m, 1H), 8.24-8.15 (m, 2H), 7.67 (td, J=7.7, 1.5 Hz, 2H), 7.42 (t, J=7.9 Hz, 1H), 3.51 (s, 3H), 2.84 (s, 3H), 2.14-2.05 (m, 1H), 0.84 (d, J=6.1 Hz, 4H).

Step 6. 6-(Cyclopropanecarboxamido)-4-((3-(6-(2-hydroxypropan-2-yl)pyridazin-3-yl)-2-methoxyphenyl)amino)-N-(methyl-d3)pyridazine-3-carboxamide To a solution of 4-((3-(6-acetylpyridazin-3-yl)-2-methoxyphenyl)amino)-6-(cyclopropanecarboxamido)-N-trideuteromethylpyridazine-3-carboxamide (85 mg, 0.183 mmol) in tetrahydrofuran (10 mL) at 0° C. was dropwise added methylmagnesium bromide (0.366 mL, 1.098 mmol). The resulting mixture was stirred at 0° C. for 45 min before it was quenched with water (5 mL). The mixture was diluted with ethyl acetate (120 mL), washed with water (2×30 mL) and brine (30 mL), and dried over anhydrous MgSO$_4$. After solvent was removed under vacuum, the residue was subjected to preparative HPLC. The correct fractions were combined, concentrated under vacuum, basified with 1.5 M K$_2$HPO$_4$ solution to pH 10, and extracted with dichloromethane (3×30 mL). The combined extract was dried over anhydrous Na$_2$SO$_4$. Removal of solvent under vacuum provided 6-(cyclopropanecarboxamido)-4-((3-(6-(2-hydroxypropan-2-yl)pyridazin-3-yl)-2-methoxyphenyl)amino)-N-trideuteromethylpyridazine-3-carboxamide (33.4 mg, 0.069 mmol, 37.6% yield) as a white solid. LCMS m/z=481.2 (M+H)$^+$. $^1$H NMR (400 MHz, DMSO-d$_6$) δ 11.34 (s, 1H), 11.00 (s, 1H), 9.15 (s, 1H), 8.18 (s, 1H), 8.08-8.03 (m, 1H), 8.00-7.95 (m, 1H), 7.59 (d, J=7.8 Hz, 2H), 7.41-7.34 (m, 1H), 5.53 (s, 1H), 3.49 (s, 3H), 2.10 (quin, J=6.1 Hz, 1H), 1.60 (s, 6H), 0.84 (d, J=6.1 Hz, 4H).

Examples 20-24 in Table 3 were prepared in the same manner as example 19.

TABLE 3

| Ex # | Structure | Analytical data |
|---|---|---|
| 20 | (structure) | LCMS m/z = 481.1 (M + H)$^+$. $^1$H NMR (400 MHz, DMSO-d$_6$) δ 11.32 (s, 1H), 10.94 (s, 1H), 9.14 (s, 1H), 9.01 (s, 2H), 8.16 (s, 1H), 7.55 (ddd, J = 17.5, 7.9, 1.6 Hz, 2H), 7.39 – 7.24 (m, 1H), 5.45 (s, 1H), 3.70 (s, 3H), 2.15 – 2.03 (m, 1H), 1.55 (s, 6H), 0.90 – 0.77 (m, 4H) |
| 21 | (structure) | LCMS m/z = 499.2 (M + H)$^+$. $^1$H NMR (400 MHz, DMSO-d$_6$) δ 11.40 (s, 1H), 11.13 (s, 1H), 9.18 (s, 1H), 9.03 (s, 2H), 8.26 (s, 1H), 7.50 (dd, J = 9.6, 3.1 Hz, 1H), 7.33 (dd, J = 9.1, 3.1 Hz, 1H), 5.48 (s, 1H), 3.71 (s, 3H), 2.20 – 2.01 (m, 1H), 1.55 (s, 6H), 0.93 – 0.80 (m, 4H) |
| 22 | (structure) | LCMS m/z = 499.6 (M + H)$^+$. $^1$H NMR (400 MHz, DMSO-d$_6$) δ 11.39 (s, 1H), 11.17 (s, 1H), 9.18 (s, 1H), 8.26 (s, 1H), 8.14 – 8.06 (m, 1H), 7.99 (d, J = 8.8 Hz, 1H), 7.50 (dd, J = 9.7, 3.1 Hz, 1H), 7.40 (dd, J = 9.0, 3.47 (s, 3H), 2.18 – 2.04 (m, 1H), 1.59 (s, 6H), 0.91 – 0.80 (m, 4H) |

TABLE 3-continued

| Ex # | Structure | Analytical data |
|---|---|---|
| 23 | | LCMS m/z = 499.6 (M + H)$^+$. $^1$H NMR (400 MHz, DMSO-d$_6$) δ 11.34 (s, 1H), 11.00 (s, 1H), 9.15 (s, 1H), 8.18 (s, 1H), 8.09 – 8.01 (m, 1H), 7.94 (d, J = 8.9 Hz, 1H), 7.64 – 7.56 (m, 2H), 7.42 – 7.32 (m, 1H), 5.49 – 5.26 (m, 1H), 3.48 (s, 3H), 1.92 (m, 1H), 1.91 – 1.81 (m, 1H), 1.59 (s, 3H), 0.84 (d, J = 6.1 Hz, 4H), 0.75 (t, J = 7.4 Hz, 3H) |
| 24 | | LCMS m/z = 485.5 (M + H)$^+$. $^1$H NMR (400 MHz, DMSO-d$_6$) δ 11.41 (s, 1H), 11.19 (s, 1H), 9.20 (s, 1H), 9.04 (d, J = 1.5 Hz, 1H), 8.90 (d, J = 1.1 Hz, 1H), 8.28 (s, 1H), 7.50 (dd, J = 9.5, 3.1 Hz, 1H), 7.38 (dd, J = 9.2, 3.1 Hz, 1H), 5.66 (d, J = 4.8 Hz, 1H), 4.96 – 4.84 (m, 1H), 3.54 (s, 3H), 2.18 – 2.04 (m, 1H), 1.48 (d, J = 6.6 Hz, 3H), 0.86 (d, J = 6.0 Hz, 4H) |

Example 25

6-(Cyclopropanecarboxamido)-4-((3-(5-(2-hydroxy-propan-2-yl)pyrazin-2-yl)-2-methoxyphenyl)amino)-N-(methyl-d3)pyridazine-3-carboxamide

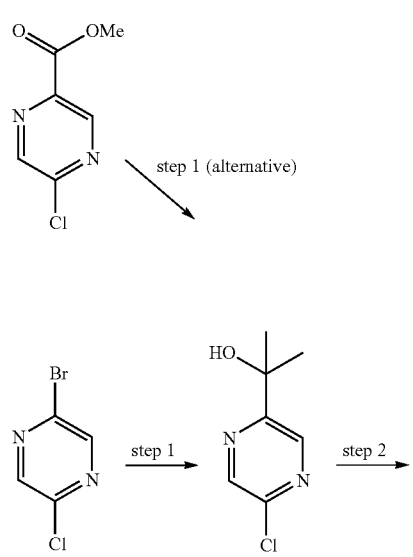

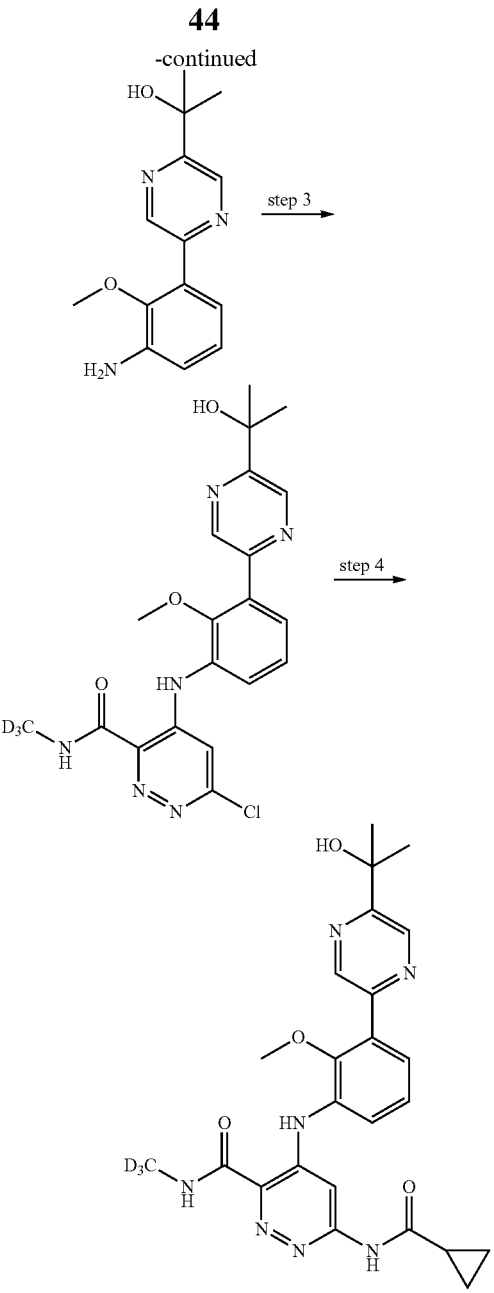

Step 1. 2-(5-Chloropyrazin-2-yl)propan-2-ol

To a suspension of 2-bromo-5-chloropyrazine (2.02 g, 10.44 mmol) in diethyl ether (30 mL) at −78° C. was added n-butyllithium (4.26 mL, 10.65 mmol) over 10 min. The resulting mixture was stirred at −78° C. for 15 min before propan-2-one (1.917 mL, 26.1 mmol) was added over 2 min. The mixture was stirred at −78° C. for 15 min and then at rt for 30 min. The reaction was quenched with saturated NH$_4$Cl solution (30 mL), and the solution was extracted with ethyl acetate (4×40 mL). The combined extract was dried over anhydrous Na$_2$SO$_4$. The desired product, 2-(5-chloropyrazin-2-yl)propan-2-ol (0.507 g, 2.94 mmol, 28.1% yield), was isolated by ISCO chromatography (120 g silica gel, solid loading, 10-40% ethyl acetate/hexane). LCMS m/z=173.2 (M+H)$^+$. $^1$H NMR (400 MHz, DMSO-d$_6$) δ 8.72-8.69 (m, 2H), 5.56 (br s, 1H), 1.47 (s, 6H).

Step 1 (alternative). 2-(5-Chloropyrazin-2-yl)propan-2-ol

To a solution of methyl 5-chloropyrazine-2-carboxylate (2.51 g, 14.54 mmol) in THF (48.5 ml) at 0° C. was added dropwise 3 M methylmagnesium bromide in diethyl ether (15.0 ml, 45.0 mmol) over 15 min. The mixture was stirred at 0° C. for 2 h before it was quenched with water (50 mL) and diluted with ethyl acetate (125 mL). The layers were separated, and the organic layer was washed with water (50 mL) and brine (50 mL) successively, and dried over $Na_2SO_4$. The desired product, 2-(5-Chloropyrazin-2-yl)propan-2-ol (0.4412 g, 2.352 mmol, 16.2% yield) was isolated as a yellow oil by ISCO chromatography (120 g silica gel, solid loading, 0-40% ethyl acetate/hexane). LCMS m/z=173.2 $(M+H)^+$.

Step 2. 2-(5-(3-Amino-2-methoxyphenyl)pyrazin-2-yl)propan-2-ol

A mixture of 2-(5-chloropyrazin-2-yl)propan-2-ol (0.191 g, 1.105 mmol), 2-methoxy-3-(4,4,5,5-tetramethyl-1,3,2-dioxaborolan-2-yl)aniline (0.284 g, 1.015 mmol), 2 M aqueous potassium triphosphate (1.5 ml, 3.05 mmol), and $PdCl_2$(dppf)-$CH_2Cl_2$ adduct (0.050 g, 0.061 mmol) in 1,4-dioxane (6.8 ml) in a sealed pressure vial was heated at 105° C. for 19 h. Upon cooling to rt, the mixture was diluted with ethyl acetate (25 mL) and filtered through Celite. The filtrate was washed with water (10 mL). The aqueous layer was extracted with ethyl acetate (2×25 mL). The organic layers were combined and dried over $Na_2SO_4$. The desired product, 2-(5-(3-amino-2-methoxyphenyl)pyrazin-2-yl)propan-2-ol (0.2208 g, 0.834 mmol, 82% yield), was isolated as a yellow oil by ISCO chromatography (24 g silica gel, 0-100% ethyl acetate/hexane). LCMS m/z=260.2 $(M+H)^+$.

Step 3. 6-Chloro-4-((3-(5-(2-hydroxypropan-2-yl)pyrazin-2-yl)-2-methoxyphenyl)amino)-N-(methyl-d3)pyridazine-3-carboxamide To a solution of 2-(5-(3-amino-2-methoxyphenyl)pyrazin-2-yl)propan-2-ol (0.2187 g, 0.843 mmol) and 4,6-dichloro-N-trideuteromethylpyridazine-3-carboxamide (0.168 g, 0.803 mmol) in THF (8.03 ml) at rt was added 1 M lithium bis(trimethylsilyl)amide/THF (3.21 ml, 3.21 mmol) over 1 min. The mixture was stirred at rt for 1 h before it was quenched with water (5 mL). The resulting mixture was adjusted with 1 N HCl solution to pH 9-10, diluted with ethyl acetate (125 mL), and washed with water (20 mL) and brine (20 mL). The organic layer was dried over anhydrous $MgSO_4$ solution. The desired product, 6-Chloro-4-((3-(5-(2-hydroxypropan-2-yl)pyrazin-2-yl)-2-methoxyphenyl)amino)-N-(methyl-d3)pyridazine-3-carboxamide (0.2082 g, 0.482 mmol, 60.0% yield), was isolated as an off-white solid by ISCO chromatography (24 g silica gel, 0-100% ethyl acetate/hexane). LCMS m/z=432.2 $(M+H)^+$.

Step 4. 6-(Cyclopropanecarboxamido)-4-((3-(5-(2-hydroxypropan-2-yl)pyrazin-2-yl)-2-methoxyphenyl)amino)-N-(methyl-d3)pyridazine-3-carboxamide A mixture of 6-chloro-4-((3-(5-(2-hydroxypropan-2-yl)pyrazin-2-yl)-2-methoxyphenyl)amino)-N-(methyl-d3)pyridazine-3-carboxamide (0.102 g, 0.236 mmol), cyclopropanecarboxamide (0.040 g, 0.473 mmol), XantPhos (0.021 g, 0.035 mmol), cesium carbonate (0.169 g, 0.520 mmol) and $Pd_2(dba)_3$ (0.032 g, 0.035 mmol) in 1,4-dioxane (5.4 ml) and N-methyl-2-pyrrolidinone (0.54 ml) was heated under microwave conditions at 145° C. for 1 h. Upon cooling to rt, the mixture was diluted with ethyl acetate (10 mL) and filtered through Celite. The filtrate was concentrated under vacuum, and the residue was subjected to preparative HPLC. The correct fractions were combined, basified with solid $NaHCO_3$, concentrated under vacuum, and extracted with dichloromethane (3×). The combined extract was dried over $Na_2SO_4$. Removal of the solvent under vacuum provided 6-(cyclopropanecarboxamido)-4-((3-(5-(2-hydroxypropan-2-yl)pyrazin-2-yl)-2-methoxyphenyl)amino)-N-(methyl-d3)pyridazine-3-carboxamide (0.0342 g, 0.071 mmol, 30.1% yield) as a light yellow solid. LCMS m z=481.5 $(M+H)^+$. $^1$H NMR (400 MHz, DMSO-$d_6$) δ 11.32 (s, 1H), 10.97 (s, 1H), 9.14 (s, 1H), 9.01 (d, J=1.5 Hz, 1H), 8.96 (d, J=1.5 Hz, 1H), 8.16 (s, 1H), 7.60-7.52 (m, 2H), 7.39-7.29 (m, 1H), 5.49 (s, 1H), 3.53 (s, 3H), 2.14-2.03 (m, 1H), 1.52 (s, 6H), 0.86-0.78 (m, 4H).

Examples 26-35 in Table 4 were prepared in the same manner as example 25.

TABLE 4

| Ex # | Structure | Analytical data |
| --- | --- | --- |
| 26 | | LCMS m/z = 499.4 (M + H)$^+$. $^1$H NMR (400 MHz, DMSO-$d_6$) δ 11.32 (s, 1H), 10.94 (s, 1H), 9.14 (s, 1H), 9.03 (s, 2H), 8.15 (s, 1H), 7.56 (ddd, J = 16.4, 7.9, 1.6 Hz, 2H), 7.31 (t, J = 7.8 Hz, 1H), 5.92 (s, 1H), 4.65 – 4.54 (m, 1H), 4.52 – 4.41 (m, 1H), 3.70 (s, 3H), 2.14 – 2.04 (m, 1H), 1.56 (d, J = 2.2 Hz, 3H), 0.86 – 0.79 (m, 4H) |
| 27 | | LCMS m/z = 493.4 (M + H)$^+$. $^1$H NMR (400 MHz, DMSO-$d_6$) δ 11.32 (s, 1H), 10.94 (s, 1H), 9.13 (s, 1H), 9.03 (s, 2H), 8.16 (s, 1H), 7.56 (ddd, J = 14.6, 7.9, 1.6 Hz, 2H), 7.31 (t, J = 7.9 Hz, 1H), 5.95 (br s, 1H), 3.70 (s, 3H), 2.60 – 2.49 (m, 2H), 2.43 – 2.31 (m, 2H), 2.16 – 2.04 (m, 1H), 2.03 – 1.90 (m, 1H), 1.86 – 1.68 (m, 1H), 0.91 – 0.76 (m, 4H) |

TABLE 4-continued

| Ex # | Structure | Analytical data |
|---|---|---|
| 28 | | LCMS m/z = 611.4 (M + H)⁺. ¹H NMR (400 MHz, DMSO-d₆) δ 11.39 (s, 1H), 11.14 (s, 1H), 9.18 (s, 1H), 9.05 (s, 2H), 8.26 (s, 1H), 7.50 (dd, J = 9.6, 3.1 Hz, 1H), 7.34 (dd, J = 9.0, 3.1 Hz, 1H), 5.98 (s, 1H), 3.71 (s, 3H), 2.58 – 2.52 (m, 2H), 2.42 – 2.32 (m, 2H), 2.16 – 2.07 (m, 1H), 1.98 (ddq, J = 11.2, 9.6, 4.8 Hz, 1H), 1.84 – 1.72 (m, 1H), 0.92 – 0.79 (m, 4H) |
| 29 | | LCMS m/z = 611.4 (M + H)⁺. ¹H NMR (400 MHz, DMSO-d₆) δ 11.32 (s, 1H), 10.94 (s, 1H), 9.14 (s, 1H), 9.06 (s, 2H), 8.15 (s, 1H), 7.58 (ddd, J = 15.5, 7.9, 1.5 Hz, 2H), 7.38 – 7.27 (m, 1H), 6.50 (s, 1H), 4.87 – 4.75 (m, 2H), 4.74 – 4.63 (m, 2H), 3.71 (s, 3H), 2.09 (quin, J = 6.2 Hz, 1H), 0.88 – 0.79 (m, 4H) |
| 30 | | LCMS m/z = 535.5 (M + H)⁺. ¹H NMR (400 MHz, DMSO-d₆) δ 11.32 (s, 1H), 10.95 (s, 1H), 9.17 – 9.10 (m, 3H), 8.15 (s, 1H), 7.59 (ddd, J = 9.8, 8.0, 1.5 Hz, 2H), 7.33 (t, J = 7.9 Hz, 1H), 7.12 (s, 1H), 3.71 (s, 3H), 2.14 – 2.04 (m, 1H), 1.83 (s, 3H), 0.87 – 0.77 (m, 4H) |
| 31 | | LCMS m/z = 509.7 (M + H)⁺. ¹H NMR (400 MHz, DMSO-d₆) δ 11.32 (s, 1H), 10.94 (s, 1H), 9.14 (s, 1H), 9.03 (s, 2H), 8.15 (s, 1H), 7.56 (ddd, J = 18.1, 7.9, 1.5 Hz, 2H), 7.31 (t, J = 7.8 Hz, 1H), 5.81 (s, 1H), 4.10 – 4.01 (m, 2H), 3.95 – 3.84 (m, 2H), 3.70 (s, 3H), 2.41 (dt, J = 12.7, 9.0 Hz, 1H), 2.30 – 2.20 (m, 1H), 2.09 (quin, J = 6.2 Hz, 1H), 0.87 – 0.79 (m, 4H) |
| 32 | | LCMS m/z = 509.7 (M + H)⁺. ¹H NMR (400 MHz, DMSO-d₆) δ 11.39 (s, 1H), 11.13 (s, 1H), 9.18 (s, 1H), 9.05 (s, 2H), 8.25 (s, 1H), 7.51 (dd, J = 9.5, 3.2 Hz, 1H), 7.34 (dd, J = 9.0, 3.1 Hz, 1H), 5.94 (s, 1H), 4.65 –4.54 (m, 1H), 4.53 – 4.41 (m, 1H), 3.71 (s, 3H), 2.11 (quin, J = 6.1 Hz, 1H), 1.56 (d, J = 2.1 Hz, 3H), 0.89 – 0.82 (m, 4H) |
| 33 | | LCMS m/z = 495.1 (M + H)⁺. ¹H NMR (400 MHz, DMSO-d₆) δ 11.35 (s, 1H), 11.01 (s, 1H), 9.16 (s, 1H), 9.13 (d, J = 1.5 Hz, 1H), 8.95 (d, J = 1.5 Hz, 1H), 8.18 (s, 1H), 7.65 – 7.56 (m, 2H), 7.45 – 7.32 (m, 1H), 6.84 (s, 1H), 4.99 (d, J = 6.6 Hz, 2H), 4.74 (d, J = 6.5 Hz, 2H), 3.56 (s, 3H), 2.14 – 2.06 (m, 1H), 0.88 – 0.80 (m, 4H) |
| 34 | | LCMS m/z = 509.2 (M + H)⁺. ¹H NMR (400 MHz, DMSO-d₆) δ 11.35 (s, 1H), 10.99 (s, 1H), 9.16 (s, 1H), 9.05 (d, J = 1.6 Hz, 1H), 9.03 (d, J = 1.6 Hz, 1H), 8.17 (s, 1H), 7.64 – 7.54 (m, 2H), 7.43 – 7.32 (m, 1H), 5.93 (s, 1H), 4.12 – 4.02 (m, 2H), 4.00 (d, J = 8.8 Hz, 1H), 3.93 – 3.88 (m, 1H), 3.55 (s, 3H), 2.59 – 2.53 (m, 1H), 2.22 – 2.14 (m, 1H), 2.14 – 2.06 (m, 1H), 0.88 – 0.80 (m, 4H) |
| 35 | | LCMS m/z = 499.2 (M + H)⁺. ¹H NMR (400 MHz, DMSO-d₆) δ 11.34 (s, 1H), 10.99 (s, 1H), 9.16 (s, 1H), 9.09– 8.98 (m, 2H), 8.18 (s, 1H), 7.65 – 7.54 (m, 2H), 7.43 – 7.32 (m, 1H), 5.97 (s, 1H), 4.77 – 4.48 (m, 2H), 3.55 (s, 3H), 2.15 – 2.05 (m, 1H), 1.51 (d, J = 2.2 Hz, 3H), 0.88 – 0.80 (m, 4H) |

Example 36

6-(Cyclopropanecarboxamido)-4-((3-(5-(dimethylcarbamoyl)pyrazin-2-yl)-2-methoxyphenyl)amino)-N-(methyl-d3)pyridazine-3-carboxamide

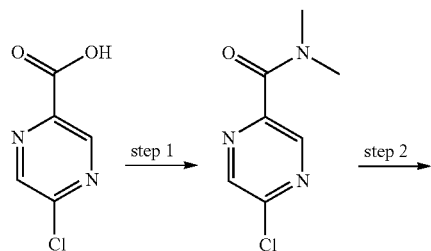

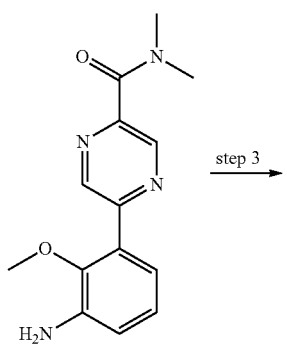

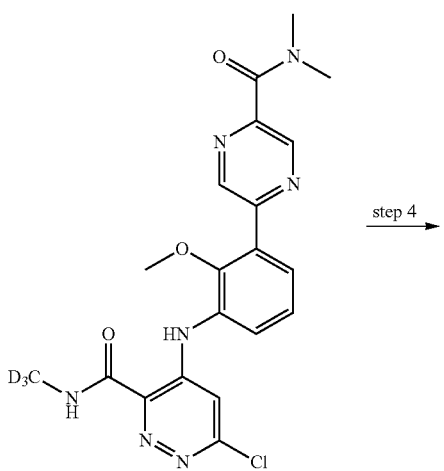

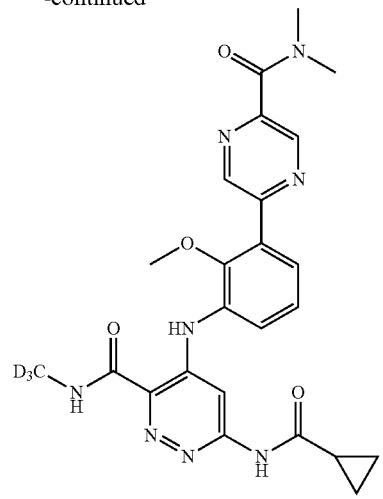

Step 1. 5-Chloro-N,N-dimethylpyrazine-2-carboxamide

To a suspension of 5-chloropyrazine-2-carboxylic acid (0.500 g, 3.15 mmol) in dichloromethane (5 mL) and DMF (2 drops) at rt was added oxylyl chloride (0.402 mL, 3.63 mmol) dropwise over 10 min. The mixture was stirred at rt for 2 h before it was concentrated under vacuum to dryness. The residue was dissolved in dichloromethane (5 mL). Dimethylamine in THF (1.892 mL, 3.78 mmol) was added at rt over 5 min, followed by the addition of triethylamine (0.967 mL, 6.94 mmol). The mixture was stirred at rt for 3 h and then concentrated under vacuum to dryness. To the residue was added dichloromethane (50 mL), and the insoluble material was removed by suction filtration through Celite. The filtrate was concentrated under vacuum and the residue was applied to ISCO chromatography (80 g silica gel, solid loading, 70-100% ethyl acetate) to provide 5-chloro-N,N-dimethylpyrazine-2-carboxamide (0.304 g, 1.638 mmol, 51.9% yield), as a white solid. LCMS m/z=186.1 (M+H)$^+$.

Step 2. 5-(3-Amino-2-methoxyphenyl)-N,N-dimethylpyrazine-2-carboxamide

A mixture of 2-methoxy-3-(4,4,5,5-tetramethyl-1,3,2-dioxaborolan-2-yl)aniline (200 mg, 0.803 mmol), 5-chloro-N,N-dimethylpyrazine-2-carboxamide (152 mg, 0.819 mmol), PdCl$_2$(dppf)-CH$_2$Cl$_2$ adduct (39.3 mg, 0.048 mmol), and 2 M aqueous potassium triphosphate (1.204 mL, 2.409 mmol) in 1,4-dioxane (5.5 mL) was heated at 100° C. for 16 h. The mixture was diluted with ethyl acetate (15 mL) and filtered through Celite. The filtrate was concentrated under vacuum to dryness. The residue was diluted with water (15 mL) and extracted with dichloromethane (3×40 mL). The combined extract was dried over anhydrous MgSO$_4$. The desired product, 5-(3-amino-2-methoxyphenyl)-N,N-dimethylpyrazine-2-carboxamide (143 mg, 0.525 mmol, 65.4% yield), was isolated as a white solid by ISCO chromatography (40 g silica gel, solid loading, 60-95% ethyl acetate/hexane). LCMS m/z=273.1 (M+H)$^+$.

Step 3. 6-Chloro-4-((3-(5-(dimethylcarbamoyl)pyrazin-2-yl)-2-methoxyphenyl)amino)-N-(methyl-d3)pyridazine-3-carboxamide To a solution of 4,6-dichloro-N-trideuteromethylpyridazine-3-carboxamide and 5-(3-amino-2-methoxyphenyl)-N,N-dimethylpyrazine-2-carboxamide (70.4 mg, 0.259 mmol) in THF (4 mL) at rt was added lithium bis(trimethylsilyl)amide in THF (0.634 mL, 0.634 mmol) over 5 min. The mixture was stirred at rt for 1 h before it was quenched with water (5 mL). The resulting mixture was adjusted with 1 N HCl solution to pH 9-10, diluted with ethyl acetate (100 mL), and washed with water (2×20 mL) and brine (20 mL). The organic layer was dried over anhydrous MgSO₄. The desired product, 6-chloro-4-((3-(5-(dimethylcarbamoyl)pyrazin-2-yl)-2-methoxyphenyl)amino)-N-(methyl-d3)pyridazine-3-carboxamide (93.1 mg, 0.209 mmol, 83% yield), was isolated as a light yellow solid by ISCO chromatography (24 g silica gel, solid loading, 60-100% ethyl acetate/hexane). LCMS m/z=445.1 (M+H)⁺.

Step 4. 6-(Cyclopropanecarboxamido)-4-((3-(5-(dimethylcarbamoyl)pyrazin-2-yl)-2-methoxyphenyl)amino)-N-(methyl-d3)pyridazine-3-carboxamide A mixture of (50 mg, 0.112 mmol), 6-chloro-4-((3-(5-(dimethylcarbamoyl)pyrazin-2-yl)-2-methoxyphenyl)amino)-N-(methyl-d3)pyridazine-3-carboxamide, cyclopropanecarboxamide (23.91 mg, 0.281 mmol), tris(dibenzylideneacetone)dipalladium(0) (15.44 mg, 0.017 mmol), XantPhos (9.75 mg, 0.017 mmol), and cesium carbonate (92 mg, 0.281 mmol) in 1,4-dioxane (2.2 mL) and NMP (0.3 mL) was heated under microwave conditions at 135° C. for 1 h. The mixture was diluted with ethyl acetate (6 mL) and filtered through Celite. The filtrate was concentrated under vacuum. The residue was injected to preparative HPLC. The correct fractions were combined, concentrated under vacuum, and basified with 1.5 M K₂HPO₄ solution to pH 10, extracted with dichloromethane (3×40 mL). The combined extract was dried over anhydrous Na₂SO₄. Removal of solvent under vacuum provided 6-(cyclopropanecarboxamido)-4-((3-(5-(dimethylcarbamoyl)pyrazin-2-yl)-2-methoxyphenyl)amino)-N-trideuteromethylpyridazine-3-carboxamide (27.4 mg, 0.055 mmol, 48.9% yield), as a pale solid. LCMS m/z=494.2 (M+H)⁺. ¹H NMR (400 MHz, DMSO-d₆) δ 11.35 (s, 1H), 11.01 (s, 1H), 9.16 (s, 1H), 9.08 (d, J=1.6 Hz, 1H), 8.96 (d, J=1.5 Hz, 1H), 8.17 (s, 1H), 7.63 (ddd, J=7.9, 6.4, 1.5 Hz, 2H), 7.45-7.35 (m, 1H), 3.56 (s, 3H), 3.07 (d, J=4.5 Hz, 6H), 2.15-2.05 (m, 1H), 0.87-0.79 (m, 4H).

Examples 37-49 in Table 5 were prepared in the same manner as example 36.

TABLE 5

| Ex # | Structure | Analytical data |
|---|---|---|
| 37 | | LCMS m/z = 538.1 (M + H)⁺. ¹H NMR (400 MHz, DMSO-d₆) δ 11.35 (s, 1H), 11.01 (s, 1H), 9.24 – 9.04 (m, 3H), 8.17 (s, 1H), 7.64 (td, J = 8.1, 1.5 Hz, 2H), 7.47 – 7.33 (m, 1H), 5.54 – 5.27 (m, 1H), 4.16 – 3.92 (m, 2H), 3.90 – 3.79 (m, 2H), 3.68 – 3.59 (m, 1H), 3.56 (s, 3H), 2.21 (dq, J = 13.5, 5.7 Hz, 1H), 2.14 – 2.06 (m, 1H), 0.88 – 0.80 (m, 4H) |
| 38 | | LCMS m/z = 536.2 (M + H)⁺. ¹H NMR (400 MHz, DMSO-d₆) δ 11.35 (s, 1H), 11.00 (s, 1H), 9.16 (s, 1H), 9.09 (d, J = 1.5 Hz, 1H), 9.00 (d, J = 1.5 Hz, 1H), 8.17 (s, 1H), 7.66 – 7.59 (m, 2H), 7.43 – 7.36 (m, 1H), 3.71 (s, 4H), 3.65 – 3.58 (m, 4H), 3.57 (s, 3H), 2.17 – 2.03 (m, 1H), 0.90 – 0.78 (m, 4H) |
| 39 | | LCMS m/z = 480.2 (M + H)⁺. ¹H NMR (400 MHz, DMSO-d₆) δ 11.35 (s, 1H), 11.03 (s, 1H), 9.29 (d, J = 1.5 Hz, 1H), 9.21 – 9.10 (m, 2H), 8.99 (q, J = 4.7 Hz, 1H), 8.19 (s, 1H), 7.72 – 7.58 (m, 2H), 7.47 – 7.35 (m, 1H), 3.54 (s, 3H), 2.87 (d, J = 4.9 Hz, 3H), 2.17 – 2.04 (m, 1H), 0.91 – 0.79 (m, 4H) |
| 40 | | LCMS m/z = 506.3 (M + H)⁺. ¹H NMR (500 MHz, DMSO-d₆) δ 11.34 (s, 1H), 10.95 (s, 1H), 9.20 (d, J = 0.9 Hz, 1H), 9.14 (s, 1H), 9.08 (s, 1H), 8.13 (s, 1H), 7.62 (t, J = 8.0 Hz, 2H), 7.38 (t, J = 7.9 Hz, 1H), 4.63 (br t, J = 1.6 Hz, 2H), 4.14 (br t, J = 7.7 Hz, 2H), 3.54 (s, 3H), 2.32 (brt, J = 1.1 Hz, 2H), 2.11 – 2.03 (m, 1H), 0.87 – 0.79 (m, 4H) |
| 41 | | LCMS m/z = 494.2 (M + H)⁺. ¹H NMR (500 MHz, DMSO-d₆) δ 11.36 (s, 1H), 11.00 (s, 1H), 9.16 (s, 1H), 8.25 – 8.14 (m, 2H), 7.95 (d, J = 8.8 Hz, 1H), 7.64 (dd, J = 6.7, 5.4 Hz, 2H), 7.40 (t, J = 7.9 Hz, 1H), 3.50 (s, 3H), 3.11 (s, 3H), 3.05 (s, 3H), 2.09 (quin, J = 6.1 Hz, 1H), 0.90 – 0.79 (m, 4H) |

TABLE 5-continued

| Ex # | Structure | Analytical data |
|---|---|---|
| 42 | 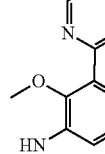 | LCMS m/z = 512.1 (M + H)+. 1H NMR (500 MHz, DMSO-d6) δ 11.41 (s, 1H), 11.17 (s, 1H), 9.17 (s, 1H), 8.32 – 8.17 (m, 2H), 7.96 (d, J = 8.8 Hz, 1H), 7.55 (dd, J = 9.8, 2.7 Hz, 1H), 7.45 (dd, J = 8.9, 2.9 Hz, 1H), 3.54 (s, 3H), 3.10 (s, 3H), 3.03 (s, 3H), 2.14 – 2.02 (m, 1H), 0.86 (br d, J = 6.1 Hz, 4H) |
| 43 | | LCMS m/z = 493.2 (M + H)+. 1H NMR (500 MHz, DMSO-d6) δ 11.35 (s, 1H), 11.00 (s, 1H), 9.15 (s, 1H), 8.75 (s, 1H), 8.18 (s, 1H), 8.01 – 7.90 (m, 2H), 7.66 – 7.48 (m, 2H), 7.34 (t, J = 1.7 Hz, 1H), 3.51 (s, 3H), 3.04 (br s, 3H), 3.01 (br s, 3H), 2.14 – 2.02 (m, 1H), 0.87 – 0.81 (m, 4H) |
| 44 | | LCMS m/z = 511.2 (M + H)+. 1H NMR (500 MHz, DMSO-d6) δ 11.42 (s, 1H), 11.19 (s, 1H), 9.19 (s, 1H), 8.77 (s, 1H), 8.28 (s, 1H), 8.07 – 7.92 (m, 2H), 7.46 (dd, J = 9.6, 2.9 Hz, 1H), 7.38 (dd, J = 9.3, 2.9 Hz, 1H), 3.51 (s, 3H), 3.04 (s, 3H), 3.00 (s, 3H), 2.11 (quin, J = 6.1 Hz, 1H), 0.86 (br d, J = 5.7 Hz, 4H) |
| 45 | | LCMS m/z = 519.3 (M + H)+. 1H NMR (500 MHz, DMSO-d6) δ 11.35 (s, 1H), 11.00 (s, 1H), 9.16 (s, 1H), 8.85 (s, 1H), 8.18 (s, 1H), 8.05 (dd, J = 8.1, 1.7 Hz, 1H), 7.94 (d, J = 8.1 Hz, 1H), 7.65 – 7.50 (m, 2H), 7.34 (t, J = 7.7 Hz, 1H), 3.55 – 3.48 (m, 7H), 2.16 – 2.04 (m, 1H), 1.96 – 1.80 (m, 4H), 0.84 (br d, J = 4.7 Hz, 4H) |
| 46 | | LCMS m/z = 494.6 (M + H)+. 1H NMR (400 MHz, DMSO-d6) δ 11.33 (s, 1H), 10.97 (s, 1H), 9.14 (s, 1H), 9.04 (s, 2H), 8.16 (s, 1H), 7.68 – 7.56 (m, 2H), 7.41 – 7.27 (m, 1H), 3.71 (s, 3H), 3.06 (s, 6H), 2.16 – 2.03 (m, 1H), 0.90 – 0.78 (m, 4H) |
| 47 | | LCMS m/z = 520.6 (M + H)+. 1H NMR (400 MHz, DMSO-d6) δ 11.33 (s, 1H), 10.97 (s, 1H), 9.14 (s, 1H), 9.12 (s, 2H), 8.16 (s, 1H), 7.62 (ddd, J = 7.7, 6.0, 1.6 Hz, 2H), 7.34 (t, J = 7.9 Hz, 1H), 3.71 (s, 3H), 3.62 – 3.50 (m, 4H), 2.16 – 2.04 (m, 1H), 1.97 – 1.84 (m, 4H), 0.88 – 0.80 (m, 4H) |
| 48 | | LCMS m/z = 506.6 (M + H)+. 1H NMR (400 MHz, DMSO-d6) δ 11.33 (s, 1H), 10.96 (s, 1H), 9.20 – 9.09 (m, 3H), 8.15 (s, 1H), 7.67 – 7.57 (m, 2H), 7.34 (t, J = 1.9 Hz, 1H), 4.47 (br t, J = 7.6 Hz, 2H), 4.12 (br t, J = 7.8 Hz, 2H), 3.70 (s, 3H), 2.32 (dt, J = 15.6, 7.8 Hz, 2H), 2.15 – 2.03 (m, 1H), 0.87 – 0.77 (m, 4H) |
| 49 | | LCMS m/z = 494.0 (M + H)+. 1H NMR (500 MHz, DMSO-d6) δ 11.35 (s, 1H), 10.97 (s, 1H), 9.15 (s, 1H), 9.10 (d, J = 5.0 Hz, 1H), 8.17 (s, 1H), 7.62 (br t, J = 5.4 Hz, 2H), 7.57 (br d, J = 7.7 Hz, 1H), 7.34 (br t, J = 1.9 Hz, 1H), 3.66 (s, 3H), 3.04 (s, 3H), 2.99 (s, 3H), 2.13 – 2.04 (m, 1H), 0.85 – 0.81 (m, 4H) |

Example 50

6-(Cyclopropanecarboxamido)-4-((3-(5-(ethyl (methyl)carbamoyl)pyrimidin-2-yl)-2-methoxyphenyl)amino)-N-(methyl-d3)pyridazine-3-carboxamide

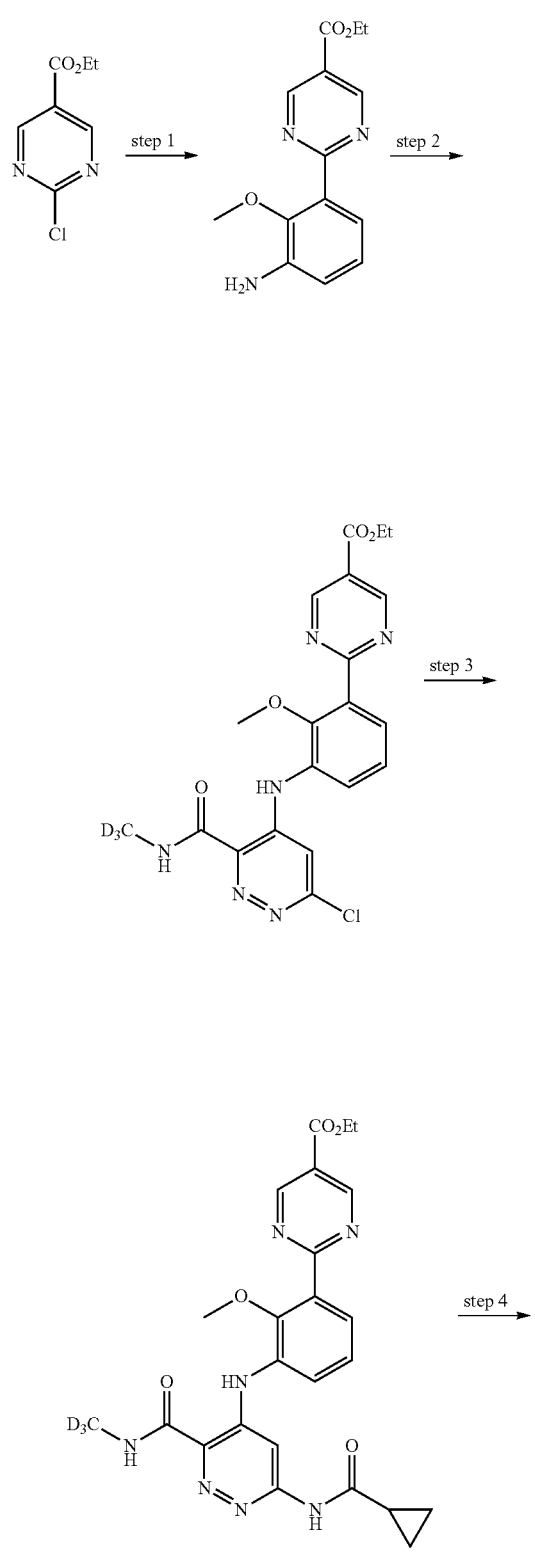

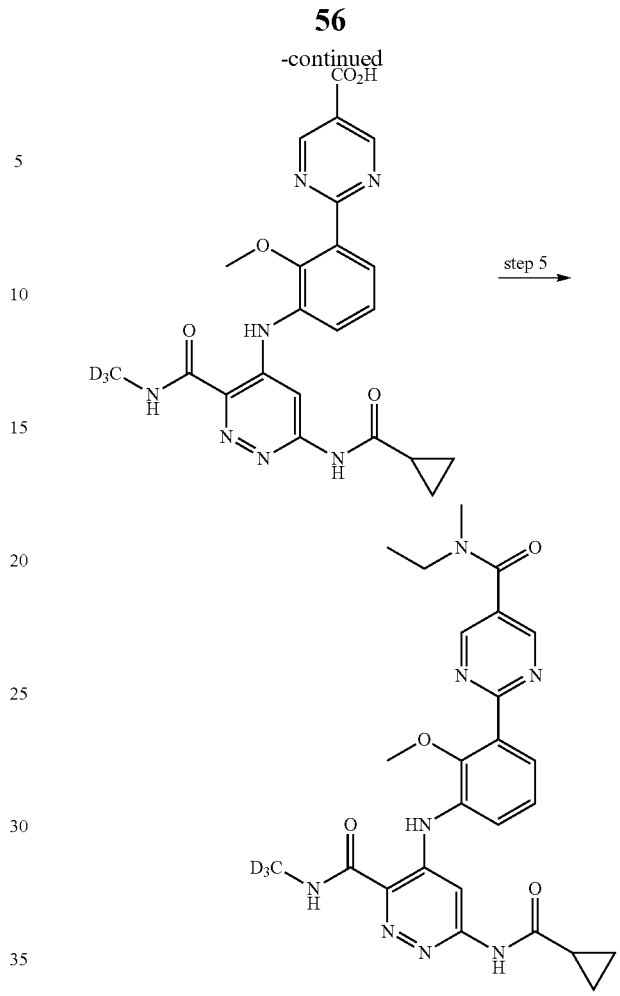

Step 1. Ethyl 2-(3-amino-2-methoxyphenyl)pyrimidine-5-carboxylate A solution of ethyl 2-chloropyrimidine-5-carboxylate (1.2442 g, 6.67 mmol), 2-methoxy-3-(4,4,5,5-tetramethyl-1,3,2-dioxaborolan-2-yl)aniline (1.5085 g, 6.06 mmol), 2 M $K_3PO_4$ solution (9.0 ml, 18.00 mmol) and $PdCl_2$(dppf)-$CH_2Cl_2$ adduct (0.2604 g, 0.319 mmol) in 1,4-dioxane (40.0 ml) in a sealed vial was heated at 75° C. for 4 h. Upon cooling to rt, the mixture was diluted with ethyl acetate (200 mL) and filtered through Celite. The filtrate was washed with brine and dried over $Na_2SO_4$. The desired product, ethyl 2-(3-amino-2-methoxyphenyl)pyrimidine-5-carboxylate (1.2886 g, 4.48 mmol, 74.0% yield) was isolated by flash chromatography (80 g silica gel, 0-75% ethyl acetate/hexane). LCMS m/z=274.3 (M+H)+.

Step 2. Ethyl 2-(3-((6-chloro-3-((methyl-d3)carbamoyl)pyridazin-4-yl)amino)-2-methoxyphenyl)pyrimidine-5-carboxylate To a solution of ethyl 2-(3-amino-2-methoxyphenyl)pyrimidine-5-carboxylate (0.7097 g, 2.60 mmol) and 4,6-dichloro-N-(methyl-d3)pyridazine-3-carboxamide (0.5515 g, 2.64 mmol) in THF (24 ml) at rt was added 1 M lithium bis(trimethylsilyl)amide/THF (8.0 ml, 8.00 mmol) over 3 min. The mixture was stirred at rt for 1.25 h before it was quenched with acetic acid (0.51 ml, 8.91 mmol), diluted with ethyl acetate (150 mL), washed with brine (30 mL), and dried over anhydrous $MgSO_4$. The desired product, ethyl 2-(3-((6-chloro-3-((methyl-d3)carbamoyl)pyridazin-4-yl)

amino)-2-methoxyphenyl)pyrimidine-5-carboxylate (0.3656 g, 0.820 mmol, 31.6% yield) was isolated as a white solid by flash chromatography (40 g silica gel, 0-50% ethyl acetate/hexane). LCMS m/z=446.6 (M+H)⁺. ¹H NMR (400 MHz, DMSO-d₆) δ 11.13 (s, 1H), 9.38 (s, 3H), 7.79-7.67 (m, 2H), 7.37 (t, J=7.9 Hz, 1H), 7.22 (s, 1H), 4.42 (q, J=7.1 Hz, 2H), 3.70 (s, 3H), 1.38 (t, J=7.1 Hz, 3H).

Step 3. Ethyl 2-(3-((6-(cyclopropanecarboxamido)-3-((methyl-d3)carbamoyl)pyridazin-4-yl)amino)-2-methoxyphenyl)pyrimidine-5-carboxylate A mixture of ethyl 2-(3-((6-chloro-3-((methyl-d3)carbamoyl)pyridazin-4-yl)amino)-2-methoxyphenyl)pyrimidine-5-carboxylate (0.344 g, 0.772 mmol) and cyclopropanecarboxamide (0.131 g, 1.543 mmol), XantPhos (0.067 g, 0.116 mmol), cesium carbonate (0.553 g, 1.697 mmol), and Pd₂(dba)₃ (0.085 g, 0.093 mmol) in 1,4-dioxane (10 ml) was degassed and heated at 150° C. for 2.5 h. Upon cooling to rt, the mixture was diluted with ethyl acetate (20 mL) and filtered through Celite. To the filtrate was added silica gel (1.7 g), and the mixture was concentrated under vacuum. The residue was subjected to flash chromatography (24 g silica gel, 25-100% ethyl acetate/hexane) to provide ethyl 2-(3-((6-(cyclopropanecarboxamido)-3-((methyl-d3)carbamoyl)pyridazin-4-yl)amino)-2-methoxyphenyl)pyrimidine-5-carboxylate (0.2926 g, 0.556 mmol, 72.1% yield) as a yellow solid. LCMS m/z=495.6 (M+H)⁺.

Step 4. 2-(3-((6-(Cyclopropanecarboxamido)-3-((methyl-d3)carbamoyl)pyridazin-4-yl)amino)-2-methoxyphenyl)pyrimidine-5-carboxylic acid To a solution of ethyl 2-(3-((6-(cyclopropanecarboxamido)-3-((methyl-d3)carbamoyl)pyridazin-4-yl)amino)-2-methoxyphenyl)pyrimidine-5-carboxylate (0.274 g, 0.554 mmol) in methanol (2 ml) and THF (4 ml) at rt was added a solution of lithium hydroxide monohydrate (0.1216 g, 2.90 mmol) in water (1.5 mL). The mixture was stirred at rt for 2 h, concentrated under vacuum to a volume of approximately 4 mL, and acidified with 1 N HCl solution to pH 4-5. The precipitating product, 2-(3-((6-(cyclopropanecarboxamido)-3-((methyl-d3)carbamoyl)pyridazin-4-yl)amino)-2-methoxyphenyl)pyrimidine-5-carboxylic acid (0.1700 g, 0.321 mmol, 57.9% yield) was collected as an off-white solid by suction filtration and dried. LCMS m/z=467.5 (M+H)⁺.

Step 5. 6-(Cyclopropanecarboxamido)-4-((3-(5-(ethyl(methyl)carbamoyl)pyrimidin-2-yl)-2-methoxyphenyl)amino)-N-(methyl-d3)pyridazine-3-carboxamide A mixture of 2-(3-((6-(cyclopropanecarboxamido)-3-((methyl-d3)carbamoyl)pyridazin-4-yl)amino)-2-methoxyphenyl)pyrimidine-5-carboxylic acid (0.0349 g, 0.075 mmol), N-methylethanamine (14.2 mg, 0.240 mmol), BOP (0.0544 g, 0.123 mmol), and diisopropylethylamine (0.05 ml, 0.286 mmol) in THF (1.5 ml) was heated at 50° C. for 20 h. The mixture was diluted with DMSO (1 mL) and MeOH (3 mL), and subjected to preparative HPLC. The correct fractions were combined, concentrated under vacuum, basified with saturated NaHCO₃ solution, and extracted with dichloromethane (3×). The combined extract was dried over anhydrous Na₂SO₄. Removal of the solvent under vacuum provided 6-(Cyclopropanecarboxamido)-4-((3-(5-(ethyl(methyl)carbamoyl)pyrimidin-2-yl)-2-methoxyphenyl)amino)-N-(methyl-d3)pyridazine-3-carboxamide (0.00892 g, 0.018 mmol, 23.49% yield) as a white solid. LCMS m/z=508.6 (M+H)⁺. ¹H NMR (400 MHz, DMSO-d₆) δ 11.33 (s, 1H), 10.97 (s, 1H), 9.14 (s, 1H), 9.02 (br d, J=11.9 Hz, 2H), 8.15 (s, 1H), 7.66-7.57 (m, 2H), 7.34 (t, J=7.9 Hz, 1H), 3.71 (s, 3H), 3.58-3.47 (m, 2H), 3.02 (s, 3H), 2.09 (quin, J=6.2 Hz, 1H), 1.17 (dt, J=10.9, 6.9 Hz, 3H), 0.87-0.79 (m, 4H).

Examples 51-54 in Table 6 were prepared in the same manner as example 50.

TABLE 6

| Ex # | Structure | Analytical data |
| --- | --- | --- |
| 51 | | LCMS m/z = 522.7 (M + H)⁺. ¹H NMR (400 MHz, DMSO-d₆) δ 11.32 (s, 1H), 10.97 (s, 1H), 9.14 (s, 1H), 9.00 (s, 2H), 8.15 (s, 1H), 7.66 – 7.54 (m, 2H), 7.34 (t, J = 7.9 Hz, 1H), 3.70 (s, 3H), 3.54 – 3.47 (m, 4H), 2.15 – 2.03 (m, 1H), 1.22 – 1.13 (m, 6H), 0.86 – 0.80 (m, 4H) |
| 52 | | LCMS m/z = 520.5 (M + H)⁺. ¹H NMR (500 MHz, DMSO-d₆) δ 11.34 (s, 1H), 10.96 (s, 1H), 9.13 (brd, J = 11.4 Hz, 3H), 8.16 (s, 1H), 7.61 (br d, J = 7.6 Hz, 2H), 7.34 (brt, J = 7.7 Hz, 1H), 3.67 (s, 3H), 3.17 – 3.05 (m, 1H), 3.05 (s, 3H), 2.07 (br s, 1H), 0.87 – 0.80 (m, 4H), 0.62 (br s, 2H), 0.51 (br s, 2H). |
| 53 | | LCMS m/z = 512.5 (M + H)⁺. ¹H NMR (500 MHz, DMSO-d₆) δ 11.42 (s, 1H), 11.17 (s, 1H), 9.20 (br s, 1H), 9.06 (s, 2H), 8.27 (s, 1H), 7.55 (br d, J = 7.0 Hz, 1H), 7.39 (dd, J = 9.0, 2.7 Hz, 1H), 3.72 (s, 3H), 3.05 (br s, 3H), 3.04 (br s, 3H), 2.17 – 2.03 (m, 1H), 0.86 (br d, J = 6.1 Hz, 4H) |

TABLE 6-continued

| Ex # | Structure | Analytical data |
|---|---|---|
| 54 | 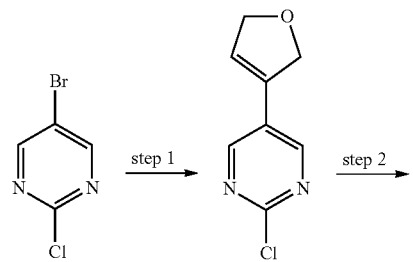 | LCMS m/z = 526.5 (M + H)⁺. ¹H NMR (500 MHz, DMSO-d₆) δ 11.41 (s, 1H), 11.16 (s, 1H), 9.18 (s, 1H), 9.05 (s, 1H), 9.02 (s, 1H), 8.26 (s, 1H), 7.54 (brdd, J = 9.4, 2.6 Hz, 1H), 7.39 (br d, J = 8.7 Hz, 1H), 3.71 (s, 3H), 3.57 – 3.47 (m, 2H), 3.02 (s, 3H), 2.18 – 2.02 (m, 1H), 1.25 – 1.06 (m, 3H), 0.86 (br d, J = 6.0 Hz, 4H) |

Example 55

6-(Cyclopropanecarboxamido)-4-((2-methoxy-3-(5-(tetrahydrofuran-3-yl)pyrimidin-2-yl)phenyl)amino)-N-(methyl-d3)pyridazine-3-carboxamide

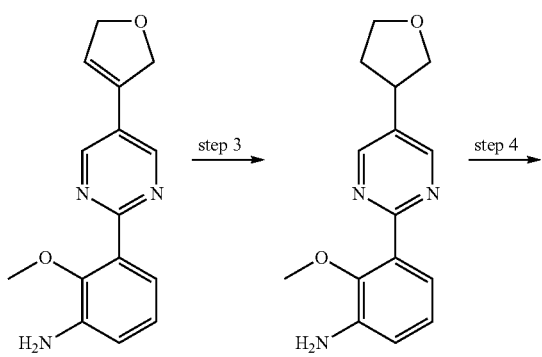

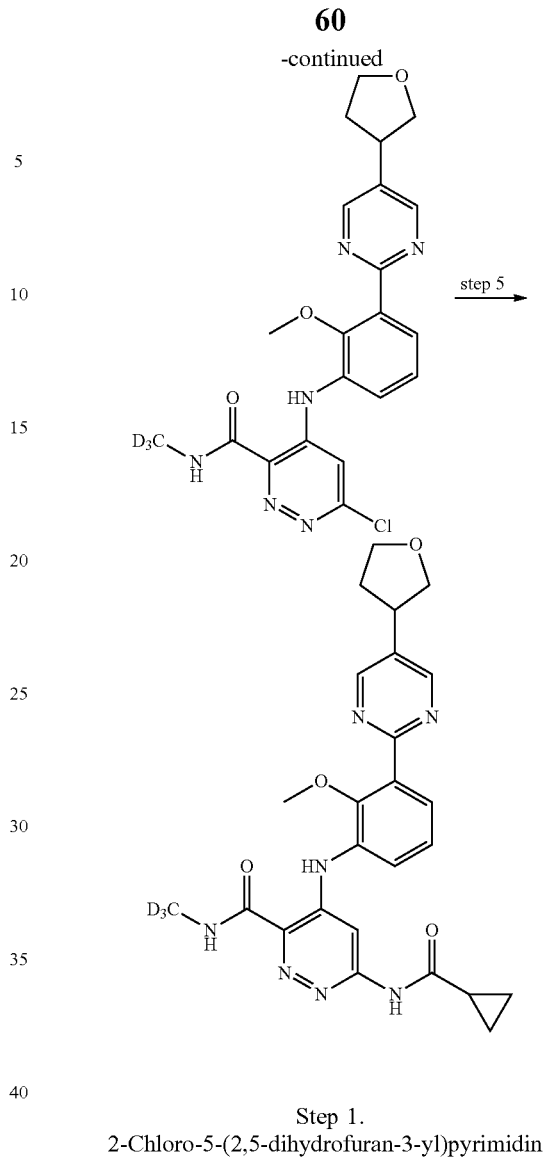

Step 1. 2-Chloro-5-(2,5-dihydrofuran-3-yl)pyrimidine

A solution of 5-bromo-2-chloropyrimidine (0.25 g, 1.292 mmol), 2-(4,5-dihydrofuran-3-yl)-4,4,5,5-tetramethyl-1,3,2-dioxaborolane (0.2619 g, 1.336 mmol), 2 M aqueous potassium triphosphate (2.0 ml, 4.00 mmol) and PdCl₂(dppf)-CH₂Cl₂ adduct (0.053 g, 0.065 mmol) in 1,4-dioxane (12.0 ml) in a sealed pressure tube was heated at 105° C. for 16 h. Upon cooling to rt, the mixture was diluted with ethyl acetate and filtered through Celite. The filtrate was concentrated under vacuum. The residue was purified by flash chromatography (silica gel 24 g, 0-50% ethyl acetate/hexane) to give 2-chloro-5-(2,5-dihydrofuran-3-yl)pyrimidine (0.0869 g, 0.476 mmol, 36.8% yield) as a white solid. LCMS m/z=183.1 (M+H)⁺. ¹H NMR (400 MHz, DMSO-d₆) δ 8.88 (s, 2H), 6.87 (t, J=2.1 Hz, 1H), 4.92 (td, J=5.0, 2.2 Hz, 2H), 4.75 (td, J=5.0, 2.0 Hz, 2H).

Step 2. 3-(5-(2,5-Dihydrofuran-3-yl)pyrimidin-2-yl)-2-methoxyaniline

A solution of 2-chloro-5-(2,5-dihydrofuran-3-yl)pyrimidine (0.0869 g, 0.476 mmol), 2-methoxy-3-(4,4,5,5-tetramethyl-1,3,2-dioxaborolan-2-yl)aniline (0.1316 g, 0.528 mmol), 2 M aqueous K₃PO₄ solution (0.72 ml, 1.440 mmol) and PdCl₂(dppf)-CH₂Cl₂ adduct (0.019 g, 0.024 mmol) in dioxane (5.0 ml) in a sealed vial was heated at 105° C. for 22 h. Upon cooling to rt, the mixture was diluted with ethyl acetate (30 mL) and filtered through Celite. The filtrate was mixed with silica gel (1 g) and concentrated under vacuum. The residue was subjected to ISCO chromatography (12 g silica gel, 0-100% ethyl acetate/hexane) to provide 3-(5-(2, 5-dihydrofuran-3-yl)pyrimidin-2-yl)-2-methoxyaniline (0.0432 g, 0.160 mmol, 33.7% yield) as a yellow oil. LCMS m/z=270.2 (M+H)⁺.

Step 3. 2-Methoxy-3-(5-(tetrahydrofuran-3-yl)pyrimidin-2-yl)aniline

A solution of 3-(5-(2,5-dihydrofuran-3-yl)pyrimidin-2-yl)-2-methoxyaniline (0.0716 g, 0.266 mmol) and 10% Pd/C (0.0351 g, 0.033 mmol) in methanol and tetrahydrofuran (2.000 ml) was stirred under H₂, provided with a H₂ balloon, at rt for 3 h. The catalyst was removed by suction filtration through Celite. The filtrate was concentrated under vacuum to give 2-methoxy-3-(5-(tetrahydrofuran-3-yl)pyrimidin-2-yl)aniline (0.0698 g, 0.216 mmol, 81% yield) as yellow oil. LCMS m/z=272.4 (M+H)⁺.

Step 4. 6-Chloro-4-((2-methoxy-3-(5-(tetrahydrofuran-3-yl)pyrimidin-2-yl)phenyl)amino)-N-(methyl-d3)pyridazine-3-carboxamide To a mixture of 2-methoxy-3-(5-(tetrahydrofuran-3-yl)pyrimidin-2-yl)aniline (0.0311 g, 0.115 mmol) and 4,6-dichloro-N-(methyl-d3)pyridazine-3-carboxamide (0.0260 g, 0.124 mmol) in THF (1.5) at rt was added lithium bis(trimethylsilyl)amide (0.4 ml, 0.400 mmol). The resulting solution was stirred at rt for 2 h and then quenched with water (1 mL), followed by addition of 1 N aqueous hydrochloric acid until pH 9-10 by litmus paper. The mixture was diluted with ethyl acetate, washed with water (10 mL) and brine (10 mL) successively, dried over Na₂SO₄, and concentrated under vacuum. The residue was purified by ISCO chromatography (4 g silica gel, 0-100% ethyl acetate/hexane) to give 6-chloro-4-((2-methoxy-3-(5-(tetrahydrofuran-3-yl)pyrimidin-2-yl)phenyl)amino)-N-(methyl-d3)pyridazine-3-carboxamide (0.014 g, 0.030 mmol, 26.1% yield) as a white solid. LCMS m/z=444.5 (M+H)⁺.

Step 5. 6-(Cyclopropanecarboxamido)-4-((2-methoxy-3-(5-(tetrahydrofuran-3-yl)pyrimidin-2-yl)phenyl)amino)-N-(methyl-d3)pyridazine-3-carboxamide A mixture 6-chloro-4-((2-methoxy-3-(5-(tetrahydrofuran-3-yl)pyrimidin-2-yl)phenyl)amino)-N-(methyl-d3)pyridazine-3-carboxamide (0.0250 g, 0.056 mmol), cyclopropanecarboxamide (11.4 mg, 0.134 mmol), XantPhos (6.8 mg, 0.012 mmol), cesium carbonate (0.0521 g, 0.160 mmol), and Pd₂(dba)₃ (9.5 mg, 10.37 µmol) in 1,4-dioxane (1.2 ml) was degassed and heated at 150° C. under microwave conditions for 2 h. Upon cooling to rt, the mixture was diluted with ethyl acetate (8 mL) and filtered through Celite. The filtrate was concentrated under vacuum, and the residue was subjected to preparative HPLC to give 6-(Cyclopropanecarboxamido)-4-((2-methoxy-3-(5-(tetrahydrofuran-3-yl)pyrimidin-2-yl)phenyl)amino)-N-(methyl-d3)pyridazine-3-carboxamide (3.7 mg, 13% yield) as a white solid. LCMS m/z=493.5 (M+H)⁺. ¹H NMR (500 MHz, DMSO-d₆) δ 11.33 (s, 1H), 10.92 (s, 1H), 9.13 (br s, 1H), 8.88 (s, 2H), 8.14 (s, 1H), 7.62-7.48 (m, 2H), 7.31 (br t, J=7.8 Hz, 1H), 4.09 (br t, J=7.7 Hz, 1H), 4.05-3.97 (m, 1H), 3.85 (q, J=7.7 Hz, 1H), 3.72-3.64 (m, 3H), 3.49 (s, 2H), 2.45-2.36 (m, 1H), 2.13-1.99 (m, 2H), 0.87-0.79 (m, 4H).

Example 56

6-(Cyclopropanecarboxamido)-4-((2-methoxy-3-(5-(N-methylacetamido)pyrazin-2-yl)phenyl)amino)-N-(methyl-d3)pyridazine-3-carboxamide

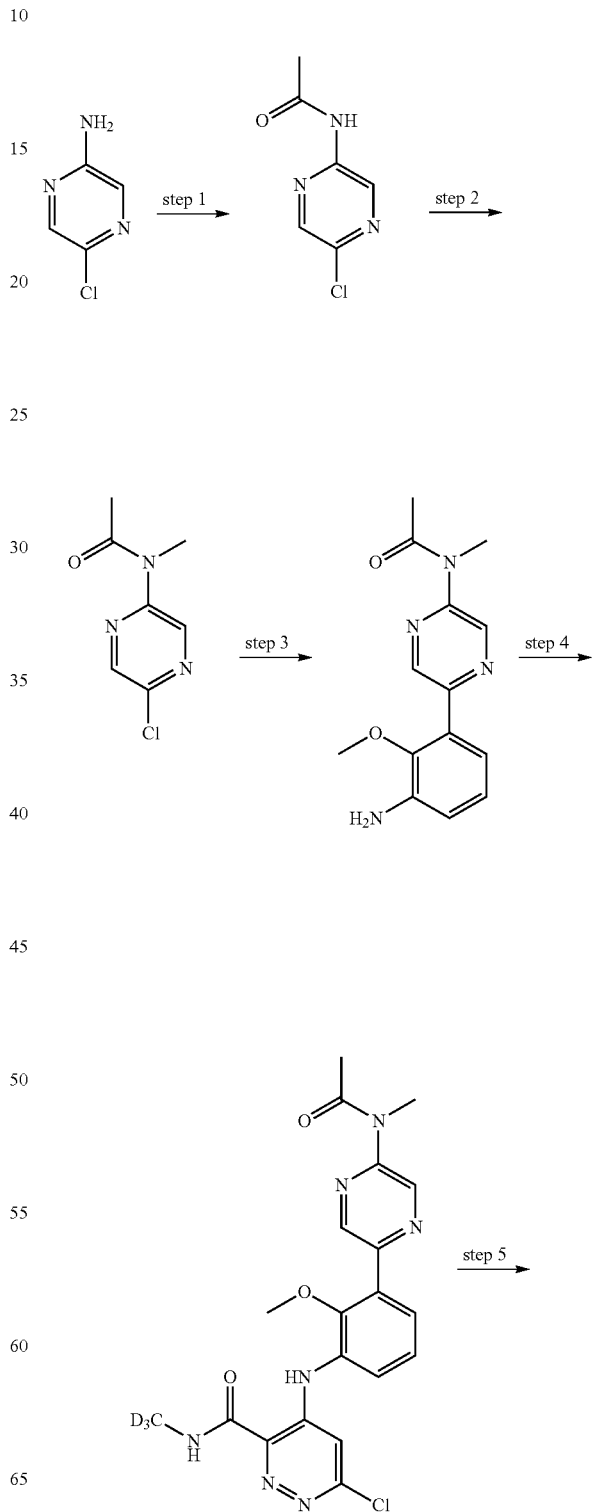

-continued

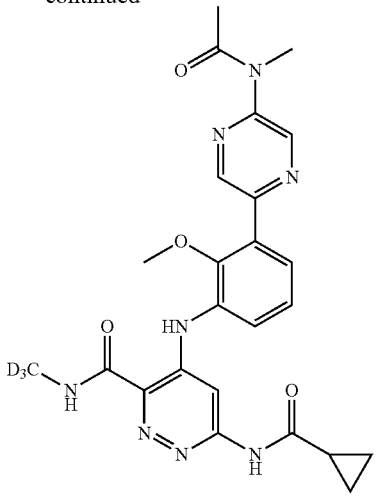

Step 1. N-(5-Chloropyrazin-2-yl)acetamide

A solution of 5-bromopyrazin-2-amine (1.00 g, 5.75 mmol) in acetic anhydride (10 mL, 106 mmol) was stirred at rt for 16 h. The precipitating material was collected by suction filtration. The filter cake was suspended in water (20 mL) and 1.5 N $K_2HPO_4$ solution (5 mL), and the suspension was stirred at rt for 40 min. The insoluble product, N-(5-bromopyrazin-2-yl)acetamide (0.917 g, 4.24 mmol, 73.9% yield), was collected as a beige solid by suction filtration and dried at 60° C. under vacuum. LCMS m/z=216.0 (M+H)$^+$.

Step 2. N-(5-Chloropyrazin-2-yl)-N-methylacetamide

To a solution of N-(5-bromopyrazin-2-yl)acetamide (0.550 g, 2.55 mmol) and iodomethane (0.198 mL, 3.18 mmol) in DMF (15 mL) at 0° C. was added sodium hydride (60% dispersion in mineral oil) (0.224 g, 5.60 mmol) in one portion. The mixture was stirred at rt for 40 min before it was quenched with saturated $NH_4Cl$ solution (15 mL). The mixture was extracted with ethyl acetate (3×50 mL). The combined extract was concentrated under vacuum to dryness. The residue was dissolved in ethyl acetate (150 mL), washed with water (20 mL) and brine (20 mL), and dried over anhydrous $MgSO_4$. The desired product, N-(5-bromopyrazin-2-yl)-N-methylacetamide (0.445 g, 1.934 mmol, 76% yield), was isolated as a white solid by ISCO chromatography (80 g silica gel, solid loading, 30-45% ethyl acetate/hexane).

Step 3. N-(5-(3-Amino-2-methoxyphenyl)pyrazin-2-yl)-N-methylacetamide

A mixture of 2-methoxy-3-(4,4,5,5-tetramethyl-1,3,2-dioxaborolan-2-yl)aniline (235 mg, 0.943 mmol), N-(5-bromopyrazin-2-yl)-N-methylacetamide (228 mg, 0.991 mmol), $PdCl_2(dppf)\text{-}CH_2Cl_2$ adduct (46.2 mg, 0.057 mmol), and 2 M aqueous potassium triphosphate (1.415 mL, 2.83 mmol) in 1,4-dioxane (6 mL) was heated at 100° C. for 16 h. Upon cooling to rt, the mixture was diluted with ethyl acetate (15 mL) and filtered through Celite. The filtrate was concentrated under vacuum to dryness. The residue was diluted with water (15 mL) and extracted with dichloromethane (3×40 mL). The combined extract was dried over anhydrous $MgSO_4$. The desired product, N-(5-(3-amino-2-methoxyphenyl)pyrazin-2-yl)-N-methylacetamide (158 mg, 0.580 mmol, 61.5% yield), was isolated as a white solid by ISCO chromatography (40 g silica gel, solid loading, 60-95% ethyl acetate/hexane). LCMS m/z=273.1 (M+H)$^+$.

Step 4. 6-Chloro-4-((2-methoxy-3-(5-(N-methylacetamido)pyrazin-2-yl)phenyl)amino)-N-(methyl-d3)pyridazine-3-carboxamide To a solution of 4,6-dichloro-N-trideuteromethylpyridazine-3-carboxamide and N-(5-(3-amino-2-methoxyphenyl)pyrazin-2-yl)-N-methylacetamide (74.4 mg, 0.273 mmol) in THF (5 mL) at rt was added lithium bis(trimethylsilyl)amide in THF (0.670 mL, 0.670 mmol) over 5 min. The resulting mixture was stirred at rt for 1 h before it was quenched with water (3 mL). The mixture was adjusted with 1 N HCl solution to pH 9-10, diluted with ethyl acetate (80 mL), washed with water (2×25 mL) and brine (25 mL), and dried over anhydrous $MgSO_4$. The desired product, 6-chloro-4-((2-methoxy-3-(5-(N-methylacetamido)pyrazin-2-yl)phenyl)amino)-N-trideuteromethylpyridazine-3-carboxamide (71 mg, 0.160 mmol, 59.6% yield), was isolated as a beige solid by ISCO chromatography (24 g silica gel, solid loading, 65-100% ethyl acetate/hexane). LCMS m/z=445.1 (M+H)$^+$.

Step 5. 6-(Cyclopropanecarboxamido)-4-((2-methoxy-3-(5-(N-methylacetamido)pyrazin-2-yl)phenyl)amino)-N-(methyl-d3)pyridazine-3-carboxamide A mixture of 6-chloro-4-((2-methoxy-3-(5-(N-methylacetamido)pyrazin-2-yl)phenyl)amino)-N-trideuteromethylpyridazine-3-carboxamide (71.0 mg, 0.160 mmol), cyclopropanecarboxamide (34.0 mg, 0.399 mmol), tris(dibenzylideneacetone)dipalladium(0) (21.92 mg, 0.024 mmol), XantPhos (13.85 mg, 0.024 mmol), and cesium carbonate (130 mg, 0.399 mmol) in 1,4-dioxane (2.5 mL) was heated under microwave at 145° C. for 1 h. The mixture was diluted with ethyl acetate (6 mL) and filtered through Celite. The filtrate was concentrated under vacuum. The residue was diluted with DMSO and MeOH (1:3 volume ratio), and injected to preparative HPLC. The correct fractions were combined, concentrated under vacuum, basified with 1.5 M $K_2HPO_4$ solution to pH 10, and extracted with dichloromethane (3×35 mL). The combined extract was dried over anhydrous $MgSO_4$. Removal of the solvent under vacuum provided 6-(cyclopropanecarboxamido)-4-((2-methoxy-3-(5-(N-methylacetamido)pyrazin-2-yl)phenyl)amino)-N-trideuteromethylpyridazine-3-carboxamide (28.0 mg, 0.056 mmol, 35.2% yield) as a pale solid. LCMS m/z=494.2 (M+H)$^+$. $^1$H NMR (400 MHz, DMSO-d$_6$) δ 11.34 (s, 1H), 11.00 (s, 1H), 9.16 (s, 1H), 9.08 (d, J=1.3 Hz, 1H), 8.96 (d, J=1.5 Hz, 1H), 8.18 (s, 1H), 7.62 (dd, J=7.8, 1.6 Hz, 1H), 7.58 (dd, J=7.9, 1.5 Hz, 1H), 7.40-7.34 (m, 1H), 3.56 (s, 3H), 3.43 (s, 3H), 2.25 (s, 3H), 2.15-2.05 (m, 1H), 0.88-0.80 (m, 4H).

Example 57

6-(Cyclopropanecarboxamido)-4-((2-methoxy-3-(5-morpholinopyrazin-2-yl)phenyl)amino)-N-(methyl-d3)pyridazine-3-carboxamide

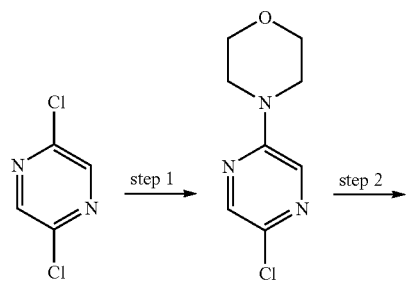

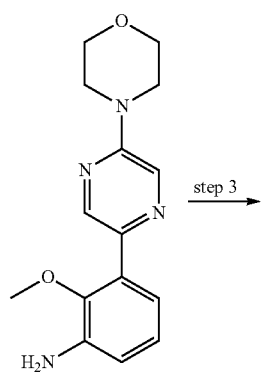

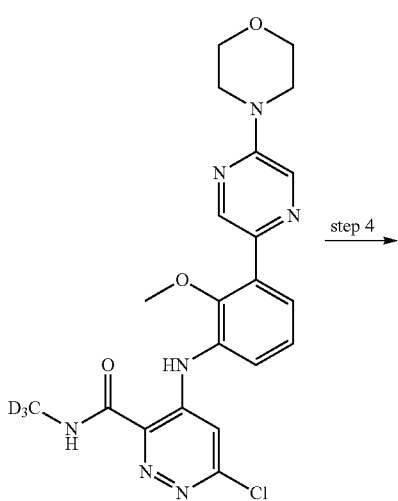

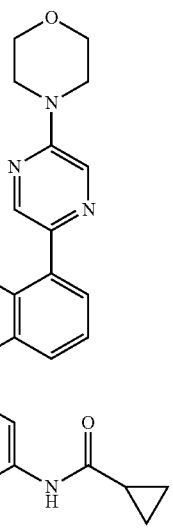

Step 1. 4-(5-Chloropyrazin-2-yl)morpholine

A mixture of 2,5-dichloropyrazine (0.5317 g, 3.57 mmol), morpholine (0.3443 g, 3.95 mmol), and potassium carbonate (0.691 g, 5.00 mmol) in N-Methyl-2-pyrrolidinone (25.5 ml) was heated at 100° C. for 17 h. upon cooling to rt, the mixture was diluted with ethyl acetate (200 mL) and filtered through Celite. The filtrate was washed with water (3×50 mL), dried over $Ma_2SO_4$, and concentrated under vacuum. The residue was subjected to ISCO chromatography (40 g silica gel, 10-100% ethyl acetate/hexane) to afford 4-(5-Chloropyrazin-2-yl)morpholine (0.538 g, 2.69 mmol, 76% yield) as an off-white solid. LCMS m/z=200.1 $(M+H)^+$.

Step 2. 2-Methoxy-3-(5-morpholinopyrazin-2-yl)aniline

A mixture of 4-(5-chloropyrazin-2-yl)morpholine (0.1796 g, 0.900 mmol), 2-methoxy-3-(4,4,5,5-tetramethyl-1,3,2-dioxaborolan-2-yl)aniline (0.2003 g, 0.804 mmol), 2 M aqueous potassium triphosphate (1.206 ml, 2.412 mmol), and $PdCl_2(dppf)\cdot CH_2Cl_2$ adduct (0.039 g, 0.048 mmol) in 1,4-dioxane (6.19 ml) in a sealed vial was heated at 105° C. for 16 h. Upon cooling to rt, the mixture was diluted with ethyl acetate (20 mL) and filtered through Celite. The filtrate was dried over $Na_2SO_4$ and concentrated under vacuum. The residue was subjected to ISCO chromatography (24 g silica gel, 0-15% methanol/dichloromethane) to give 2-methoxy-3-(5-morpholinopyrazin-2-yl)aniline (0.096 g, 0.335 mmol, 41.5% yield) as a slightly yellow oil. LCMS m/z=287.1 $(M+H)^+$.

Step 3. 6-Chloro-4-((2-methoxy-3-(5-morpholinopyrazin-2-yl)phenyl)amino)-N-(methyl-d3)pyridazine-3-carboxamide To a solution of 2-methoxy-3-(5-morpholinopyrazin-2-yl)aniline (0.096 g, 0.335 mmol) and 4,6-dichloro-N-trideuteromethylpyridazine-3-carboxamide and N-(5-(3-amino-2-methoxyphenyl)pyrazin-2-yl)-N-methylacetamide (0.070 g, 0.335 mmol) in THE (3.35 ml) was added 1 M lithium bis(trimethylsilyl)amide/THF (1.006 ml, 1.006 mmol) over 3 min. The mixture was stirred at rt for 1.5 h before it was quenched with water (0.5 mL). The solution was adjusted to pH 9-10 with 1 N aqueous acetic acid, diluted with ethyl acetate (40 mL), and washed with water (10 mL) and brine (10 mL). The organic solution was dried over Na₂SO₄ and concentrated under vacuum. The residue was triturated with THF to give 6-chloro-4-((2-methoxy-3-(5-morpholinopyrazin-2-yl)phenyl)amino)-N-(methyl-d3)pyridazine-3-carboxamide (31.5 mg, 0.069 mmol, 20.5% yield) as a light yellow solid. LCMS m/z=459.2 (M+H)⁺.

Step 6. 6-(Cyclopropanecarboxamido)-4-((2-methoxy-3-(5-morpholinopyrazin-2-yl)phenyl) amino)-N-(methyl-d3)pyridazine-3-carboxamide 21 Mar. 2014 9:01:42 AM-0400

A mixture of 6-chloro-4-((2-methoxy-3-(5-morpholinopyrazin-2-yl)phenyl)amino)-N-(methyl-d3)pyridazine-3-carboxamide (0.0315 g, 0.069 mmol), cyclopropanecarboxamide (0.012 g, 0.137 mmol), XantPhos (4.77 mg, 8.24 µmol), cesium carbonate (0.049 g, 0.151 mmol), and Pd₂(dba)₃ (7.54 mg, 8.24 µmol) in 1,4-dioxane (2 mL) and N-methyl-2-pyrrolidinone (0.2 mL) in a microwave vial was heated at 140° C. under microwave conditions for 1 h. The mixture was diluted with ethyl acetate (10 mL) and filtered through Celite. The filtrate was concentrated under vacuum, and the residue was subjected to preparative HPLC to afford 6-(Cyclopropanecarboxamido)-4-((2-methoxy-3-(5-morpholinopyrazin-2-yl)phenyl)amino)-N-(methyl-d3) pyridazine-3-carboxamide (0.0088 g, 0.017 mmol, 24.2% yield). LCMS m/z=508.2 (M+H)⁺. ¹H NMR (500 MHz, DMSO-d₆) δ 11.32 (s, 1H), 10.95 (s, 1H), 9.14 (s, 1H), 8.62 (s, 1H), 8.44 (s, 1H), 8.17 (s, 1H), 7.55 (d, J=7.1 Hz, 1H), 7.45 (br d, J=7.7 Hz, 1H), 7.29 (t, J=7.9 Hz, 1H), 3.74 (br t, J=4.5 Hz, 4H), 3.60 (br t, J=4.5 Hz, 4H), 3.52 (s, 3H), 2.13-2.01 (m, 1H), 0.89-0.78 (m, 4H).

Examples 58-60 in Table 7 were prepared in the same manner as example 57.

TABLE 7

| Ex. # | Structure | Analytical data |
|---|---|---|
| 58 | | LCMS m/z = 521.2 (M + H)⁺. ¹H NMR (500 MHz, DMSO-d₆) δ 11.33 (s, 1H), 10.97 (s, 1H), 9.15 (s, 1H), 8.61 (s, 1H), 8.45 (s, 1H), 8.18 (s, 1H), 7.55 (brd, J = 7.4 Hz, 1H), 7.45 (br d, Hz, 1H), 7.29 (t, J = 7.9 Hz, 1H), 3.65 (br s, 4H), 3.53 (s, 3H), 2.48 (br s, 4H), 2.27 (s, 3H), 2.13 – 2.04 (m, 1H), 0.87 – 0.80 (m, 4H) |
| 59 | | LCMS m/z = 549.2 (M + H)⁺. ¹H NMR (400 MHz, DMSO-d₆) δ 11.32 (s, 1H), 10.97 (s, 1H), 9.14 (s, 1H), 8.63 (d, J = 1.5 Hz, 1H), 8.47 (d, J = 1.3 Hz, 1H), 8.18 (s, 1H), 7.56 (dd, J = 7.8, 1.6 Hz, 1H), 7.46 (dd, J = 7.9, 1.5 Hz, 1H), 7.34 – 7.22 (m, 1H), 3.75 – 3.69 (m, 2H), 3.64 (br d, J = 6.0 Hz, 2H), 3.63 –3.57 (m, 4H), 3.53 (s, 3H), 2.14 – 2.04 (m, 4H), 0.88 – 0.78 (m, 4H) |
| 60 | | LCMS m/z = 489.1 (M + H)⁺. ¹H NMR (400 MHz, DMSO-d₆) δ 10.80 (br s, 1H), 10.76 (s, 1H), 9.52 (s, 1H), 9.31 (d, J = 1.5 Hz, 1H), 9.07 (d, J = 1.5 Hz, 1H), 8.63 (s, 1H), 8.55 (s, 1H), 8.44 (s, 1H), 8.08 (br s, 1H), 7.59 (ddd, J = 7.9, 6.5, 1.5 Hz, 2H), 7.41 – 7.32 (m, 1H), 3.58(s, 3H), 2.05 – 1.95 (m, 1H), 0.84 – 0.76 (m, 4H) |

Example 61

6-((5-Cyano-1-methyl-1H-pyrazol-3-yl)amino)-4-((2-methoxy-3-(pyrimidin-2-yl)phenyl)amino)-N-(methyl-d3)nicotinamide

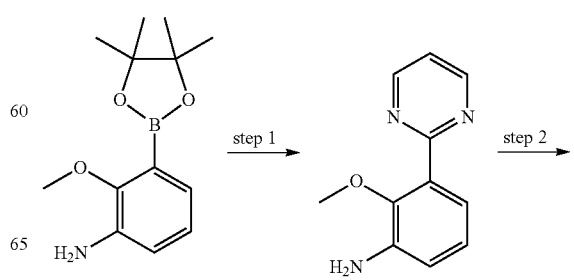

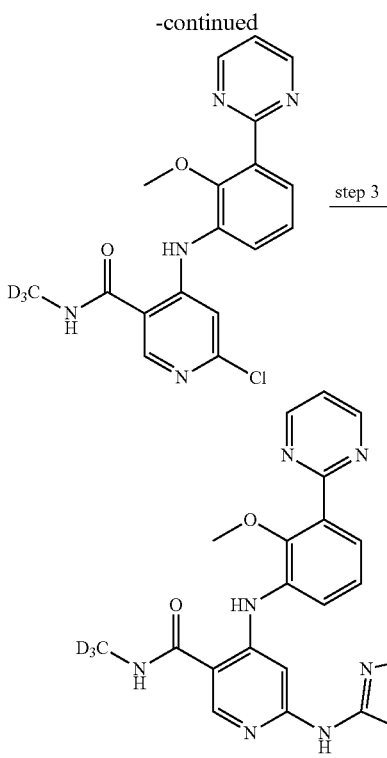

Step 1. 2-Methoxy-3-(pyrimidin-2-yl)aniline

A mixture of 2-methoxy-3-(4,4,5,5-tetramethyl-1,3,2-dioxaborolan-2-yl)aniline (1.19 g, 4.78 mmol), 2-chloropyrimidine (0.591 g, 5.16 mmol), PdCl$_2$(dppf)-CH$_2$Cl$_2$ adduct (0.234 g, 0.287 mmol), and 2 M aqueous potassium triphosphate (7.17 mL, 14.33 mmol) in 1,4-dioxane (35 mL) was heated at 105° C. for 16 h. The mixture was diluted with ethyl acetate (35 mL) and filtered through Celite. The filtrate was concentrated under vacuum to dryness. The residue was diluted with water (20 mL) and extracted with dichloromethane (4×40 mL). The combined extract was dried over anhydrous MgSO$_4$ and concentrated under vacuum. The residue was subjected to ISCO chromatography (24 g silica gel, 45-95% ethyl acetate/hexane) to provide 2-methoxy-3-(pyrimidin-2-yl)aniline (0.780 g, 3.88 mmol, 81% yield) as a pale yellow oil. LCMS m/z=202.2 (M+H)$^+$.

Step 2. 6-Chloro-4-((2-methoxy-3-(pyrimidin-2-yl)phenyl)amino)-N-(methyl-d3)nicotinamide To a solution of 4,6-dichloro-N-trideuteromethylpyridazine-3-carboxamide (285 mg, 1.363 mmol) and 2-methoxy-3-(pyrimidin-2-yl)aniline (280 mg, 1.391 mmol) in THF (10 mL) at rt was added lithium bis(trimethylsilyl)amide in THF (3.41 mL, 3.41 mmol) over 2 min. The resulting mixture was stirred at rt for 75 min before it was quenched with water (10 mL). The mixture was adjusted with 1 N HCl solution to pH 9-10, diluted with ethyl acetate (150 mL), washed with water (2×40 mL) and brine (40 mL) successively, and dried over anhydrous MgSO$_4$. The desired product, 6-chloro-4-((2-methoxy-3-(pyrimidin-2-yl)phenyl)amino)-N-trideuteromethylpyridazine-3-carboxamide (384 mg, 1.027 mmol, 75% yield), was isolated as a white solid by ISCO chromatography (80 g silica gel, solid loading, 60-100% ethyl acetate/dichloromethane). LCMS m/z=373.9 (M+H)$^+$.

Step 3. 6-((5-Cyano-1-methyl-1H-pyrazol-3-yl)amino)-4-((2-methoxy-3-(pyrimidin-2-yl)phenyl)amino)-N-(methyl-d3)nicotinamide A mixture of 6-chloro-4-((2-methoxy-3-(pyrimidin-2-yl)phenyl)amino)-N-trideuteromethylnicotinamide (27 mg, 0.072 mmol), 3-amino-1-methyl-1H-pyrazole-5-carbonitrile (17.69 mg, 0.145 mmol), tris(dibenzylideneacetone)dipalladium(0) (9.95 mg, 10.86 µmol), XantPhos (6.29 mg, 10.86 µmol), and cesium carbonate (51.9 mg, 0.159 mmol) in 1,4-dioxane (1.8 mL) was heated at 150° C. under microwave conditions for 1 h. The mixture was diluted with ethyl acetate (8 mL) and filtered through Celite. The filtrate was concentrated under vacuum. The residue was diluted with DMSO (0.2 mL) and MeOH (1.5 mL), and subjected to preparative HPLC to provide 6-((5-Cyano-1-methyl-1H-pyrazol-3-yl)amino)-4-((2-methoxy-3-(pyrimidin-2-yl)phenyl)amino)-N-(methyl-d3)nicotinamide (16.5 mg, 0.035 mmol, 48.2% yield). LCMS m/z=459.2 (M+H)$^+$. $^1$H NMR (500 MHz, DMSO-d$_6$) δ 10.84 (s, 1H), 8.96 (d, J=4.7 Hz, 2H), 8.74 (br s, 1H), 8.40 (s, 1H), 7.96 (s, 1H), 7.63 (d, J=7.7 Hz, 1H), 7.57 (br d, J=7.7 Hz, 1H), 7.53 (t, J=4.9 Hz, 1H), 7.37 (t, J=7.7 Hz, 1H), 7.00 (br s, 1H), 6.96 (s, 1H), 3.93 (s, 3H), 3.69 (s, 3H).

Examples 62-107 in Table 8 were prepared in the same manner as example 61.

TABLE 8

| Ex # | Structure | Analytical data |
| --- | --- | --- |
| 62 | | LCMS m/z = 477.2 (M + H)$^+$. $^1$H NMR (400 MHz, DMSO-d$_6$) δ 10.64 (s, 1H), 9.71 (s, 1H), 9.04 (d, J = 0.7 Hz, 2H), 8.49 – 8.40 (m, 2H), 7.64 (dd, J = 7.9, 1.6 Hz, 1H), 7.43 (dd, J = 7.7, 1.6 Hz, 1H), 7.36 –7.26 (m, 1H), 7.14 (s, 1H), 7.02 (s, 1H), 3.89 (s, 3H), 3.69 (s, 3H) |

TABLE 8-continued

| Ex # | Structure | Analytical data |
| --- | --- | --- |
| 63 | | LCMS m/z = 466.4 (M + H)+. ¹H NMR (500 MHz, DMSO-d₆) δ 10.71 (s, 1H), 9.20 (br s, 1H), 9.04 (s, 2H), 8.45 – 8.32 (m, 2H), 7.71 (br d, J = 7.7 Hz, 1H), 7.57 (br s, 1H), 7.39 (d, J = 7.4 Hz, 1H), 7.35 – 7.28 (m, 1H), 5.89 (br s, 1H), 3.69 (s, 3H), 3.59(s, 3H), 2.19 (s, 3H) |
| 64 | | LCMS m/z = 520.4 (M + H)+. ¹H NMR (500 MHz, DMSO-d₆) δ 10.65 (s, 1H), 9.64 (s, 1H), 9.04 (s, 2H), 8.48 – 8.39 (m, 2H), 7.67 (d, J = 7.7 Hz, 1H), 7.42 (d, J = 7.2 Hz, 1H), 7.35 – 7.29 (m, 1H), 7.27 (br s, 1H), 6.80 (br s, 1H), 3.83 (s, 3H), 3.69 (s, 3H) |
| 65 | | LCMS m/z = 452.4 (M + H)+. ¹H NMR (500 MHz, DMSO-d₆) δ 10.70 (s, 1H), 9.30 (s, 1H), 9.04 (s, 2H), 8.46 – 8.35 (m, 2H), 7.71 (br d, J = 7.7 Hz, 1H), 7.54 (br s, 1H), 7.51 (d, J = 1.9 Hz, 1H), 7.39 (d, J = 6.7 Hz, 1H), 7.34 – 7.28 (m, 1H), 6.08 (br s, 1H), 3.72 (s, 3H), 3.69 (s, 3H) |
| 66 | | LCMS m/z = 486.4 (M + H)+. ¹H NMR (500 MHz, DMSO-d₆) δ 10.64 (s, 1H), 9.43 (s, 1H), 9.03 (s, 2H), 8.42 (br d, J = 11.2 Hz, 2H), 7.67 (br d, J = 7.6 Hz, 1H), 7.40 (br d, J = 6.9 Hz, 1H), 7.37 – 7.28 (m, 2H), 6.30 (s, 1H), 3.68 (br s, 3H), 3.67 (br s, 3H) |

TABLE 8-continued

| Ex # | Structure | Analytical data |
| --- | --- | --- |
| 67 | 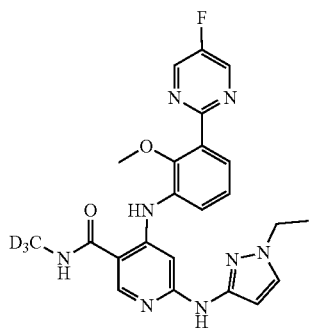 [SMILES: [2H]C([2H])([2H])NC(=O)c1cnc(Nc2ccn(CC)n2)cc1Nc1cccc(-c2ncc(F)cn2)c1OC] | LCMS m/z = 466.4 (M + H)+. 1H NMR (500 MHz, DMSO-d6) δ 10.73 (s, 1H), 9.37 (br s, 1H), 9.04 (s, 2H), 8.42 (s, 2H), 7.70 (d, J = 7.4 Hz, 1H), 7.55 (brd, J = 1.9 Hz, 2H), 7.40 (d, J = 7.0 Hz, 1H), 7.32 – 7.22 (m, 1H), 6.05 (br s, 1H), 3.99 (q, J = 7.2 Hz, 2H), 3.69 (s, 3H), 1.33 (t, J = 7 2 Hz, 3H) |
| 68 | 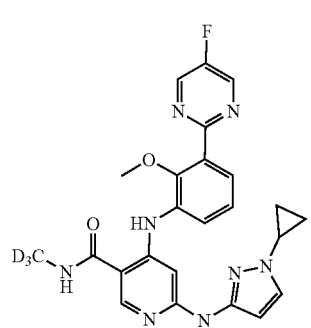 | LCMS m/z = 478.5 (M + H)+. 1H NMR (500 MHz, DMSO-d6) δ 10.70 (s, 1H), 9.27 (s, 1H), 9.01 (s, 2H), 8.46 – 8.34 (m, 2H), 7.69 (d, J = 7.5 Hz, 1H), 7.58 (d, J = 2.1 Hz, 1H), 7.54 (br s, 1H), 7.39 (d, J = 6.9 Hz, 1H), 7.34 – 7.28 (m, 1H), 6.04 (br s, 1H), 3.67 (s, 3H), 3.63 – 3.52 (m, 1H), 0.97 – 0.91 (m, 2H), 0.91 – 0.86 (m, 2H) |
| 69 | 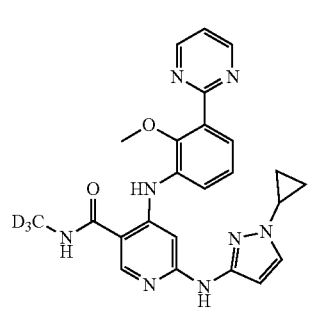 [SMILES: [2H]C([2H])([2H])NC(=O)c1cnc(Nc2ccn(C3CC3)n2)cc1Nc1cccc(-c2ncccn2)c1OC] | LCMS m/z = 460.3 (M + H)+. 1H NMR (500 MHz, DMSO-d6) δ 10.73 (s, 1H), 9.36 (br s, 1H), 8.95 (d, J = 4.9 Hz, 2H), 8.47 – 8.36 (m, 2H), 7.69 (d, J = 7.7 Hz, 1H), 7.60 (d, J = 1.9 Hz, 1H), 7.51 (t, J = 4.8 Hz, 2H), 7.41 (d, J = 7.3 Hz, 1H), 7.34 – 7.28 (m, 1H), 6.05 (br s, 1H), 3.69 (s, 3H), 3.57 (td, J = 7.2, 3.7 Hz, 1H), 0.98 – 0.93 (m, 2H), 0.92 – 0.87 (m, 2H). |
| 70 | 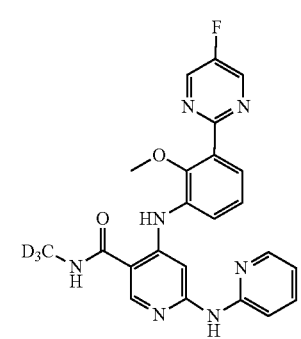 [SMILES: [2H]C([2H])([2H])NC(=O)c1cnc(Nc2ccccn2)cc1Nc1cccc(-c2ncc(F)cn2)c1OC] | LCMS m/z = 449.4 (M + H)+. 1H NMR (400 MHz, DMSO-d6) δ 10.69 (s, 1H), 9.90 – 9.67 (m, 1H), 9.03 (d, Hz, 2H), 8.48 (s, 2H), 8.18 (br d, J = 4.2 Hz, 1H), 7.99 – 7.81 (m, 1H), 7.71 (dd, J = 8.0, 1.4 Hz, 1H), 7.68 – 7.61 (m, 1H), 7.53 (br d, J = 7.9 Hz, 1H), 7.41 (brd, J = 7.3 Hz, 1H), 7.35 – 7.27 (m, 1H), 6.87 (brt, J = 5.8 Hz, 1H), 3.69 (s, 3H) |

TABLE 8-continued

| Ex # | Structure | Analytical data |
|---|---|---|
| 71 | | LCMS m/z = 475.2 (M + H)+. 1H NMR (400 MHz, DMSO-d6) δ 10.80 (s, 1H), 10.75 (s, 1H), 9.05 (s, 1H), 9.04 (s, 2H), 8.75 (d, J = 1.5 Hz, 1H), 8.62 (s, 1H), 8.59 (s, 1H), 7.80 (s, 1H), 7.68 (dd, J = 7.9, 1.6 Hz, 1H), 7.50 – 7.43 (m, 1H), 7.41 – 7.33 (m, 1H), 3.69 (s, 3H) |
| 72 | | LCMS m/z = 475.2 (M + H)+. 1H NMR (400 MHz, DMSO-d6) δ 10.80 (s, 1H), 10.74 (s, 1H), 9.04 (d, J = 1.2 Hz, 1H), 8.96 (s, 1H), 8.96 (d, J = 4.9 Hz, 2H), 8.75 (d, J = 1.3 Hz, 1H), 8.62 (s, 1H), 8.59 (s, 1H), 7.80 (s, 1H), 7.67 (dd, J = 7.9, 1.7 Hz, 1H), 7.52 (t, J = 5.0 Hz, 1H), 7.47 (dd, J = 7.8, 1.6 Hz, 1H), 7.40 – 7.33 (m, 1H), 3.70 (s, 3H) |
| 73 | | LCMS m/z = 475.2 (M + H)+. 1H NMR (400 MHz, DMSO-d6) δ 10.86 (br s, 1H), 10.69 (s, 1H), 9.05 (s, 2H), 8.61 (s, 1H), 8.55 (s, 1H), 8.40 (d, J = 9.5 Hz, 1H), 8.10 (d, J = 9.4 Hz, 1H), 7.66 (dd, J = 7.9, 1.2 Hz, 1H), 7.53 (s, 1H), 7.47 (dd, J = 7.7, 1.3 Hz, 1H), 7.35 – 7.28 (m, 1H), 3.70 (s, 3H) |
| 74 | | LCMS m/z = 480.4 (M + H)+. 1H NMR (500 MHz, DMSO-d6) δ 10.65 (s, 1H), 9.88 (s, 1H), 9.02 (s, 2H), 8.52 (s, 1H), 8.45 (s, 1H), 7.96 (d, J = 9.5 Hz, 1H), 7.71 – 7.61 (m, 2H), 7.41 (d, J = 7.7 Hz, 1H), 7.34 – 7.24 (m, 1H), 7.16 (d, J = 9.5 Hz, 1H), 3.94 (s, 3H), 3.69 (s, 3H) |

TABLE 8-continued

| Ex # | Structure | Analytical data |
|---|---|---|
| 75 | | LCMS m/z = 518.3 (M + H)+. 1H NMR (400 MHz, DMSO-d6) δ 10.75 (s, 1H), 10.69 (s, 1H), 9.05 (d, J = 0.7 Hz, 2H), 8.60 (s, 1H), 8.55 (s, 1H), 8.47 (d, J = 9.4 Hz, 1H), 8.06 (d, J = 9.4 Hz, 1H), 7.68 (dd, J = 7.9, 1.5 Hz, 1H), 7.55 (s, 1H), 7.47 (dd, J = 7.8, 1.5 Hz, 1H), 7.35 – 7.26 (m, 1H), 3.71 (s, 3H) |
| 76 | | LCMS m/z = 500.4 (M + H)+. 1H NMR (400 MHz, DMSO-d6) δ 10.75 (s, 1H), 10.69 (s, 1H), 8.96 (d, J = 4.9 Hz, 2H), 8.60 (s, 1H), 8.55 (s, 1H), 8.48 (d, J = 9.4 Hz, 1H), 8.06 (d, J = 9.5 Hz, 1H), 7.67 (dd, J = 8.0, 1.5 Hz, 1H), 7.55 (s, 1H), 7.52 (t, J = 4.9 Hz, 1H), 7.47 (dd, J = 7.8, 1.6 Hz, 1H), 7.34 – 7.28 (m, 1H), 3.72 (s, 3H) |
| 77 | | LCMS m/z = 480.1 (M + H)+. 1H NMR (400 MHz, DMSO-d6) δ 10.59 (s, 1H), 9.72 (s, 1H), 9.04 (d, J = 0.7 Hz, 2H), 8.55 (s, 1H), 8.51 (s, 1H), 8.28 (s, 1H), 7.63 (dd, J = 8.0, 1.5 Hz, 1H), 7.43 (dd, J = 7.8, 1.5 Hz, 1H), 7.33 – 7.26 (m, 1H), 7.22 (s, 1H), 7.01 (s, 1H), 3.69 (s, 3H), 3.33 (s, 3H) |
| 78 | | LCMS m/z = 479.3 (M + H)+. 1H NMR (500 MHz, DMSO-d6) δ 10.98 (s, 1H), 9.86 (s, 1H), 9.05 (s, 2H), 9.03 (s, 1H), 7.79 (br s, 1H), 7.71 (br d, J = 7.2 Hz, 1H), 7.65 (d, J = 2.1 Hz, 1H), 7.50 (d, J = 6.7 Hz, 1H), 7.35 (t, J = 7.9 Hz, 1H), 6.11 (br s, 1H), 3.70 (s, 3H), 3.59 (tt, J = 7.2, 3.7 Hz, 1H), 0.99 – 0.93 (m, 2H), 0.92 – 0.86 (m, 2H) |
| 79 | | LCMS m/z = 453.3 (M + H)+. 1H NMR (400 MHz, DMSO-d6) δ 10.92 (s, 1H), 9.79 (s, 1H), 9.05 (s, 2H), 9.02 (s, 1H), 7.74 (br s, 1H), 7.71 (dd, J = 7.9, 1.5 Hz, 1H), 7.55 (d, J = 2.2 Hz, 1H), 7.48 (dd, J = 7.8, 1.5 Hz, 1H), 7.38 – 7.32 (m, 1H), 6.16 (d, J = 1.8 Hz, 1H), 3.73 (s, 3H), 3.70 (s, 3H) |

TABLE 8-continued

| Ex # | Structure | Analytical data |
|---|---|---|
| 80 | | LCMS m/z = 460.3 (M + H)+. 1H NMR (400 MHz, DMSO-$d_6$) δ 10.89 (s, 1H), 10.08 (s, 1H), 9.08 (s, 1H), 8.96 (d, J = 4.9 Hz, 2H), 7.65 (dd, J = 7.9, 1.5 Hz, 1H), 7.57 – 7.48 (m, 2H), 7.41 – 7.29 (m, 2H), 7.04 (s, 1H), 3.91 (s, 3H), 3.69 (s, 3H) |
| 81 | | LCMS m/z = 493.5 (M + H)+. 1H NMR (400 MHz, DMSO-$d_6$) δ 10.89 (s, 1H), 9.68 (s, 1H), 9.00 (s, 1H), 8.95 (d, J = 5.1 Hz, 2H), 7.68 (dd, J = 7.9, 1.5 Hz, 2H), 7.55 – 7.45 (m, 2H), 7.38 – 7.28 (m, 1H), 6.04 (s, 1H), 5.27 (s, 1H), 3.83 (s, 3H), 3.69 (s, 3H), 1.46 (s, 6H) |
| 82 | | LCMS m/z = 511.5 (M + H)+. 1H NMR (400 MHz, DMSO-$d_6$) δ 10.90 (s, 1H), 9.68 (s, 1H), 9.03 (s, 2H), 9.01 (s, 1H), 7.69 (dd, J = 7.9, 1.3 Hz, 2H), 7.47 (dd, J = 7.7, 1.5 Hz, 1H), 7.38 – 7.29 (m, 1H), 6.04 (s, 1H), 5.27 (s, 1H), 3.83 (s, 3H), 3.68 (s, 3H), 1.46 (s, 6H) |
| 83 | | LCMS m/z = 529.5 (M + H)+. 1H NMR (400 MHz, DMSO-$d_6$) δ 11.21 (s, 1H), 9.81 (s, 1H), 9.06 (d, J = 0.7 Hz, 2H), 9.05 (s, 1H), 7.87 (br s, 1H), 7.60 (dd, J = 10.2, 3.0 Hz, 1H), 7.25 (dd, J = 9.0, 3.1 Hz, 1H), 6.05 (br s, 1H), 5.29 (s, 1H), 3.87 (s, 3H), 3.69 (s, 3H), 1.48 (s, 6H) |
| 84 | | LCMS m/z = 511.5 (M + H)+. 1H NMR (400 MHz, DMSO-$d_6$) δ 11.20 (s, 1H), 9.81 (s, 1H), 9.04 (s, 1H), 8.97 (d, J = 5.1 Hz, 2H), 7.87 (br s, 1H), 7.59 (dd, J = 10.1, 3.1 Hz, 1H), 7.55 (t, J = 4.8 Hz, 1H), 7.25 (dd, J = 9.0, 3.1 Hz, 1H), 6.05 (br s, 1H), 5.29 (s, 1H), 3.87 (s, 3H), 3.70 (s, 3H), 1.48 (s, 6H) |

TABLE 8-continued

| Ex # | Structure | Analytical data |
| --- | --- | --- |
| 85 | | LCMS m/z = 524.0 (M + H)⁺. $^1$H NMR (400 MHz, DMSO-d$_6$) δ 10.91 (s, 1H), 9.87 (s, 1H), 9.05 (d, J = 0.7 Hz, 2H), 9.04 (s, 1H), 7.69 (dd, J = 8.0, 1.5 Hz, 1H), 7.59 (br s, 1H), 7.50 (dd, J = 7.8, 1.5 Hz, 1H), 7.39 – 7.30 (m, 1H), 6.41 (s, 1H), 3.72 (s, 3H), 3.69 (s, 3H), 3.04 (br s, 3H), 3.00(br s, 3H) |
| 86 | | LCMS m/z = 450.3 (M + H)⁺. $^1$H NMR (400 MHz, DMSO-d$_6$) δ 10.89 (s, 1H), 10.06 (s, 1H), 9.13 (s, 1H), 8.96 (d, J = 5.0 Hz, 2H), 7.79 (s, 1H), 7.65 (dd, J = 7.9, 1.5 Hz, 1H), 7.58 – 7.48 (m, 2H), 7.39 – 7.28 (m, 1H), 7.21 (s, 1H), 4.32 (q, J = 1.3 Hz, 2H), 3.70 (s, 3H), 1.42 (t, J = 1.3 Hz, 3H) |
| 87 | | LCMS m/z = 468.2 (M + H)⁺. $^1$H NMR (400 MHz, DMSO-d$_6$) δ 10.90 (s, 1H), 10.06 (s, 1H), 9.13 (s, 1H), 9.05 (d, J = 0.6 Hz, 2H), 7.79 (s, 1H), 7.66 (dd, J = 7.9, 1.5 Hz, 1H), 7.52 (dd, J = 7.8, 1.5 Hz, 1H), 7.40 – 7.28 (m, 1H), 7.21 (s, 1H), 4.32 (q, J = 7.3 Hz, 2H), 3.69 (s, 3H), 1.42 (t, J = 7.3 Hz, 3H) |
| 88 | | LCMS m/z = 450.3 (M + H)⁺. $^1$H NMR (400 MHz, DMSO-d$_6$) δ 10.84 (s, 1H), 9.97 (s, 1H), 9.06 (s, 1H), 8.96 (d, J = 4.9 Hz, 2H), 8.12 (s, 1H), 7.63 (dd, J = 7.9, 1.6 Hz, 1H), 7.56 – 7.46 (m, 2H), 7.39 – 7.25 (m, 1H), 7.00 (s, 1H), 4.39 (q, J = 7.3 Hz, 2H), 3.70 (s, 3H), 1.45 (t, J = 7.3 Hz, 3H) |
| 89 | | LCMS m/z = 468.3 (M + H)⁺. $^1$H NMR (400 MHz, DMSO-d$_6$) δ 10.85 (s, 1H), 9.98 (s, 1H), 9.07 (s, 1H), 9.05 (d, J = 0.7 Hz, 2H), 8.12 (s, 1H), 7.63 (dd, J = 7.9, 1.6 Hz, 1H), 7.50 (dd, J = 7.7, 1.6 Hz, 1H), 7.39 –7.26 (m, 1H), 7.00 (s, 1H), 4.39 (q, J = 7.3 Hz, 2H), 3.69 (s, 3H), 1.45 (t, J = 7.3 Hz, 3H) |

TABLE 8-continued

| Ex # | Structure | Analytical data |
|---|---|---|
| 90 | | LCMS m/z = 454.2 (M + H)⁺. ¹H NMR (400 MHz, DMSO-d₆) δ 10.88 (s, 1H), 10.02 (s, 1H), 9.13 (s, 1H), 9.05 (d, J = 0.7 Hz, 2H), 7.81 (s, 1H), 7.66 (dd, J = 8.0, 1.5 Hz, 1H), 7.52 (dd, J = 7.8, 1.7 Hz, 1H), 7.40 –7.30 (m, 1H), 7.15 (s, 1H), 4.04 (s, 3H), 3.69 (s, 3H) |
| 91 | | LCMS m/z = 454.2 (M + H)⁺. ¹H NMR (400 MHz, DMSO-d₆) δ 10.84 (s, 1H), 9.97 (s, 1H), 9.05 (d, J = 0.7 Hz, 3H), 8.09 (s, 1H), 7.64 (dd, J = 7.9, 1.5 Hz, 1H), 7.50 (dd, J = 7.8, 1.6 Hz, 1H), 7.38 – 7.25 (m, 1H), 7.01 (s, 1H), 4.05 (s, 3H), 3.69 (s, 3H) |
| 92 | | LCMS m/z = 468.2 (M + H)⁺. ¹H NMR (400 MHz, DMSO-d₆) δ 11.12 (s, 1H), 10.04 (s, 1H), 9.10 (s, 1H), 8.98 (d, J = 4.9 Hz, 2H), 8.15 (s, 1H), 7.61 – 7.49 (m, 2H), 7.28 (dd, J = 9.0, 3.1 Hz, 1H), 7.17 (s, 1H), 4.41 (q, J = 7.3 Hz, 2H), 3.71 (s, 3H), 1.46 (t, J = 7.3 Hz, 3H) |
| 93 | | LCMS m/z = 454.2 (M + H)⁺. ¹H NMR (400 MHz, DMSO-d₆) δ 11.11 (s, 1H), 10.03 (s, 1H), 9.09 (s, 1H), 8.98 (d, J = 4.9 Hz, 2H), 8.11 (s, 1H), 7.62 – 7.49 (m, 2H), 7.28 (dd, J = 9.0, 3.1 Hz, 1H), 7.18 (s, 1H), 4.06 (s, 3H), 3.71 (s, 3H) |
| 94 | | LCMS m/z = 465.4 (M + H)⁺. ¹H NMR (400 MHz, DMSO-d₆) δ 11.00 (s, 1H), 10.36 (s, 1H), 9.14 (s, 1H), 9.05 (d, J = 0.7 Hz, 2H), 7.98 (s, 1H), 7.94 (d, J = 9.0 Hz, 1H), 7.70 (dd, J = 8.0, 1.5 Hz, 1H), 7.52 (dd, J = 7.8, 1.5 Hz, 1H), 7.49 (d, J = 9.2 Hz, 1H), 7.33 (t, J = 7.9 Hz, 1H), 3.71 (s, 3H), 2.52 (s, 3H) |

TABLE 8-continued

| Ex # | Structure | Analytical data |
| --- | --- | --- |
| 95 | 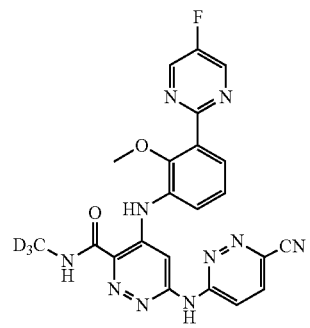 [SMILES: [2H]C([2H])([2H])NC(=O)c1nnc(Nc2ccc(C#N)nn2)cc1Nc1cccc(-c2ncc(F)cn2)c1OC] | LCMS m/z = 476.2 (M + H)+. 1H NMR (400 MHz, DMSO-d6) δ 11.11 (s, 1H), 11.02 (s, 1H), 9.22 (s, 1H), 9.06 (s, 2H), 8.32 (d, J = 9.4 Hz, 1H), 8.18 (d, J = 9.4 Hz, 1H), 7.81 (s, 1H), 7.70 (dd, J = 7.9, 1.5 Hz, 1H), 7.56 (dd, J = 7.8, 1.5 Hz, 1H), 7.42 –7.30 (m, 1H), 3.71 (s, 3H) |
| 96 | 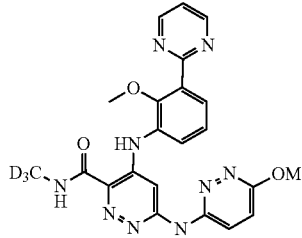 | LCMS m/z = 463.4 (M + H)+. 1H NMR (400 MHz, DMSO-d6) δ 10.99 (s, 1H), 10.26 (s, 1H), 9.11 (s, 1H), 8.97 (d, J = 4.8 Hz, 2H), 8.02 – 7.91 (m, 2H), 7.69 (dd, J = 7.9, 1.5 Hz, 1H), 7.57 – 7.47 (m, 2H), 7.32 (t, J = 1.9 Hz, 1H), 7.22 (d, J = 9.5 Hz, 1H), 3.96 (s, 3H), 3.72 (s, 3H) |
| 97 | 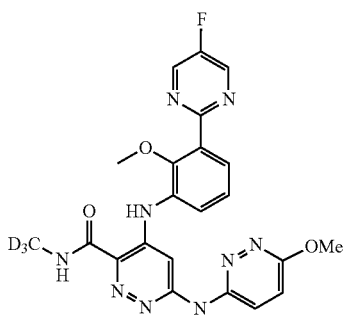 | LCMS m/z = 481.0 (M + H)+. 1H NMR (400 MHz, DMSO-d6) δ 10.99 (s, 1H), 10.27 (s, 1H), 9.12 (s, 1H), 9.05 (d, J = 0.6 Hz, 2H), 7.99 – 7.92 (m, 2H), 7.70 (dd, J = 7.9, 1.5 Hz, 1H), 7.52 (dd, J = 7.8, 1.5 Hz, 1H), 7.32 (t, J = 7.9 Hz, 1H), 7.22 (d, J = 9.5 Hz, 1H), 3.96 (s, 3H), 3.71 (s, 3H) |
| 98 | 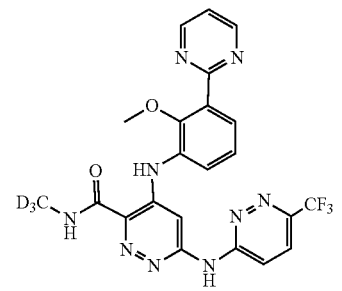 [SMILES: [2H]C([2H])([2H])NC(=O)c1nnc(Nc2ccc(C(F)(F)F)nn2)cc1Nc1cccc(-c2ncccn2)c1OC] | LCMS m/z = 501.0 (M + H)+. 1H NMR (400 MHz, DMSO-d6) δ 11.02 (s, 1H), 11.01 (s, 1H), 9.22 (s, 1H), 8.97 (d, J = 4.9 Hz, 2H), 8.42 (d, J = 9.4 Hz, 1H), 8.14 (d, J = 9.4 Hz, 1H), 7.81 (s, 1H), 7.70 (dd, J = 8.0, 1.5 Hz, 1H), 7.59 – 7.48 (m, 2H), 7.34 (t, J = 7.9 Hz, 1H), 3.72 (s, 3H) |
| 99 | 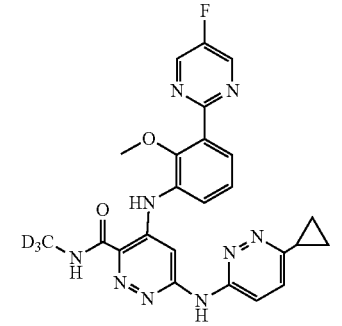 [SMILES: [2H]C([2H])([2H])NC(=O)c1nnc(Nc2ccc(C3CC3)nn2)cc1Nc1cccc(-c2ncc(F)cn2)c1OC] | LCMS m/z = 491.0 (M + H)+. 1H NMR (400 MHz, DMSO-d6) δ 10.99 (s, 1H), 10.32 (s, 1H), 9.14 (s, 1H), 9.05 (d, J = 0.7 Hz, 2H), 7.95 (d, J = 9.3 Hz, 1H), 7.89 (s, 1H), 7.70 (dd, J = 7.9, 1.3 Hz, 1H), 7.52 (dd, J = 7.8, 1.5 Hz, 1H), 7.41 (d, J = 9.3 Hz, 1H), 7.32 (t, J = 7.9 Hz, 1H), 3.71 (s, 3H), 2.24 – 2.12 (m, 1H), 1.07 – 0.99 (m, 2H), 0.98 – 0.90 (m, 2H) |

TABLE 8-continued

| Ex # | Structure | Analytical data |
|---|---|---|
| 100 | | LCMS m/z = 501.0 (M + H)⁺. ¹H NMR (400 MHz, DMSO-d₆) δ 10.97 (s, 1H), 10.80 (s, 1H), 9.25 (s, 1H), 9.06 (d, J = 0.6 Hz, 2H), 8.90 (s, 1H), 8.34 (d, J = 8.4 Hz, 1H), 7.98 – 7.88 (m, 1H), 7.84 – 7.67 (m, 3H), 7.54 (dd, J = 7.8, 1.6 Hz, 1H), 7.44 (s, 1H), 7.36 (t, J = 7.9 Hz, 1H), 3.72 (s, 3H) |
| 101 | | LCMS m/z = 509.4 (M + H)⁺. ¹H NMR (500 MHz, DMSO-d₆) δ 10.96 (s, 1H), 10.44 (s, 1H), 9.14 (s, 1H), 9.05 (s, 2H), 8.83 (s, 1H), 8.42 (s, 1H), 8.03 (s, 1H), 7.71 (d, J = 7.7 Hz, 1H), 7.53 (d, J = 7.1 Hz, 1H), 7.37 (t, J = 7.9 Hz, 1H), 3.69 (s, 3H), 1.44 (s, 6H) |
| 102 | | LCMS m/z = 508.3 (M + H)⁺. ¹H NMR (400 MHz, DMSO-d₆) δ 10.96 (s, 1H), 10.09 (s, 1H), 9.11 (s, 1H), 9.05 (s, 2H), 8.21 (s, 1H), 8.11 (d, J = 5.3 Hz, 1H), 7.77 – 7.69 (m, 2H), 7.49 (dd, J = 7.7, 1.5 Hz, 1H), 7.41 – 7.32 (m, 1H), 7.00 (dd, J = 5.3, 1.5 Hz, 1H), 5.19 (s, 1H), 3.71 (s, 3H), 1.41 (s, 6H) |
| 103 | | LCMS m/z = 508.5 (M + H)⁺. ¹H NMR (400 MHz, DMSO-d₆) δ 10.94 (s, 1H), 10.10 (br s, 1H), 9.07 (s, 1H), 9.04 (d, J = 0.7 Hz, 2H), 8.27 (d, J = 2.2 Hz, 1H), 8.16 (br s, 1H), 7.76 (dd, J = 8.6, 2.4 Hz, 1H), 7.71 (dd, J = 7.9, 1.3 Hz, 1H), 7.54 – 7.47 (m, 2H), 7.39 – 7.32 (m, 1H), 5.05 (br s, 1H), 3.69 (s, 3H), 1.42 (s, 6H) |
| 104 | | LCMS m/z = 508.2 (M + H)⁺. ¹H NMR (400 MHz, DMSO-d₆) δ 11.19 (s, 1H), 10.19 (s, 1H), 9.13 (s, 1H), 8.99 (d, J = 4.9 Hz, 2H), 8.38 – 8.25 (m, 2H), 7.80 (dd, J = 8.7, 2.4 Hz, 1H), 7.65 (dd, J = 10.1, 3.1 Hz, 1H), 7.61 – 7.54 (m, 2H), 7.29 (dd, J = 9.0, 3.1 Hz, 1H), 5.09 (s, 1H), 3.72 (s, 3H), 1.44 (s, 6H) |

TABLE 8-continued
| Ex # | Structure | Analytical data |
|---|---|---|
| 105 | 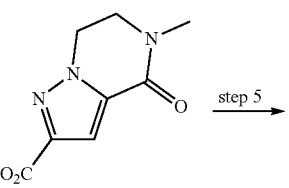 | LCMS m/z = 508.2 (M + H)⁺. ¹H NMR (400 MHz, DMSO-d₆) δ 11.20 (s, 1H), 10.18 (s, 1H), 9.15 (s, 1H), 8.99 (d, J = 4.9 Hz, 2H), 8.32 (s, 1H), 8.13 (d, J = 5.4 Hz, 1H), 7.79 (s, 1H), 7.64 (dd, J = 10.1, 3.1 Hz, 1H), 7.56 (t, J = 4.9 Hz, 1H), 7.28 (dd, J = 8.9, 3.1 Hz, 1H), 7.03 (dd, J = 5.3, 1.4 Hz, 1H), 5.20 (s, 1H), 3.72 (s, 3H), 1.42 (s, 6H) |
| 106 | | LCMS m/z = 481.1 (M + H)⁺. ¹H NMR (400 MHz, DMSO-d₆) δ 10.92 (s, 1H), 9.97 (s, 1H), 9.20 (s, 1H), 9.05 (s, 2H), 8.33 (s, 1H), 7.66 (dd, J = 8.0, 1.4 Hz, 1H), 7.51 (dd, J = 7.7, 1.5 Hz, 1H), 7.46 (s, 1H), 7.37 – 7.31 (m, 1H), 6.99 (s, 1H), 3.69 (s, 3H), 3.35 (s, 3H) |
Example 107
4-((3-(5-Fluoropyrimidin-2-yl)-2-methoxyphenyl)amino)-N-(methyl-d3)-6-((5-methyl-4-oxo-4,5,6,7-tetrahydropyrazolo[1,5-a]pyrazin-2-yl)amino)pyridazine-3-carboxamide
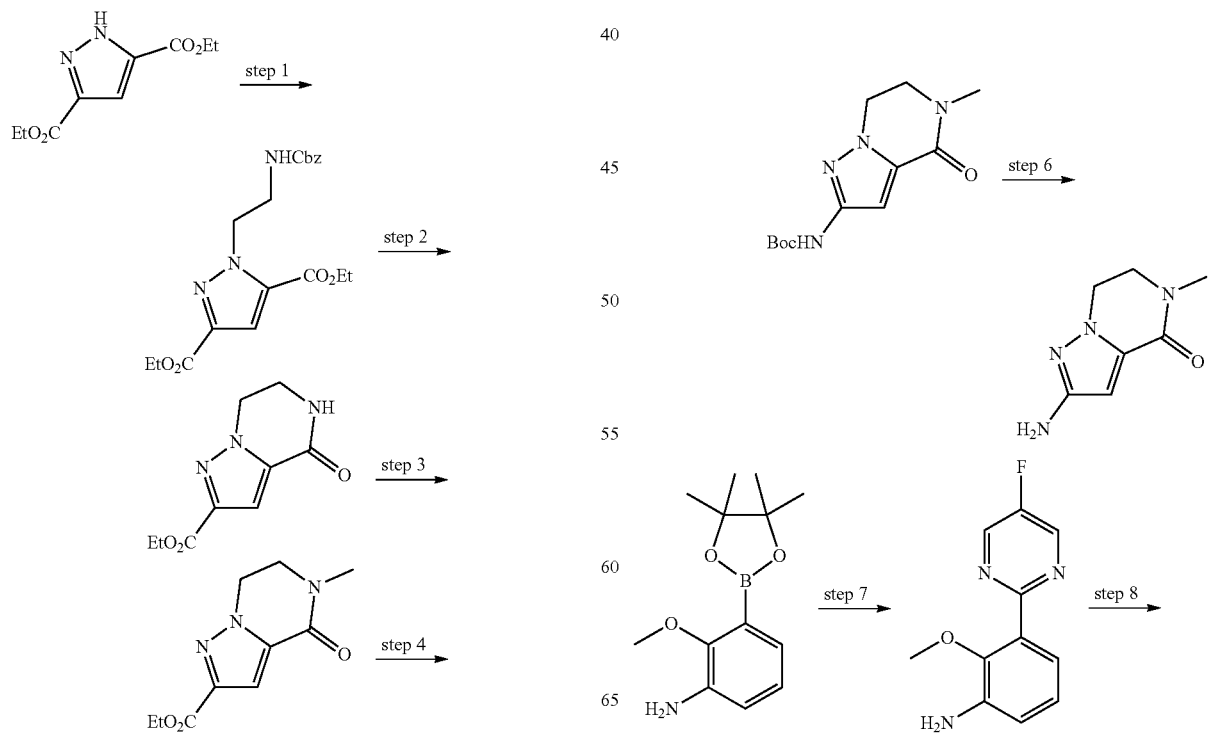

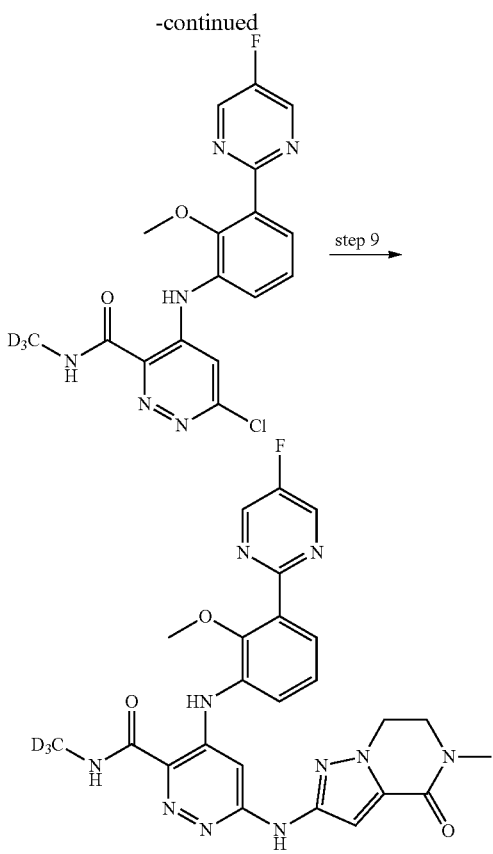

Step 1. Diethyl 1-(2-(((benzyloxy)carbonyl)amino)ethyl)-1H-pyrazole-3,5-dicarboxylate A mixture of diethyl 1H-pyrazole-3,5-dicarboxylate (2.00 g, 9.42 mmol), benzyl (2-bromoethyl)carbamate (2.92 g, 11.31 mmol), and potassium carbonate (1.563 g, 11.31 mmol) in DMF (20 mL) was heated at 55° C. for 1.5 h. Upon cooling to rt, the mixture was diluted with ethyl acetate (30 mL) and filtered through Celite. The filtrate was further diluted with ethyl acetate (170 mL), washed with water (4×40 mL) and brine (40 mL), and dried over anhydrous MgSO$_4$. The desired product, diethyl 1-(2-((tert-butoxycarbonyl)amino)ethyl)-1H-pyrazole-3,5-dicarboxylate (1.578 g, 4.05 mmol, 43.0% yield), was isolated as a white solid by ISCO chromatography (220 g silica gel, 20-60% ethyl acetate/hexane). LCMS m/z=390.3 (M+H)$^+$.

Step 2. Ethyl 4-oxo-4,5,6,7-tetrahydropyrazolo[1,5-a]pyrazine-2-carboxylate

A mixture of diethyl 1-(2-((tert-butoxycarbonyl)amino)ethyl)-1H-pyrazole-3,5-dicarboxylate (1.57 g, 4.03 mmol) and 10% Pd/C (0.400 g, 0.332 mmol) in methanol (36 mL) and tetrahydrofuran (12 mL) was stirred under H$_2$, provided with a H$_2$ balloon, at rt for 1 h. The catalyst was removed by filtration. The filtrate was stirred at rt for 18 h and then concentrated under vacuum. The residue was subjected to ISCO chromatography (120 g silica gel, 30-60% ethyl acetate/hexane) to afford ethyl 4-oxo-4,5,6,7-tetrahydropyrazolo[1,5-a]pyrazine-2-carboxylate (0.794 g, 3.80 mmol, 94% yield) as white solid. LCMS m/z=210.1 (M+H)$^+$. $^1$H NMR (400 MHz, DMSO-d$_6$) δ 8.39 (br s, 1H), 7.09 (s, 1H), 4.40 (dd, J=6.8, 5.4 Hz, 2H), 4.30 (q, J=7.1 Hz, 2H), 3.72-3.58 (m, 2H), 1.30 (t, J=7.1 Hz, 3H).

Step 3. Ethyl 5-methyl-4-oxo-4,5,6,7-tetrahydropyrazolo[1,5-a]pyrazine-2-carboxylate To a solution of ethyl 4-oxo-4,5,6,7-tetrahydropyrazolo[1,5-a]pyrazine-2-carboxylate (0.740 g, 3.54 mmol) and iodomethane (0.440 mL, 7.07 mmol) in DMF (15 mL) at 0° C. was added sodium hydride, 60% oil dispersion (0.311 g, 7.78 mmol) in two portions over 5 min. The mixture was stirred at rt for 100 min before it was quenched with saturated NH$_4$Cl solution (5 mL). The resulting mixture was concentrated under vacuum to a volume of approximately 5 mL. The residue was diluted with ethyl acetate (150 mL) and washed with water (3×25 mL). The aqueous phase was found to contain substantial amount of the desired product, and therefore was extracted with ethyl acetate (3×50 mL). The organic layers were combined and dried over anhydrous Na$_2$SO$_4$. The desired product, ethyl 5-methyl-4-oxo-4,5,6,7-tetrahydropyrazolo[1,5-a]pyrazine-2-carboxylate (0.724 g, 3.24 mmol, 92% yield), was isolated as white solid by ISCO chromatography (80 g silica gel, 1-4% MeOH/dichloromethane). LCMS m/z=224.1 (M+H)$^+$.

Step 4. 5-Methyl-4-oxo-4,5,6,7-tetrahydropyrazolo[1,5-a]pyrazine-2-carboxylic acid To a solution of ethyl 5-methyl-4-oxo-4,5,6,7-tetrahydropyrazolo[1,5-a]pyrazine-2-carboxylate (0.674 g, 3.02 mmol) in MeOH (35 mL) at rt was added 1 M sodium hydroxide solution (12.68 mL, 12.68 mmol) in one portion. The mixture was heated at reflux for 70 min and then concentrated under vacuum to a volume of approximately 15 mL. The residue was acidified with 1N HCl solution to pH 3 and extracted with dichloromethane (4×40 mL). The combined extract was dried over anhydrous MgSO$_4$. Removal of the solvent under vacuum provided the first crop of the desired product (77 mg) as a white solid. After the dichloromethane extract, some precipitate form in the aqueous layer, which was collected by suction filtration and dried under vacuum at 50° C. to give the second crop of the desired product (67 mg). The filtrate was extracted with ethyl acetate (4×30 mL). The combined extract was dried over anhydrous MgSO$_4$ and concentrated under vacuum to give the third crop of the desired product (111 mg). LCMS m/z=196.2 (M+H)$^+$. $^1$H NMR (400 MHz, DMSO-d$_6$) δ 12.94 (br s, 1H), 7.03 (s, 1H), 4.46 (dd, J=6.9, 5.6 Hz, 2H), 3.82 (dd, J=6.8, 5.6 Hz, 2H), 3.02 (s, 3H).

Step 5. tert-Butyl (5-methyl-4-oxo-4,5,6,7-tetrahydropyrazolo[1,5-a]pyrazin-2-yl)carbamate To a solution of 5-methyl-4-oxo-4,5,6,7-tetrahydropyrazolo[1,5-a]pyrazine-2-carboxylic acid (0.255 g, 1.033 mmol) in anhydrous t-BuOH (10 mL) at rt was added diphenyl phosphorazidate (0.324 mL, 1.502 mmol), followed by triethylamine (0.273 mL, 1.960 mmol). The mixture was heated at reflux for 16 h. The volatiles were removed under vacuum. The residue was diluted with dichloromethane (60 mL), washed with saturated NaHCO$_3$ solution, and dried over anhydrous MgSO$_4$. The desired product, tert-butyl (5-methyl-4-oxo-4,5,6,7-tetrahydropyrazolo[1,5-a]pyrazin-2-yl)carbamate (0.158 g, 0.593 mmol, 45.4% yield), was isolated as a white solid by ISCO chromatography (40 g silica gel, 40-80% ethyl acetate/hexane). LCMS m/z=267.3 (M+H)$^+$.

Step 6. 2-Amino-5-methyl-6,7-dihydropyrazolo[1,5-a]pyrazin-4(5H)-one

To a solution of tert-butyl (5-methyl-4-oxo-4,5,6,7-tetrahydropyrazolo[1,5-a]pyrazin-2-yl)carbamate (0.158 g, 0.593 mmol) in dichloromethane (5 mL) at rt was added TFA (5 mL, 64.9 mmol) over 1 min. The mixture was stirred at rt for 50 min. The volatiles were removed under vacuum. To the residue was added saturated NaHCO$_3$ solution (5 mL) and the mixture was extracted with ethyl acetate (4×35 mL). The combined extract was dried over anhydrous Na$_2$SO$_4$. Removal of solvent under vacuum provided 2-amino-5-methyl-6,7-dihydropyrazolo[1,5-a]pyrazin-4(5H)-one (89 mg, 0.536 mmol, 90% yield) as a white solid. LCMS m/z=167.2 (M+H)$^+$.

Step 7. 3-(5-Fluoropyrimidin-2-yl)-2-methoxyaniline

A mixture of 2-methoxy-3-(4,4,5,5-tetramethyl-1,3,2-dioxaborolan-2-yl)aniline (650 mg, 2.61 mmol), 2-chloro-5-fluoropyrimidine (353 mg, 2.66 mmol), PdCl$_2$(dppf)-CH$_2$Cl$_2$ adduct (128 mg, 0.157 mmol), and 2 M aqueous potassium triphosphate (3.91 mL, 7.83 mmol) in 1,4-dioxane (18 mL) was heated at 105° C. for 16 h. Upon cooling to rt, the mixture was diluted with ethyl acetate (20 mL) and filtered through Celite. The filtrate was concentrated under vacuum to dryness. The residue was diluted with water (20 mL) and extracted with dichloromethane (4×40 mL). The combined extract was dried over anhydrous MgSO$_4$ and concentrated under vacuum. The residue was subjected to ISCO chromatography (80 g silica gel, 35-60% ethyl acetate/hexane) to afford (3-(5-fluoropyrimidin-2-yl)-2-methoxyaniline (488 mg, 2.226 mmol, 85% yield) as a slightly yellow oil. LCMS m/z=220.4 (M+H)$^+$. $^1$H NMR (400 MHz, DMSO-d$_6$) δ 8.98 (d, J=0.7 Hz, 2H), 6.97-6.88 (m, 1H), 6.87-6.78 (m, 2H), 5.03 (s, 2H), 3.62 (s, 3H).

Step 8. 6-Chloro-4-((3-(5-fluoropyrimidin-2-yl)-2-methoxyphenyl)amino)-N-(methyl-d3)pyridazine-3-carboxamide To a solution of 4,6-dichloro-N-trideuteromethylpyridazine-3-carboxamide and 3-(5-fluoropyrimidin-2-yl)-2-methoxyaniline (0.745 g, 3.40 mmol) in THF (25 mL) at rt was added lithium bis(trimethylsilyl)amide in THF (8.10 mL, 8.10 mmol) over 5 min. The resulting mixture was stirred at rt for 2 h before it was quenched with water (5 mL). The mixture was adjusted with 1 N HCl solution to pH 9-10 and concentrated under vacuum to a volume of approximately 15 mL. To the heterogeneous residue was added water (60 mL), and the insoluble product, 6-chloro-4-(3-(5-fluoropyrimidin-2-yl)-2-methoxyphenylamino)-N-trideuteromethylpyridazine-3-carboxamide (0.807 g, 2.060 mmol, 63.6% yield), was collected as a pale solid by suction filtration and dried at 50° C. under vacuum. LCMS m/z=392.0 (M+H)$^+$.

Step 9. 4-((3-(5-Fluoropyrimidin-2-yl)-2-methoxyphenyl)amino)-N-(methyl-d3)-6-((5-methyl-4-oxo-4,5,6,7-tetrahydropyrazolo[1,5-a]pyrazin-2-yl)amino)pyridazine-3-carboxamide A mixture of 6-chloro-4-((3-(5-fluoropyrimidin-2-yl)-2-methoxyphenyl)amino)-N-trideuteromethylpyridazine-3-carboxamide (52.0 mg, 0.133 mmol), 2-amino-5-methyl-6,7-dihydropyrazolo[1,5-a]pyrazin-4(5H)-one (44.1 mg, 0.265 mmol), tris(dibenzylideneacetone)dipalladium(0) (14.58 mg, 0.016 mmol), XantPhos (9.22 mg, 0.016 mmol), and cesium carbonate (95 mg, 0.292 mmol) in 1,4-dioxane (2.5 mL) was heated at 155° C. under microwave conditions for 70 min. The mixture was diluted with ethyl acetate (8 mL) and filtered through Celite. The filtrate was concentrated under vacuum. The residue was dissolved in DMSO and MeOH (1:3 volume ratio) and subjected to preparative HPLC. The correct fractions were combined, concentrated under vacuum, basified with saturated NaHCO$_3$ solution to pH 9-10, and extracted with dichloromethane (3×30 mL). The combined extract was dried over anhydrous MgSO$_4$ and concentrated to dryness under vacuum to provide 4-((3-(5-fluoropyrimidin-2-yl)-2-methoxyphenyl)amino)-N-trideuteromethyl-6-((5-methyl-4-oxo-4,5,6,7-tetrahydropyrazolo[1,5-a]pyrazin-2-yl)amino)pyridazine-3-carboxamide (23.5 mg, 0.045 mmol, 34.0% yield) as a white solid. LCMS m/z=522.3 (M+H)$^+$. $^1$H NMR (400 MHz, DMSO-d$_6$) δ 10.92 (s, 1H), 9.97 (s, 1H), 9.08 (s, 1H), 9.05 (d, J=0.7 Hz, 2H), 7.69 (dd, J=7.9, 1.5 Hz, 1H), 7.56 (br s, 1H), 7.50 (dd, J=7.8, 1.6 Hz, 1H), 7.40-7.32 (m, 1H), 6.75 (s, 1H), 4.23 (dd, J=7.0, 5.4 Hz, 2H), 3.82-3.75 (m, 2H), 3.69 (s, 3H), 3.00 (s, 3H).

Example 108

4-((2-Methoxy-3-(pyrimidin-2-yl)phenyl)amino)-N-(methyl-d3)-6-((5-methyl-4-oxo-4,5,6,7-tetrahydropyrazolo[1,5-a]pyrazin-2-yl)amino)pyridazine-3-carboxamide

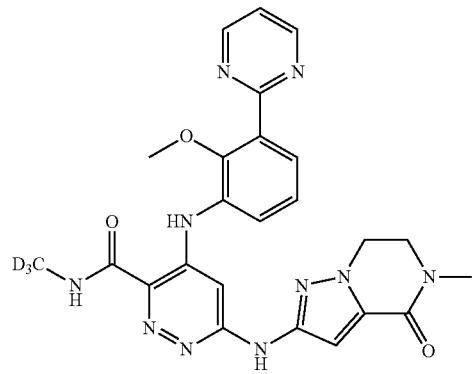 [SMILES: [2H]C([2H])([2H])NC(=O)c1nnc(Nc2cc3n(n2)CCN(C)C3=O)cc1Nc1cccc(-c2ncccn2)c1OC]

This analog was synthesized in the same way as example 108. LCMS m/z=504.3 (M+H)$^+$. $^1$H NMR (400 MHz, DMSO-d$_6$) δ 10.91 (s, 1H), 9.97 (s, 1H), 9.08 (s, 1H), 8.96 (d, J=4.9 Hz, 2H), 7.68 (dd, J=7.9, 1.5 Hz, 1H), 7.56 (br s, 1H), 7.55-7.48 (m, 2H), 7.41-7.32 (m, 1H), 6.75 (s, 1H), 4.23 (dd, J=7.1, 5.3 Hz, 2H), 3.81-3.74 (m, 2H), 3.70 (s, 3H), 3.00 (s, 3H).

Example 109

6-((5-cyclopropyl-4-oxo-4,5,6,7-tetrahydropyrazolo[1,5-a]pyrazin-2-yl)amino)-4-((3-(5-fluoropyrimidin-2-yl)-2-methoxyphenyl)amino)-N-(methyl-d3)pyridazine-3-carboxamide

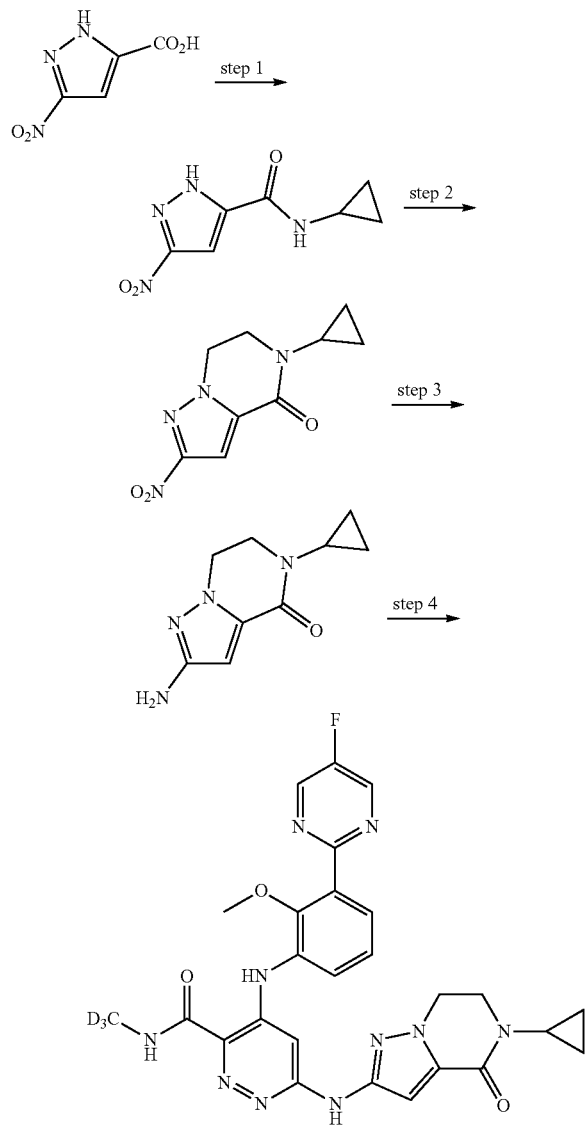

Step 1.
N-Cyclopropyl-3-nitro-1H-pyrazole-5-carboxamide

A mixture of 5-nitro-1H-pyrazole-3-carboxylic acid (0.800 g, 5.09 mmol), BOP (2.93 g, 6.62 mmol), cyclopropanamine (0.706 mL, 10.19 mmol), and N,N-diisopropylethylamine (3.47 mL, 19.86 mmol) in DMF (12 mL) was heated at 50° C. for 1.5 h and then concentrated under vacuum to near dryness. The residue was diluted with ethyl acetate (100 mL), washed with water (3×20 mL) and brine (20 mL), and dried over anhydrous MgSO$_4$. The desired product, N-cyclopropyl-5-nitro-1H-pyrazole-3-carboxamide (0.887 g, 4.52 mmol, 89% yield), was isolated as a white solid by ISCO chromatography (120 g silica gel, solid loading, 1-5% MeOH/dichloromethane). LCMS m/z=197.1 (M+H)$^+$.

Step 2. 5-Cyclopropyl-2-nitro-6,7-dihydropyrazolo[1,5-a]pyrazin-4(5H)-one

A mixture of N-cyclopropyl-5-nitro-1H-pyrazole-3-carboxamide (0.780 g, 3.98 mmol), 1,2-dibromoethane (0.685 mL, 7.95 mmol), and cesium carbonate (2.59 g, 7.95 mmol) in DMF (20 mL) was heated at 50° C. for 16 h. The mixture was diluted with ethyl acetate (20 mL) and filtered through Celite. The filtrate was concentrated under vacuum to near dryness. The residue was diluted with ethyl acetate (100 mL), washed with water (3×25 mL) and brine (25 mL), and dried over anhydrous MgSO$_4$. The desired product, 5-cyclopropyl-2-nitro-6,7-dihydropyrazolo[1,5-a]pyrazin-4(5H)-one (0.305 g, 1.373 mmol, 34.5% yield), was isolated as white solid by ISCO chromatography (80 g silica gel, solid loading, 20-90% ethyl acetate/hexane). LCMS m/z=223.1 (M+H)$^+$. $^1$H NMR (400 MHz, DMSO-d$_6$) δ 7.42 (s, 1H), 4.57-4.42 (m, 2H), 3.88-3.78 (m, 2H), 2.90-2.75 (m, 1H), 0.87-0.79 (m, 2H), 0.78-0.72 (m, 2H).

Step 3. 2-Amino-5-cyclopropyl-6,7-dihydropyrazolo[1,5-a]pyrazin-4(5H)-one

To a suspension of 5-cyclopropyl-2-nitro-6,7-dihydropyrazolo[1,5-a]pyrazin-4(5H)-one (0.275 g, 1.238 mmol) and ammonium chloride (0.927 g, 17.33 mmol) in MeOH (12 mL) and THF (4 mL) at rt was added zinc dust (1.133 g, 17.33 mmol) in one portion. The mixture was stirred at rt for 45 min. The solid phase was removed by suction filtration through Celite. The filtrate was concentrated under vacuum to near dryness. To the residue was added water (8 mL), and the mixture was extracted with dichloromethane (4×40 mL). The combined extract was dried over anhydrous MgSO$_4$. Removal of the solvent under vacuum provided 2-amino-5-cyclopropyl-6,7-dihydropyrazolo[1,5-a]pyrazin-4(5H)-one (0.213 g, 1.108 mmol, 90% yield) as a white solid. LCMS m z=193.2 (M+H)$^+$.

Step 4. 6-((5-cyclopropyl-4-oxo-4,5,6,7-tetrahydropyrazolo[1,5-a]pyrazin-2-yl)amino)-4-((3-(5-fluoropyrimidin-2-yl)-2-methoxyphenyl)amino)-N-(methyl-d3)pyridazine-3-carboxamide A mixture of 6-chloro-4-((3-(5-fluoropyrimidin-2-yl)-2-methoxyphenyl)amino)-N-trideuteromethylpyridazine-3-carboxamide (45 mg, 0.115 mmol), 2-amino-5-cyclopropyl-6,7-dihydropyrazolo[1,5-a]pyrazin-4(5H)-one (44.2 mg, 0.230 mmol), tris(dibenzylideneacetone)dipalladium(0) (15.78 mg, 0.017 mmol), XantPhos (9.97 mg, 0.017 mmol), and cesium carbonate (82 mg, 0.253 mmol) in 1,4-dioxane (2.5 mL) was heated at 155° C. under microwave conditions for 70 min. The mixture was diluted with ethyl acetate (8 mL) and filtered through Celite. The filtrate was concentrated under vacuum. The residue was dissolved in DMSO and MeOH (1:3 volume ratio) and injected to preparative HPLC. The correct fractions were combined, concentrated under vacuum, basified with saturated NaHCO$_3$ solution to pH 9-10, and extracted with dichloromethane (3×30 mL). The combined extract was dried over anhydrous MgSO$_4$ and concentrated to dryness under vacuum to provide 6-((5-cyclopropyl-4-oxo-4,5,6,7-tetrahydropyrazolo[1,5-a]pyrazin-2-yl)amino)-4-((3-(5-fluoropyrimidin-2-yl)-2-methoxyphenyl)amino)-N-trideuteromethylpyridazine-3- carboxamide (6.5 mg, 0.012 mmol, 10.03% yield) as a white solid. LCMS m/z=548.3 (M+H)⁺. ¹H NMR (400 MHz, DMSO-d₆) δ 10.91 (s, 1H), 9.95 (s, 1H), 9.09 (s, 1H), 9.05 (d, J=0.6 Hz, 2H), 7.68 (dd, J=7.9, 1.5 Hz, 1H), 7.55-7.46 (m, 2H), 7.39-7.32 (m, 1H), 6.77 (s, 1H), 4.18 (t, J=6.1 Hz, 2H), 3.76-3.71 (m, 2H), 3.69 (s, 3H), 2.78 (tt, J=7.2, 3.7 Hz, 1H), 0.84-0.77 (m, 2H), 0.73-0.67 (m, 2H).

The following Examples were prepared in a similar manner to Example 1 except Example 115 which was prepared in a similar manner to Example 14.

| Ex # | Structure | Analytical data |
|---|---|---|
| 110 | | LCMS m/z = 500.1 (M + H)⁺ |
| 111 | | LCMS m/z = 501.1 (M + H)⁺ |
| 112 | | LCMS m/z = 506.3 (M + H)⁺ |
| 113 | | LCMS m/z = 508.2 (M + H)⁺ |
| 114 | | LCMS m/z = 465.2 (M + H)⁺ |
| 115 | | LCMS m/z = 464.2 (M + H)⁺ |
| 116 | | LCMS m/z = 521.2 (M + H)⁺ |

| Ex # | Structure | Analytical data |
|---|---|---|
| 117 | (structure) | LCMS m/z = 522.2 (M + H)$^+$ |

Biological Assays

The following assay is used to show the activity for compounds of the invention.

IFNα-Induced STAT Phosphorylation in Human Whole Blood

After an hour long incubation with compound, human whole blood (drawn with either EDTA or ACD-A as anticoagulant) was stimulated with 1000 U/mL recombinant human IFNα A/D (R&D Systems 11200-2) for 15 min. The stimulation was stopped by adding Fix/Lyse buffer (BD 558049). Cells were stained with a CD3 FITC antibody (BD 555916), washed, and permeabilized on ice using Perm III buffer (BD 558050). Cells were then stained with an Alexa-Fluor 647 pSTAT5 (pY694) antibody (BD 612599) for 30 min prior to analysis on the FACS Canto II. The amount of pSTAT5 expression was quantitated by median fluorescence intensity after gating on the CD3 positive population.

IFNα-Induced STAT Phosphorylation in Human Whole Blood Inhibition Data

| Example No. | hWB IC$_{50}$ (μM) |
|---|---|
| 1 | 0.254 |
| 2 | 0.426 |
| 3 | 0.144 |
| 4 | 0.348 |
| 5 | 0.461 |
| 6 | 0.092 |
| 7 | 0.196 |
| 8 | 0.130 |
| 9 | 0.214 |
| 10 | 0.194 |
| 11 | 0.107 |
| 12 | 0.204 |
| 13 | 0.095 |
| 14 | 0.059 |
| 15 | 0.041 |
| 16 | 0.054 |
| 17 | 0.341 |
| 18 | 0.233 |
| 19 | 0.063 |
| 20 | 0.041 |
| 21 | 0.073 |
| 22 | 0.120 |
| 23 | 0.032 |
| 24 | 0.167 |
| 25 | 0.070 |
| 26 | 0.016 |
| 27 | 0.063 |
| 28 | 0.170 |
| 29 | 0.039 |
| 30 | 0.053 |
| 31 | 0.024 |
| 32 | 0.071 |
| 33 | 0.043 |
| 34 | 0.036 |
| 35 | 0.107 |
| 36 | 0.024 |
| 37 | 0.097 |
| 38 | 0.044 |
| 39 | 0.218 |
| 40 | 0.360 |
| 41 | 0.044 |
| 42 | 0.056 |
| 43 | 0.042 |
| 44 | 0.109 |
| 45 | 0.218 |
| 46 | 0.054 |
| 47 | 0.126 |
| 48 | 0.118 |
| 49 | 0.327 |
| 50 | 0.041 |
| 51 | 0.042 |
| 52 | 0.050 |
| 53 | 0.047 |
| 54 | 0.080 |
| 55 | 0.047 |
| 56 | 0.117 |
| 57 | 0.117 |
| 58 | 0.267 |
| 59 | 0.121 |
| 60 | 1.04 |
| 61 | 0.225 |
| 62 | 0.109 |
| 63 | 0.049 |
| 64 | 0.075 |
| 65 | 0.086 |
| 66 | 0.146 |
| 67 | 0.087 |
| 68 | 0.134 |
| 69 | 0.056 |
| 70 | 0.090 |
| 71 | 0.278 |
| 72 | 0.168 |
| 73 | |
| 74 | 0.087 |
| 75 | 0.292 |
| 76 | 0.077 |
| 77 | 0.228 |
| 78 | 0.192 |
| 79 | |
| 80 | 0.080 |
| 81 | 0.014 |
| 82 | 0.049 |
| 83 | 0.077 |
| 84 | 0.019 |
| 85 | 0.043 |
| 86 | 0.096 |
| 87 | 0.343 |
| 88 | 0.145 |
| 89 | 0.250 |
| 90 | 0.170 |
| 91 | 0.167 |
| 92 | 0.136 |
| 93 | 0.413 |
| 94 | 0.038 |
| 95 | 0.182 |
| 96 | 0.096 |
| 97 | 0.080 |
| 98 | 0.112 |
| 99 | 0.071 |
| 100 | 0.165 |
| 101 | 0.093 |
| 102 | 0.212 |
| 103 | 0.079 |
| 104 | 0.041 |
| 105 | 0.172 |
| 106 | 0.151 |
| 107 | 0.081 |

-continued
| Example No. | hWB IC$_{50}$ (μM) |
|---|---|
| 108 | 0.137 |
| 109 | 0.262 |
| 110 | 0.480 |
| 111 | 0.216 |
| 112 | 0.027 |
| 113 | 0.036 |
| 114 | 0.242 |
| 115 | 0.682 |
| 116 | 0.073 |
| 117 | 0.111 |
We claim:
1. A compound which is
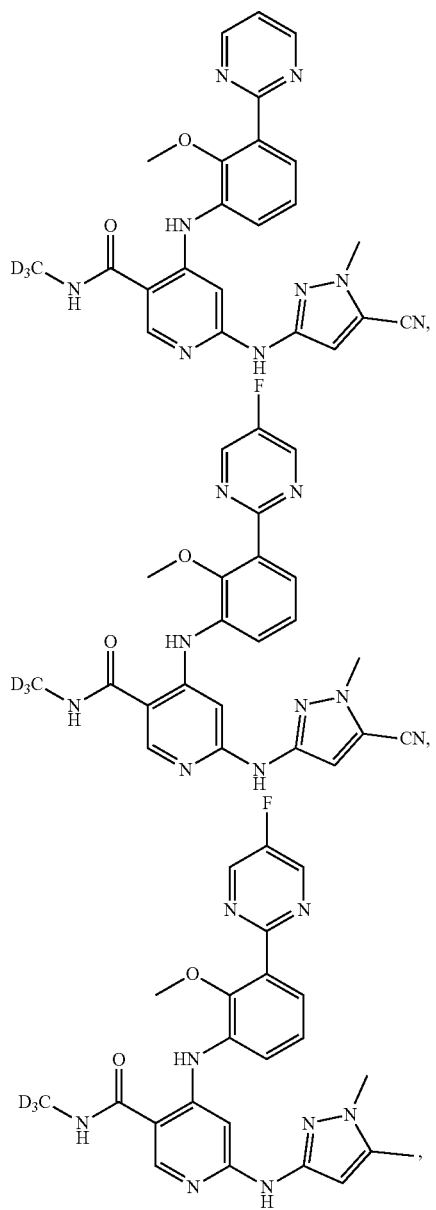
-continued
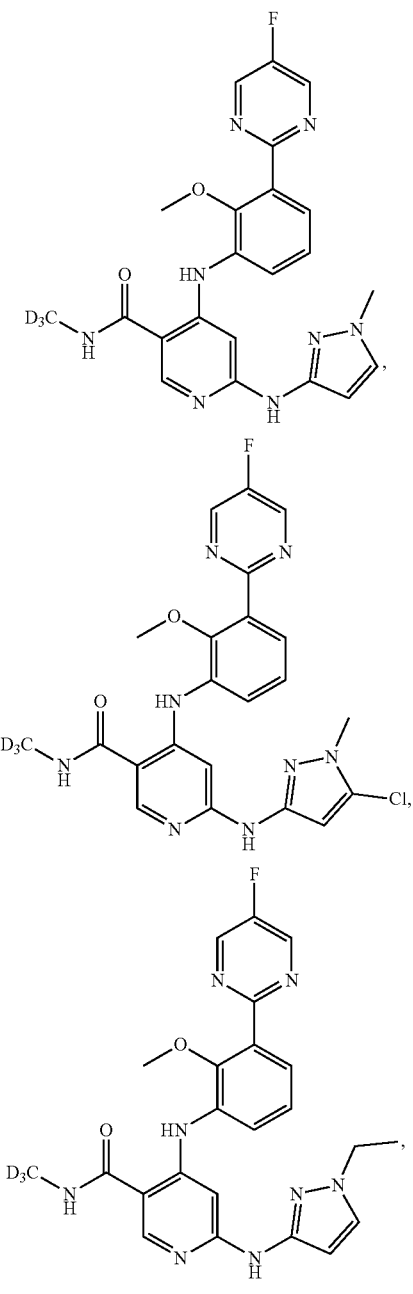

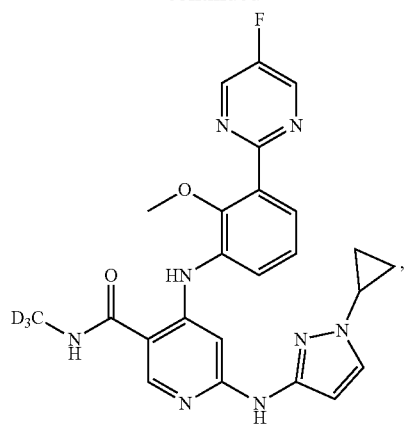
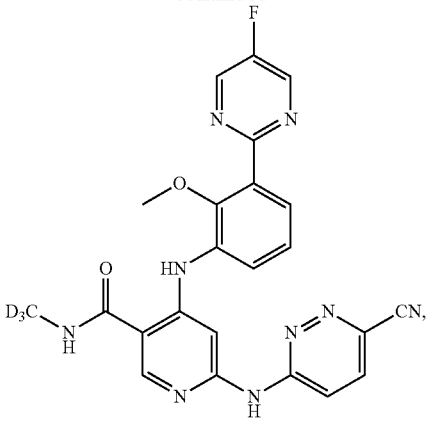
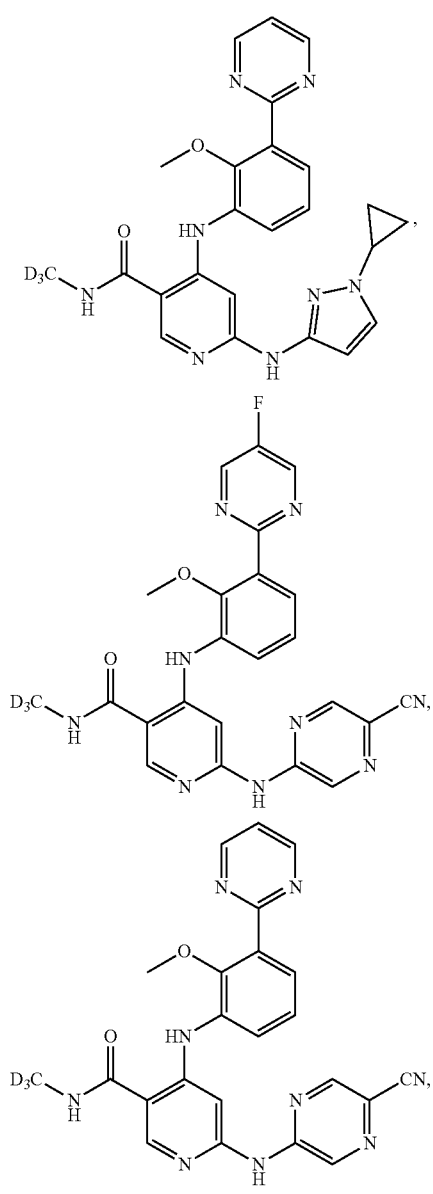

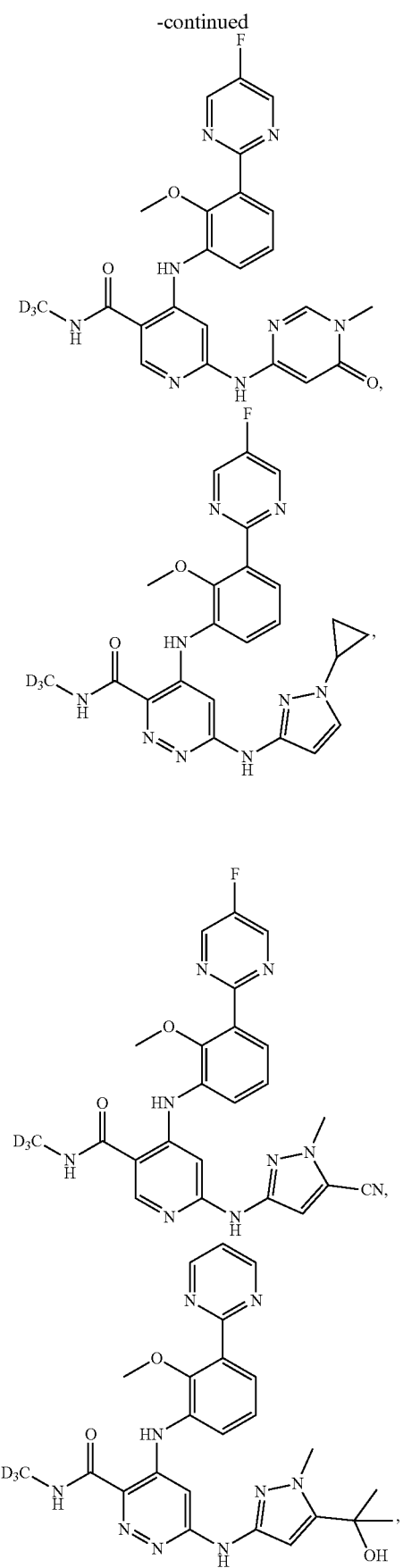
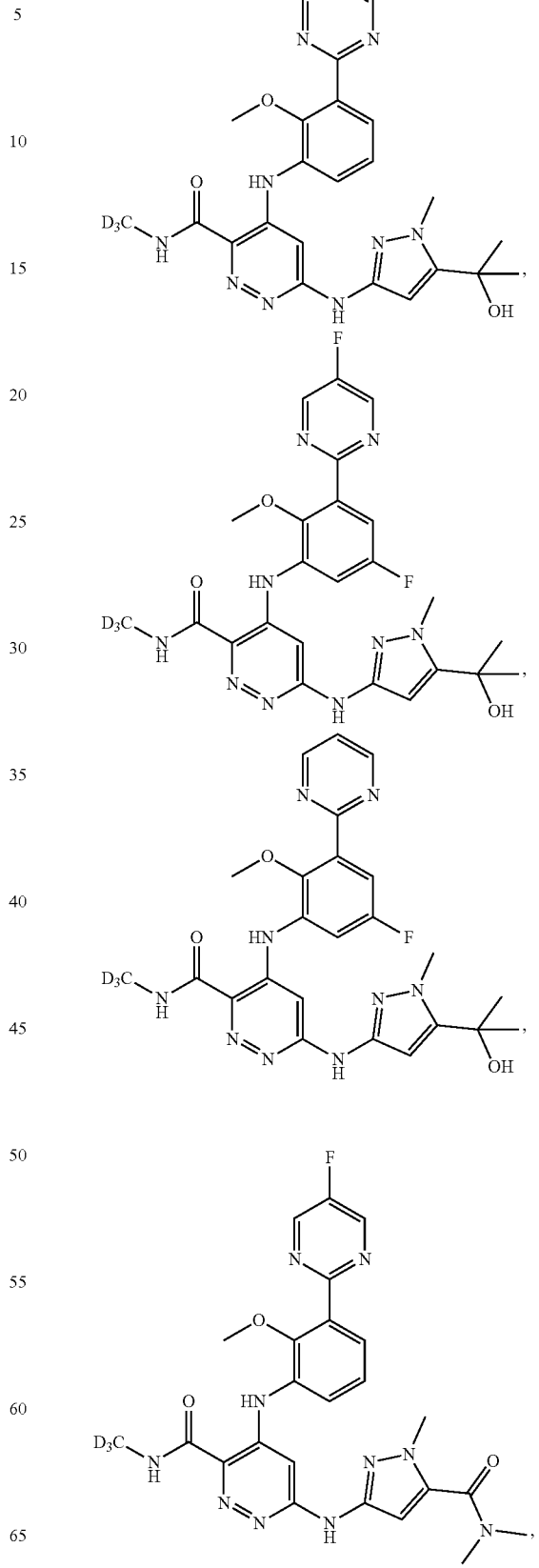

107
-continued
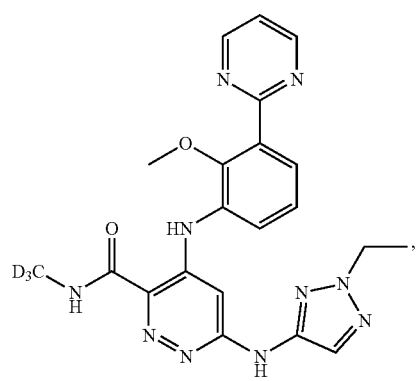
108
-continued
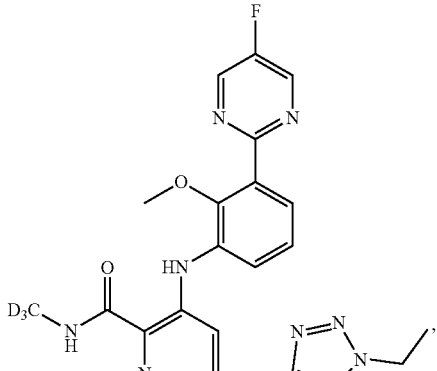
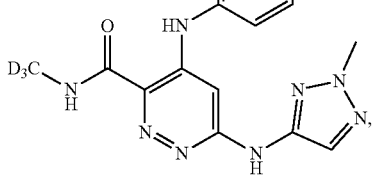
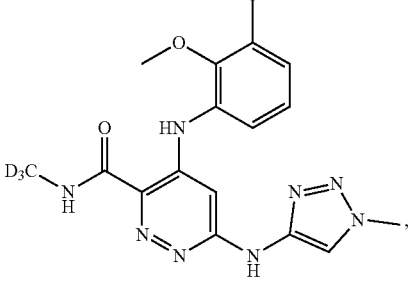
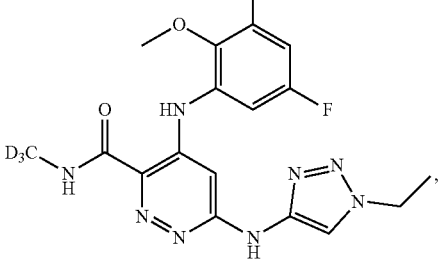

-continued
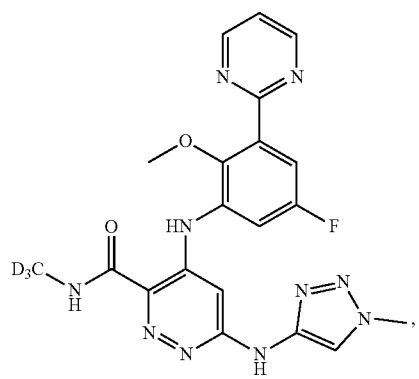
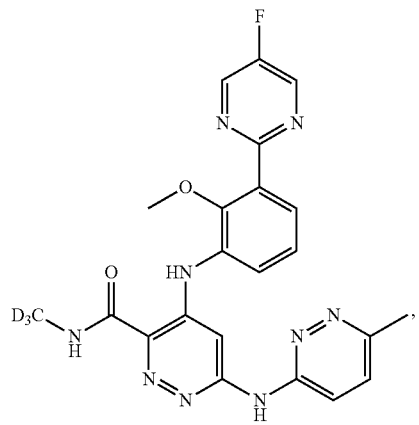
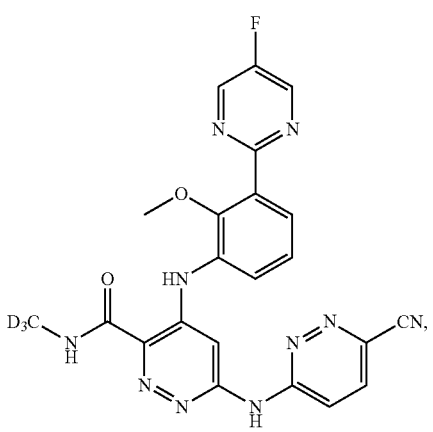
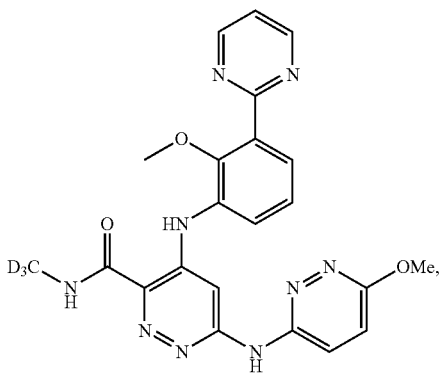
-continued
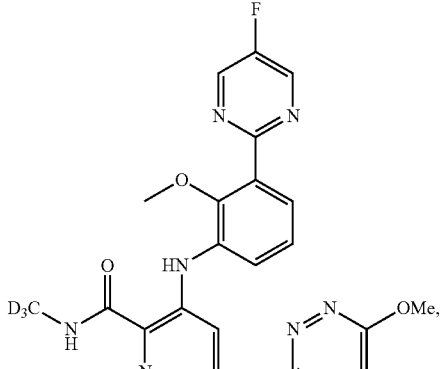
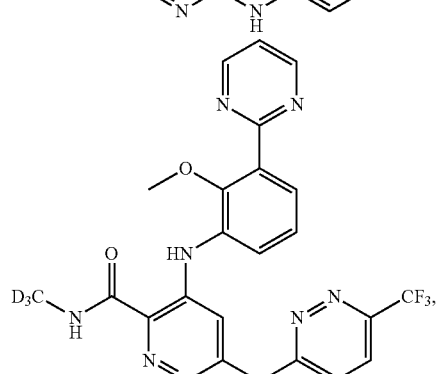
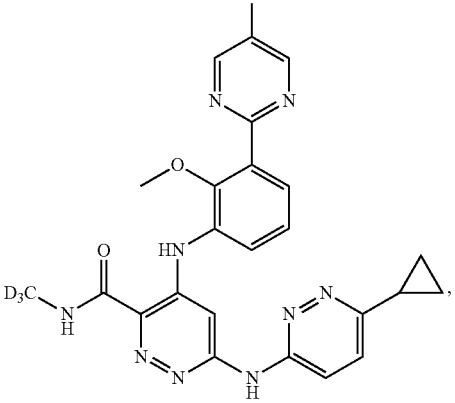
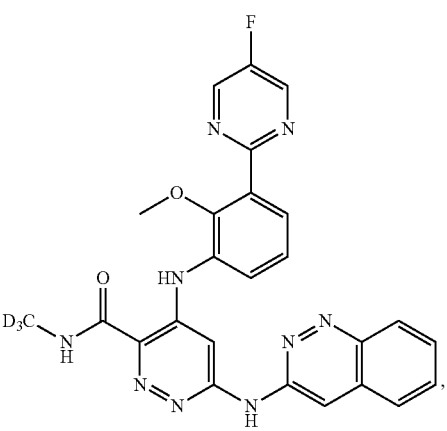 [SMILES: [2H]C([2H])([2H])NC(=O)c1nnc(Nc2cc3ccccc3nn2)cc1Nc1cccc(-c2ncc(F)cn2)c1OC]

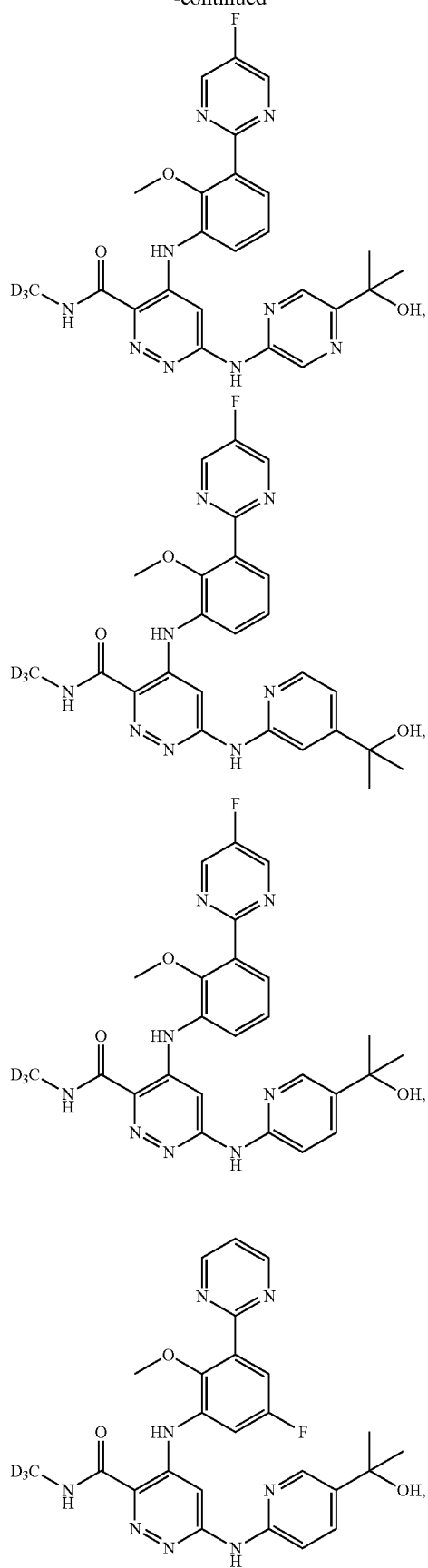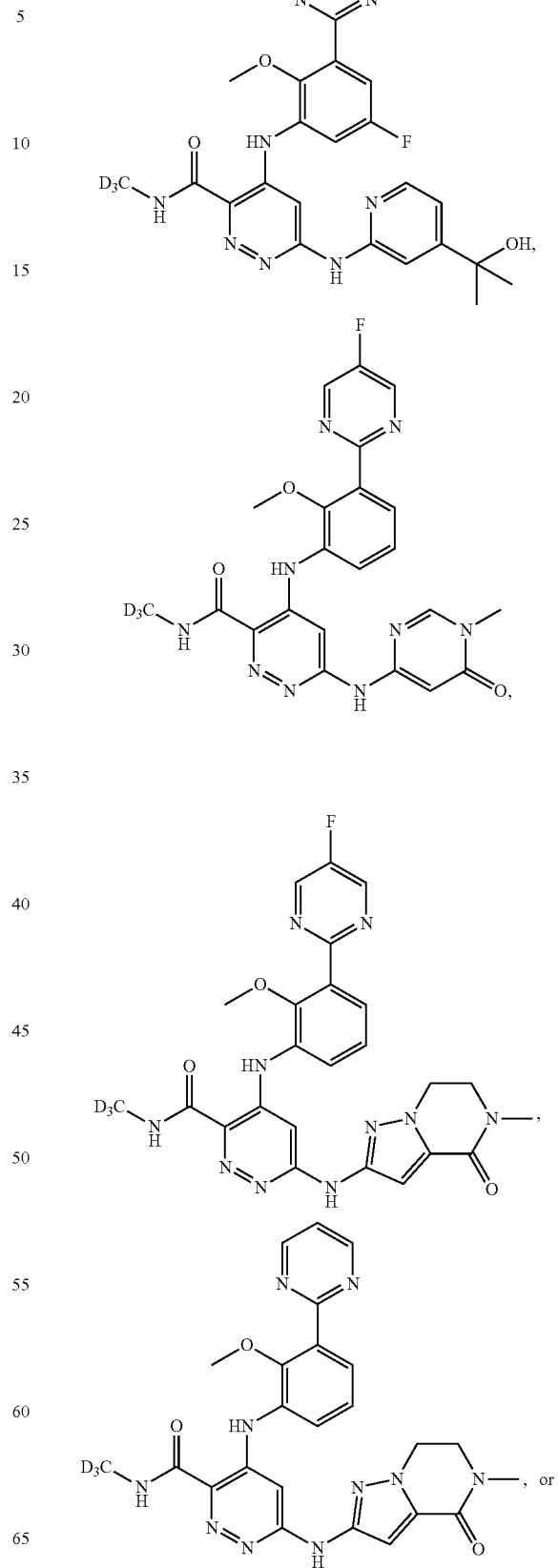

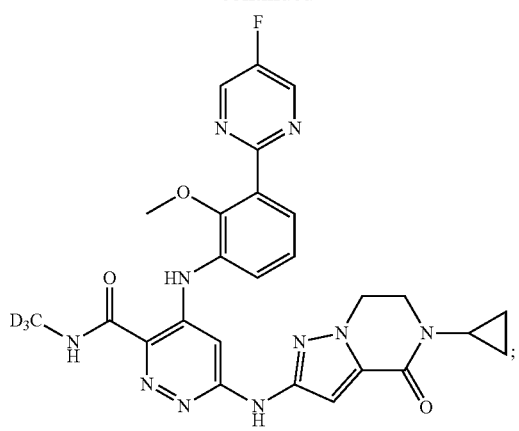 [SMILES: [2H]C([2H])([2H])NC(=O)c1nnc(Nc2cc3n(n2)CCN(C2CC2)C3=O)cc1Nc1cccc(-c2ncc(F)cn2)c1OC]
or a pharmaceutically acceptable salt thereof.
2. A compound which is
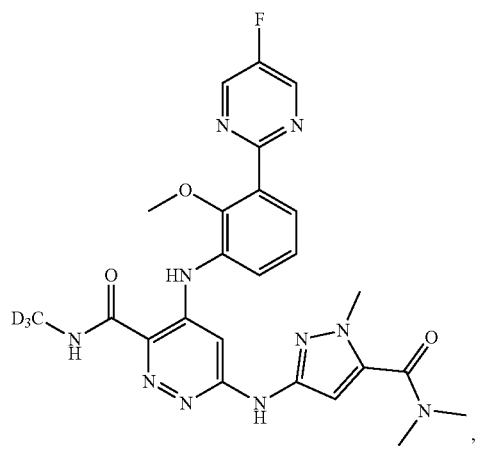
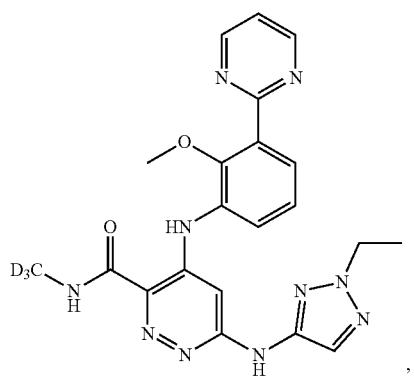
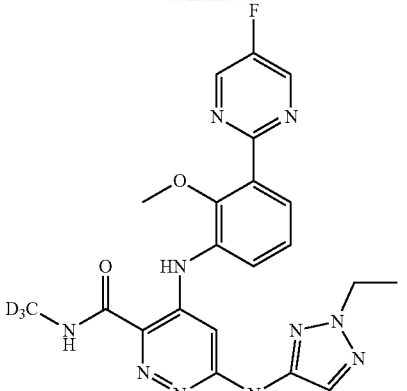
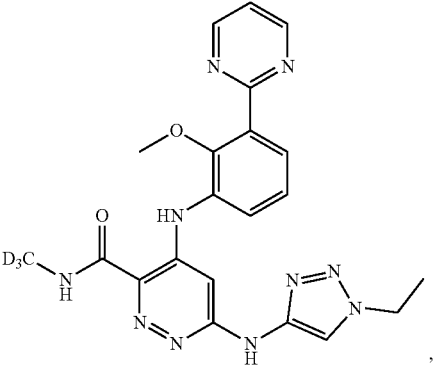
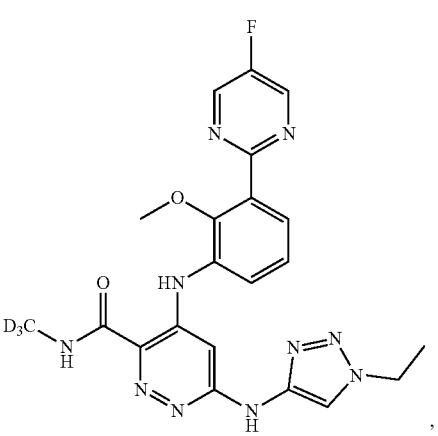

115
-continued

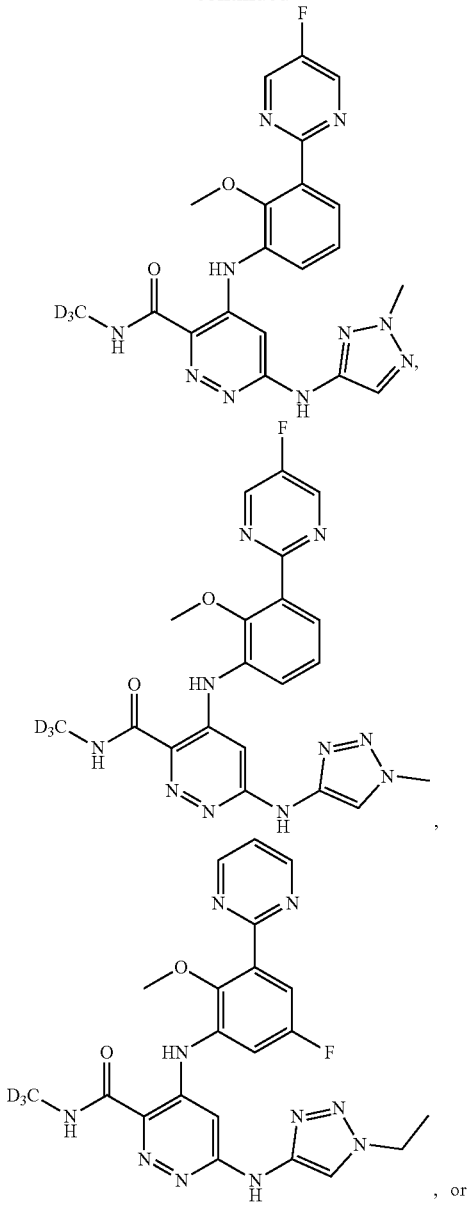

, or

116
-continued

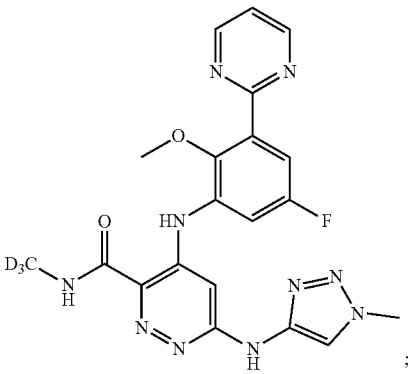

or a pharmaceutically acceptable salt thereof.

3. A pharmaceutical composition comprising one or more compounds according to claim 1 and a pharmaceutically acceptable carrier or diluent.

4. A method of treating a disease, comprising administering to a patient in need of such treatment a therapeutically-effective amount of a compound according to claim 1, wherein the disease is an inflammatory or autoimmune disease selected from multiple sclerosis, rheumatoid arthritis, inflammatory bowel disease, systemic lupus erythematosus, psoriasis, psoriatic arthritis, Crohn's Disease, Sjögren's syndrome and scleroderma.

5. A pharmaceutical composition comprising one or more compounds according to claim 2 and a pharmaceutically acceptable carrier or diluent.

6. A method of treating a disease, comprising administering to a patient in need of such treatment a therapeutically-effective amount of a compound according to claim 2, wherein the disease is an inflammatory or autoimmune disease selected from multiple sclerosis, rheumatoid arthritis, inflammatory bowel disease, systemic lupus erythematosus, psoriasis, psoriatic arthritis, Crohn's Disease, Sjögren's syndrome and scleroderma.

* * * * *